United States Patent [19]

Martz et al.

[11] 4,455,614

[45] Jun. 19, 1984

[54] GAS TURBINE AND STEAM TURBINE COMBINED CYCLE ELECTRIC POWER GENERATING PLANT HAVING A COORDINATED AND HYBRIDIZED CONTROL SYSTEM AND AN IMPROVED FACTORY BASED METHOD FOR MAKING AND TESTING COMBINED CYCLE AND OTHER POWER PLANTS AND CONTROL SYSTEMS THEREFOR

[75] Inventors: Lyle F. Martz, Verona; Roy W. Kiscaden, Springfield; Robert Uram, East Pittsburgh, all of Pa.

[73] Assignee: Westinghouse Electric Corp., Pittsburgh, Pa.

[21] Appl. No.: 399,790

[22] Filed: Sep. 21, 1973

[51] Int. Cl.³ .................. G06F 15/20; F01K 23/00; G05B 19/00
[52] U.S. Cl. ................... 364/494; 290/40 R; 290/2; 60/39.183
[58] Field of Search .............. 235/151.21; 444/1; 290/40 R, 16, 52, 2; 60/39.01, 39.5, 39.51 R, 39.52, 39.18 B; 415/1, 13–16; 340/172.5; 364/494, 900, 200

[56] References Cited

U.S. PATENT DOCUMENTS

| | | |
|---|---|---|
| 3,097,486 | 7/1963 | Roe ............................... 60/39.18 B |
| 3,675,426 | 7/1972 | Vidal et al. .................... 60/39.18 B |
| 3,703,807 | 11/1972 | Rice .............................. 60/39.18 B |
| 3,757,517 | 9/1973 | Rigollot ........................... 290/2 X |
| 3,762,162 | 10/1973 | Miura et al. ............... 60/39.18 B X |
| 3,849,662 | 11/1974 | Blaskowski et al. ................ 290/2 |
| 3,879,616 | 4/1975 | Barker et al. ...................... 290/40 |

Primary Examiner—Edward J. Wise
Attorney, Agent, or Firm—E. F. Possessky

[57] ABSTRACT

A combined cycle electric power plant includes in interconnected relationship a steam turbine, two gas turbines, three electric generators, two heat recovery steam generators, a hybrid computer control system, a plant protection system and various items of auxiliary equipment. A computerized simulator is interfaced with the control system at the factory site to test the controls and the control system is then modularly disassembled in various structures and shipped to the field site for reassembly without need for extensive field testing. The control system includes a digital control computer, a digital monitor computer and modular analog controls for the turbines. Various levels of automated control can be employed including coordinated plant control which involves supervisory operation of the analog controls by the control computer. In analog control, complete plant operation is produced by operation of the analog controls without the control computer.

46 Claims, 40 Drawing Figures

Microfiche Appendix Included
(61 Microfiche, 3841 Pages)

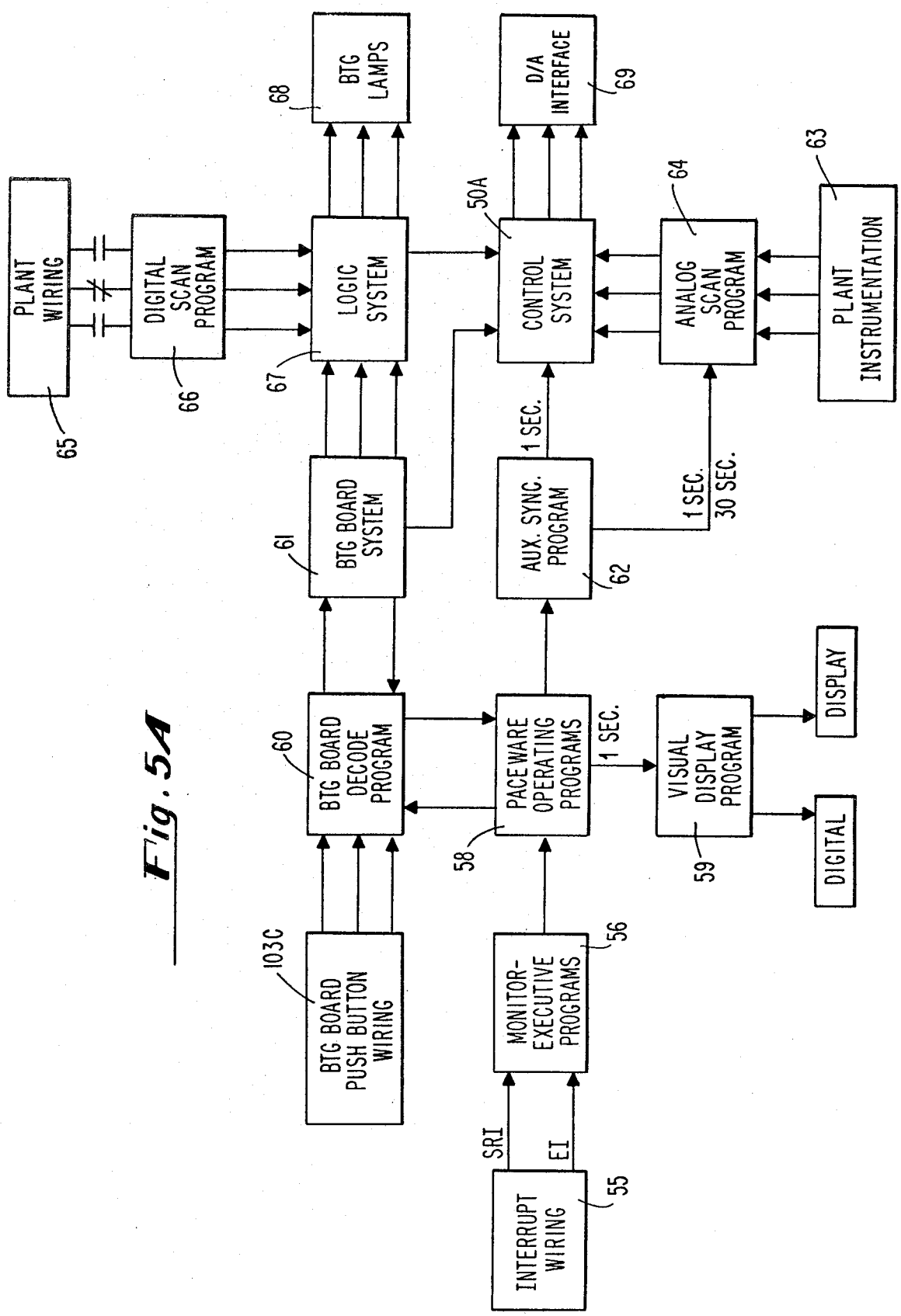

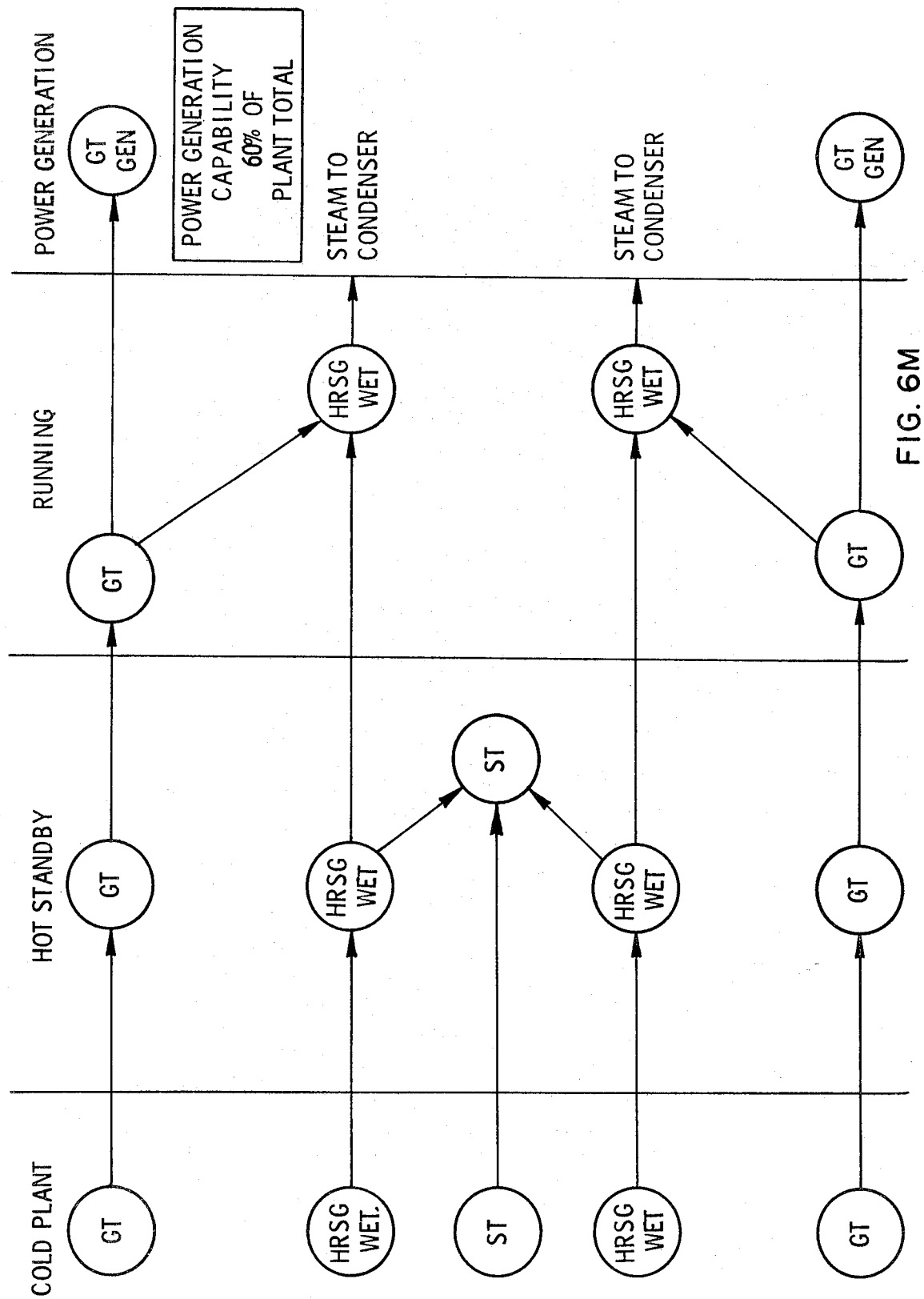

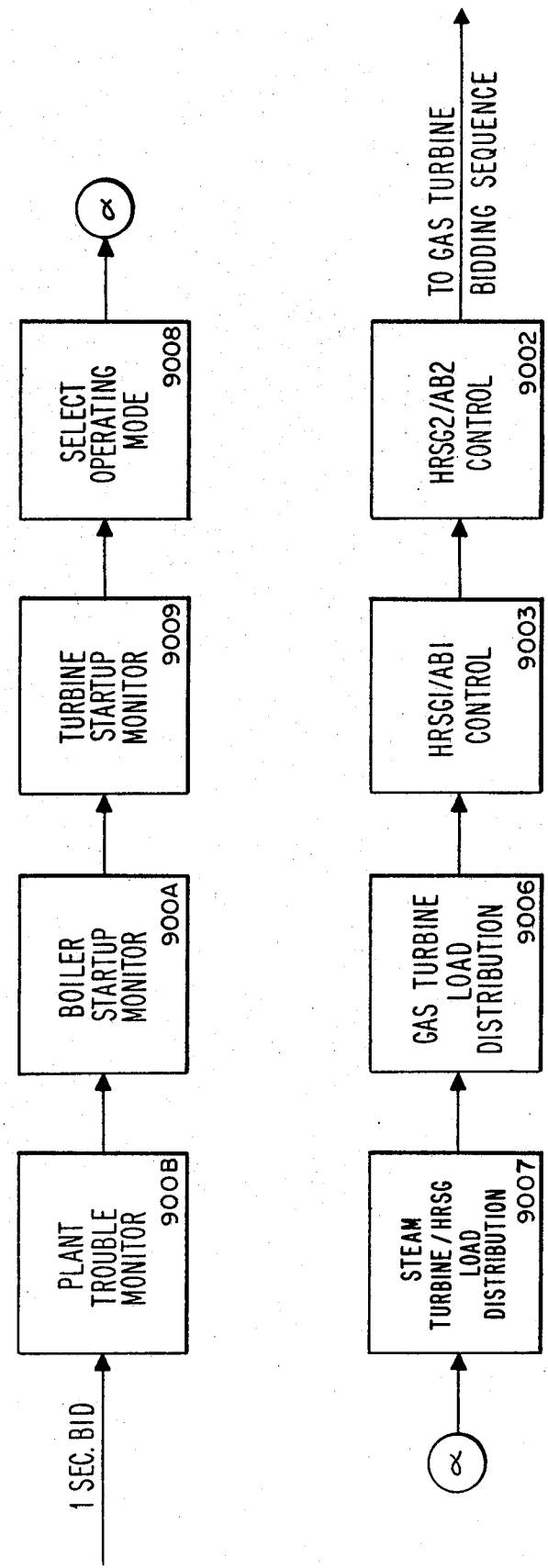

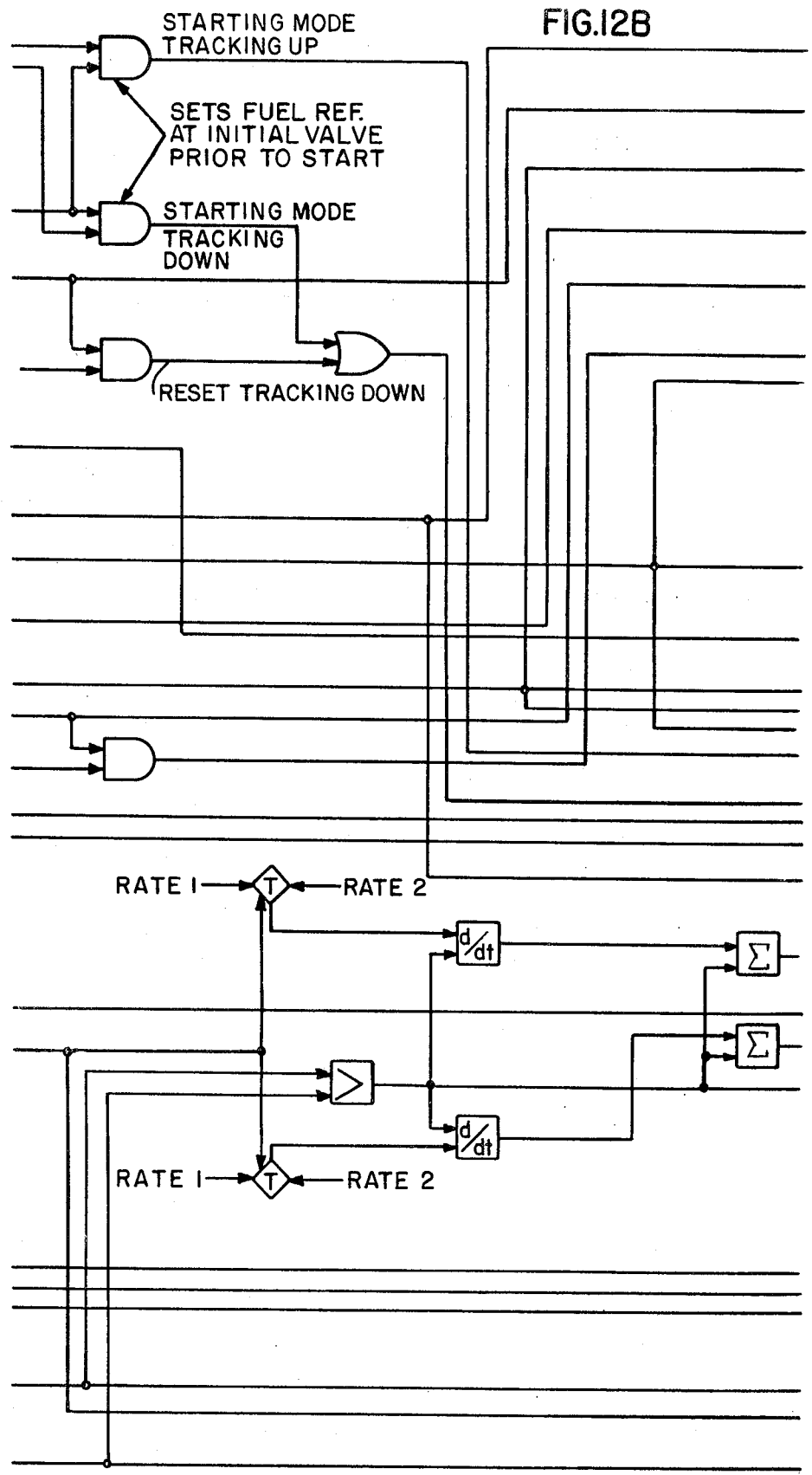

GAS TURBINE AND STEAM TURBINE COMBINED CYCLE ELECTRIC POWER GENERATING PLANT HAVING A COORDINATED AND HYBRIDIZED CONTROL SYSTEM AND AN IMPROVED FACTORY BASED METHOD FOR MAKING AND TESTING COMBINED CYCLE AND OTHER POWER PLANTS AND CONTROL SYSTEMS THEREFOR

CROSS REFERENCE TO RELATED APPLICATION

A Microfiche Appendix, consisting of 61 microfiche having a total of 3841 frames, is included in this application.

Reference is made to the following co-assigned and copending applications which are hereby incorporated by reference:

(1) Ser. No. 247,440 filed by R. Uram et al on Apr. 25, 1972.

(2) Ser. No. 319,114 filed by T. Giras et al on Dec. 29, 1972 as a continuation of Ser. No. 82,470 which was filed on Oct. 20, 1970, now Pat. No. 3,208,313.

(3) Ser. No. 250,826 filed by J. W. Gomola et al on May 5, 1972.

(4) Ser. No. 399,582 filed by R. E. Crews et al concurrently herewith (5) Ser. No. 399,399 filed by R. E. Crews et al concurrently herewith.

Reference is also made to Ser. No. 319,115 filed by T. Giras et al on Dec. 29, 1972 as a continuation of Ser. No. 124,993 which was filed on Mar. 16, 1971 and Ser. No. 722,779 which was filed on Apr. 19, 1968, and to related copending applications referred to in the above applications.

Reference is also made to later filed and coassigned patent applications Ser. Nos. 564,561 now U.S. Pat. No. 4,168,608; 564,562 now U.S. Pat. No. 4,104,324; 564,563 now U.S. Pat. No. 4,333,310, 564,571 now abandoned; and 564,527. These applications commonly describe a digital coordinated control which constitutes an improvement in certain respects over the control described herein. Further, the detailed digital embodiment description and related flow charts herein are in large part like the improvement disclosure.

BACKGROUND OF THE INVENTION

This invention relates to gas turbine and steam turbine combined cycle electric power generating plants and to control systems for and methods of controlling the operation of same.

In a combined cycle electric power generating plant employing one or more gas turbines and one or more steam turbines, the hot exhaust gas from each gas turbine is typically supplied to a boiler or steam generator for providing heat for producing the steam which drives the steam turbine or turbines. The various turbines drive one or more electric generators which produce electricity which is supplied by an electric utility system to various industrial, commerical and residential customers. In some combined cycle plants, further heat is supplied to the steam generator or generators by means of additional or supplemental burner mechanisms. In either case, such combined cycle plants are relatively complex in nature and a relatively large number of sensors and actuator mechanisms are provided for adjusting, regulating and monitoring the operations of the various turbine, generator and burner units and the auxiliary equipment normally associated therewith. Other arrangements of gas and stream turbines, steam generation sources and waste heat recovery apparatus can be employed in combined cycle plants.

One of the attractions of combined cycle plants is that in the intermediate power generation capacity range, for example 200 megawatts to 400 megawatts, power can be economically generated for base, intermediate or peaking generation. Further, the delivery lead time to obtain operational combined cycle power genration capacity can be significantly less than that in the case of fossil or nuclear base load steam plants. Thus, there is a significant market in the electric power industry for combined cycle plants. More information on combined cycle plants cna be obtained in prior patents and publications such as an article "Combined-Cycle Plant Serves Intermediate System Loads Economically" by P. Berman and F. Lebonette in the November 1970 Westinghouse Engineer, an article "A Combined Cycle Plant For Intermediate System Loads" presented by P. Berman and F. Lebonette at the 1970 Joint Power Generation Conference in Pittsburgh, Pa., and an article "Operating Concept For A 240 Megawatt Combined Cycle Intermediate Peaking Plant" presented by P. Berman to the ASME in 1971.

Generally, it is desirable to develop power plant manufacturing techniques and power plant structure which leads to reducing delivery lead time for electric power plants in general and combined cycle plants in particular. Reduced delviery time enables better power industry planning for installed generation capacity since it can proceed with greater currency. One approach to realizing better power plant construction with reduced lead time is that which involves substantially increased factory participation in the manufacture and assembly of power plant apparatus as set forth in the above noted case Ser. No. 399,582. The present disclosure embraces aspects of the power plant manufacturing and delivery process relating to control system testing as an integral part of the process.

Key tests put on the adequacy of an electric power plant are its availability and its reliability, i.e., whether it is actually available for safe startup and operation from standby and whether once operational it will continue to operate safely to produce demanded power. The significance of the availability and reliability factors increases with increasing savings or peaks of power demand and with increasing congruity between installed power generation capacity and user power demand. The requirement is that power always be safely and inexpensively available on demand, without a requirement for excessive operating costs nor excessive capital investment in power generation facilities.

Automatic coordinated plant operation can provide for better plant operation in various ways including:

(1) better response and therefore better avilability;

(2) better efficiency and therefore lower cost operation; and (3) more organized and better response to contingencies and therefore better reliablity.

Although automatic coordinated operation has been applied to fossil steam power plants with electric analog control systems or with digital computer control systems as set forth in copending patent application Ser. No. 413,275, filed by T. Giras et al on Nov. 6, 1973 and assigned to the present assignee or to boiling water reactor plants as set forth in U.S. Pat. No. 3,778,347, no known prior art discloses a progressive application of coordinated control concepts to combined cycle plants to achieve computer control techniques and hybridization techniques as applied to the controls for a power plant can also lead to better plant reliability, availability and efficiency. For example, a digital computer/analog hybrid system has been developed for controlling gas turbines as set forth in the aforementioned Ser. No. 319,114. Further, a digital computer system with limited analog backup and electrohydraulic interface equipment has been developed for controlling steam turbines as set forth in coassigned applications Ser. No. 319,115 and Ser. No. 408,962. However, none of this nor any other known prior art pertains directly to combined cycle plants.

As can further be appreciated, it is desirable to operate a combined cycle power plant so as to obtain improved or maximum efficiency (minimum heat rate) at each operating level or electrical power level. In other words, it is desirable to improve or minimize the total fuel consumption rate at any given electrical power output level for the plant as a whole. It is also desirable more particularly to provide a plant in which the control system automatically coordinates the settings of the fuel valves and throttle valves for the various turbine and burner mechanisms to automatically accomplish this purpose with a minimum of reliance upon a human operator. It is further desirable to provide a plant having an automatic control system which enables the amount of generated power to be changed from one level to another in the shortest possible length of time for various different operating conditions.

The various plant apparatus and control systems heretofore proposed for use in connection with combined cycle and other electric power generating plants leave much to be desired in the way of accomplishing these objectives.

SUMMARY OF THE INVENTION

The present invention overcomes many of the drawbacks of the previous plants and control systems. It provides a control system preferably capable of automatically coordinating different combined cycle operating units to provide improved or maximum plant efficiency. If further provides a control sytem which is highly flexible in terms of adapting itself and the plant to different operating conditions and situations. The control system is preferably modularized and hybridized in a manner which leads to improved plant operations. Further, provision is preferably made for factory simulation checkout of the plant control system so that more efficient plant assembly can be realized.

BRIEF DESCRIPTION OF THE DRAWING

For a better understanding of the present invention, together with other and further advantages and features thereof, reference is had to the following description taken in connection with the accompanying drawings wherein:

FIG. 5A is a block diagram showing the organization of the digital portion of the control system of the invention;

FIGS. 6I-6N show plant sequences for various plant operating configurations;

FIG. 7 C is a block diagram showing a conceptual functional organization of the control system;

FIG. 8F is a block diagram showing the bidding sequence of the digital coordinated control operation of the system of this invention;

DESCRIPTION OF THE PREFERRED EMBODIMENT

Figure 1:
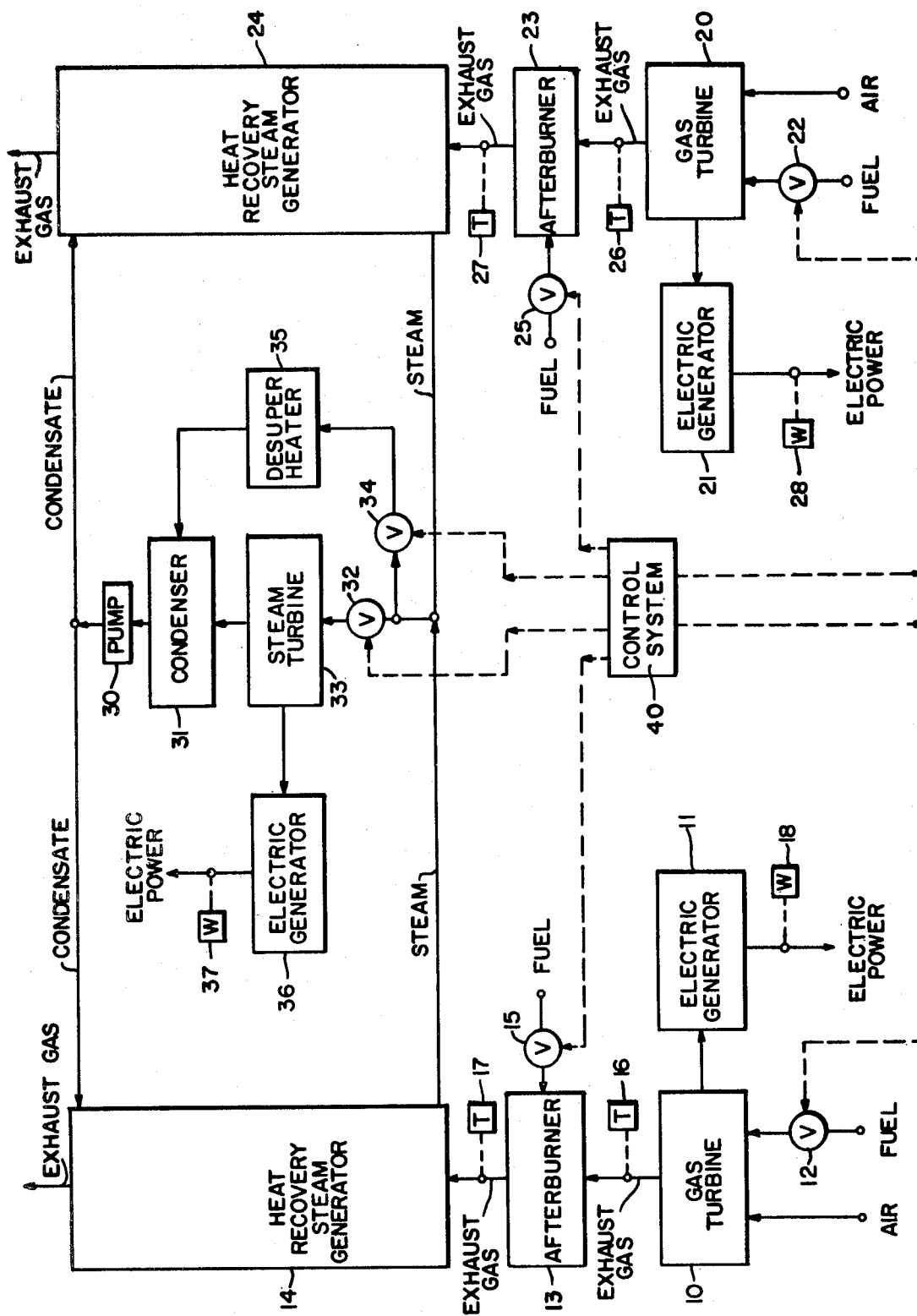
FIG. 1 shows in a schematic manner the major operating units of a combined cycle electric power generating plant.

Referring to FIG. 1, the combined cycle electric power generating plant there shown includes a first gas turbine 10 which drives a first electric generator 11. Fuel is supplied to the turbine 10 by way of a fuel control valve or throttle valve 12. Such fuel is burned in the turbine 10 and the resulting high temperature exhaust gas is passed through an afterburner 13 and a heat recovery steam generator 14 and is thereafter exhausted into the atmosphere. Afterburner 13 includes a burner mechanism for further increasing the temperature of the gas turbine exhaust gas before it enters the steam generator 14. Fuel is supplied to the burner mechanism in the afterburner 13 by way of a fuel control valve or throttle valve 15.

Steam generator 14 includes therein appropriate boiler tubes which are heated to a relatively high temperature by the gas turbine exhaust gas passing through the steam generator 14. The primary heat source is the gas turbine 10, the afterburner 13 being in the nature of a supplemental heat source for providing supplemental heating when needed. A first temperature sensor 16 senses the temperature of the exhaust gas leaving the gas turbine 10 and a second temperature sensor 17 senses the temperature of the gas entering the steam generator 14, both sensors 16 and 17 producing electrical output signals proportional to the sensed temperatures. The difference in the two temperatures indicates the temperature increase produced by the afterburner 13. A megawatt sensor 18 senses the output power of the electric generator 11 and produces a low level electrical signal proportional thereto.

A second gas turbine 20 drives a second electric generator 21. Fuel is supplied to the gas turbine 20 by way of a fuel control valve 22. Such fuel is burned in the gas turbine 20 and the resulting high temperature exhaust gas passes through an afterburner 23 and a heat recovery steam generator 24 and is vented to the atmosphere. Afterburner 23 includes a burner mechanism which receives fuel by way of a fuel control valve or throttle valve 25. Gas turbine exhaust temperature is sensed by a temperature sensor 26, while steam generator inlet temperature is sensed by a temperature sensor 27. A megawatt sensor 28 senses the electric power generated by generator 21. Steam generator 24 includes appropriate boiler tubes which are heated by the gas turbine exhaust gas passing through the steam generator 24. Gas turbine 20 is the primary heat source and afterburner 23 is a supplemental heat source for the steam generator 24.

A condensate pump 30 pumps condensate from a condenser 31 to both of the steam generators 14 and 24. Such condensate flows through the boiler tubes in each of the steam generators 14 and 24 and is converted into superheated steam. The steam from both of the steam generators 14 and 24 is supplied by way of a throttle valve 32 to a steam turbine 33 for purposes of driving such steam turbine 33. The spent steam leaving turbine 33 is passed to the condenser 31 wherein it is converted back into condensate. Such condensate is thereafter pumped back into the steam generator 14 and 24 to make more steam. A steam bypass path is provided for diverting desired amounts of steam around the steam turbine 33. This system bypass path includes a bypass valve 34 and a desuperheater 35, the output side of the latter being connected to th condenser 31. Steam turbine 33 drives a third electric generator 36. The electric power produced by generator 36 is sensed by a megawatt sensor 37.

The operation of the combined cycle electric power plant of FIG. 1 is controlled by an automatic control system 40. Among other things, this control system 40 coordinates the settings of the fuel valves 12, 15, 22 and 25 and the throttle and bypass valves 32 and 34 ot provide maximum plant efficiency under static load conditions and maximum flexibility during dynamic or changing load conditions.

Figure 2:
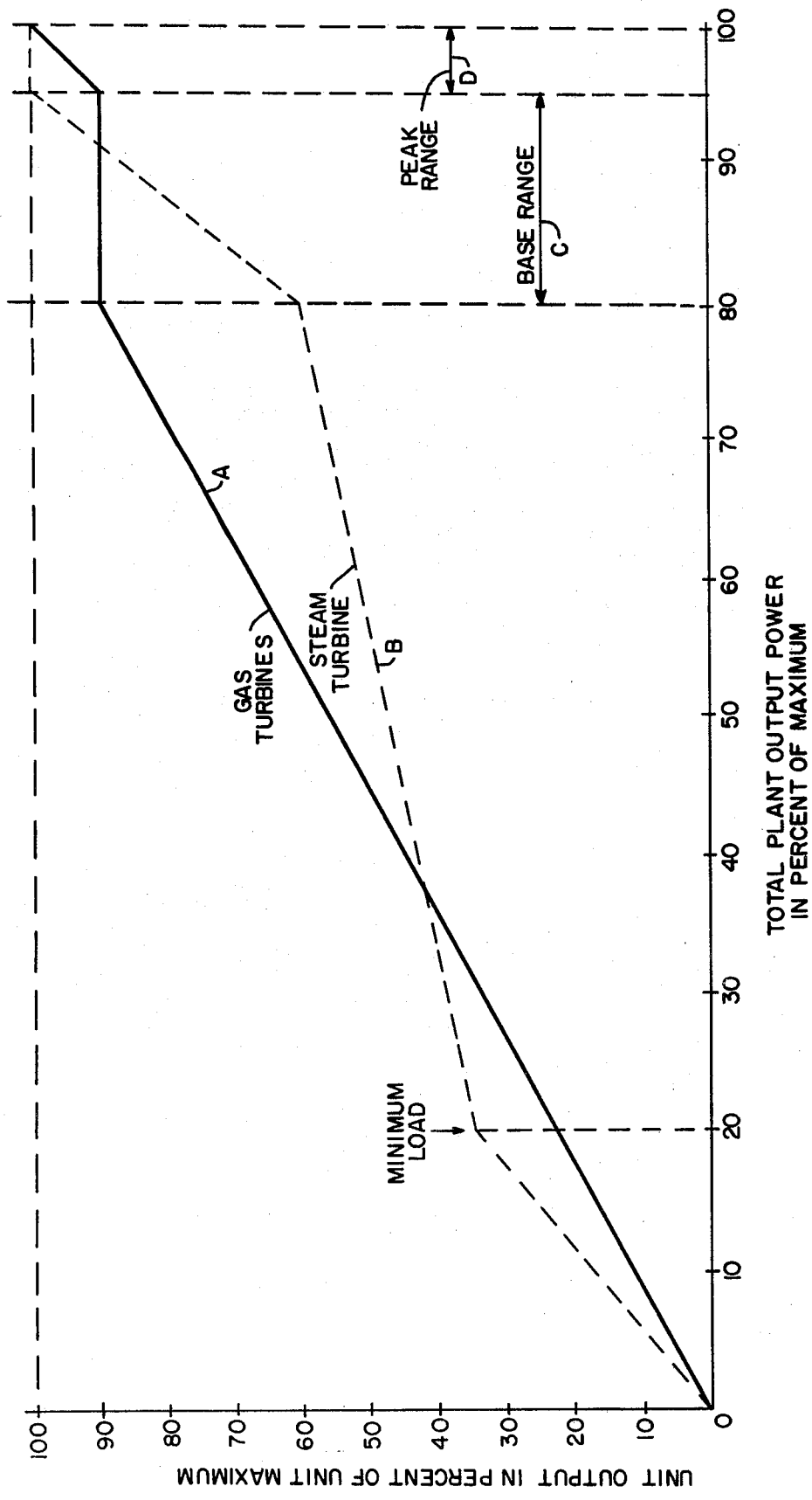
FIG. 2 is a graph used in explaining the operation of the FIG. 1 combined cycle plant.

FIG. 2 is a graph showing the manner in which the electrical load is divided between the two gas turbines on the one hand and the steam turbine 33 on the other hand for the various different total plant output power levels over the range of 0% to 100% of the maximum total plant output power. Solid line curve A represents the sum of the electric power produced by the two generators 11 and 21 which are driven by the gas turbines 10 and 20. Broken line curve B represents the electrical power produced by the generator 36 which is driven by the steam turbine 33. The total plant base range indicated at C represents the normal intended most frequently used operating range for which the plant was designed. Peak range D denotes the range intended to be used under conditions of peak load. The plant, of course, can be operated at any load level above the minimum load level indicated at the 20% point and is not limited to operation in only the base and peak ranges.

It should be carefully emphasized that FIG. 2 is valid only under static load conitions, that is, under the conditions which prevail after the system has settled down to stable operation at a selected load level. Under dynamic load conditions, such as occur when the total plant output is in the process of changing from one level to another, the relative outputs of the gas turbines and the steam turbine generators may differ substantially from those represented by the curves of FIG. 2. Eventually, however, after stable operation is reached at the new power level, the relationships indicated in FIG. 2 will again become valid.

Figure 6:
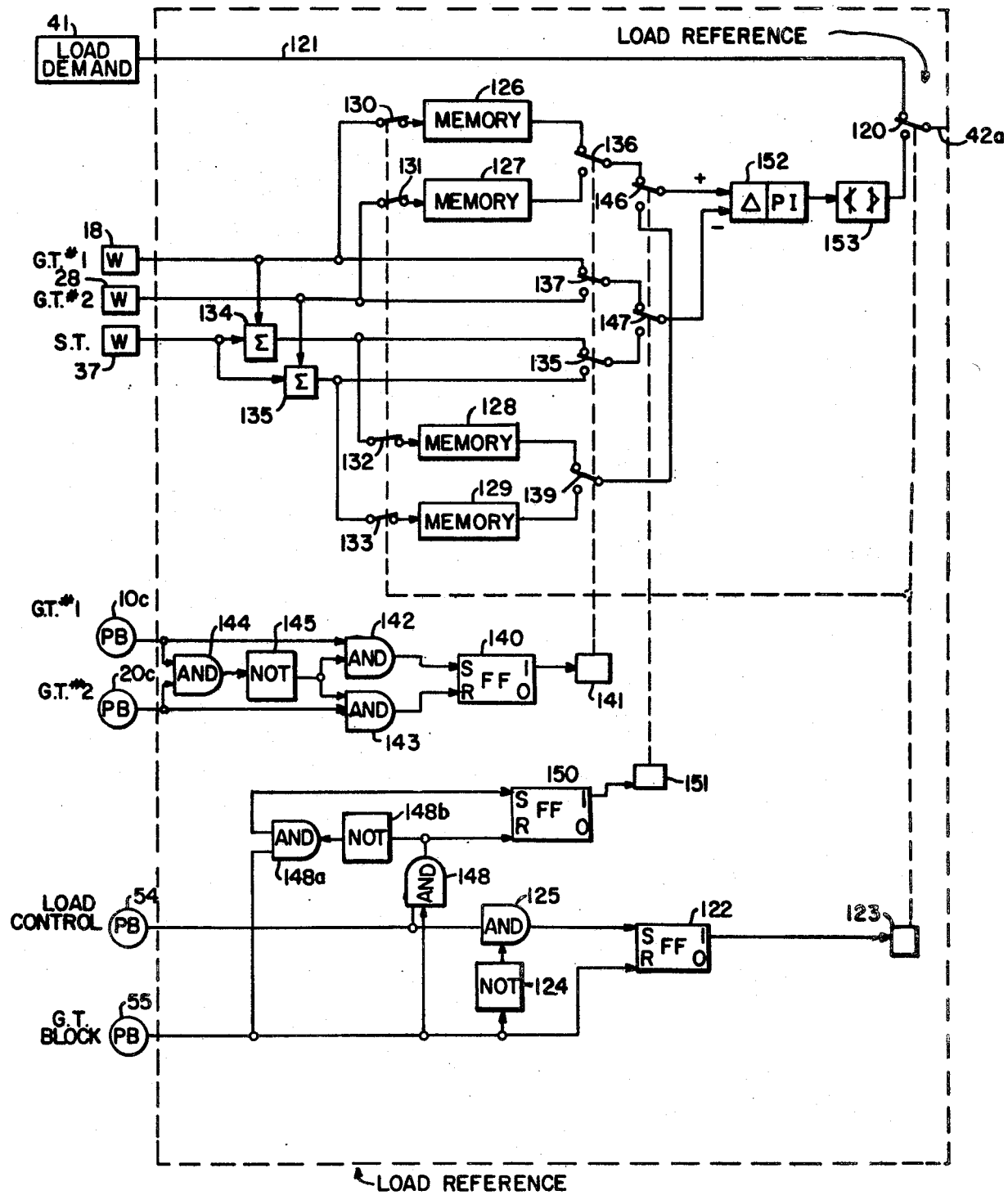
FIG. 6 shows in greater detail the nature of the load reference logic shown in FIG. 3.
Figure 6A:
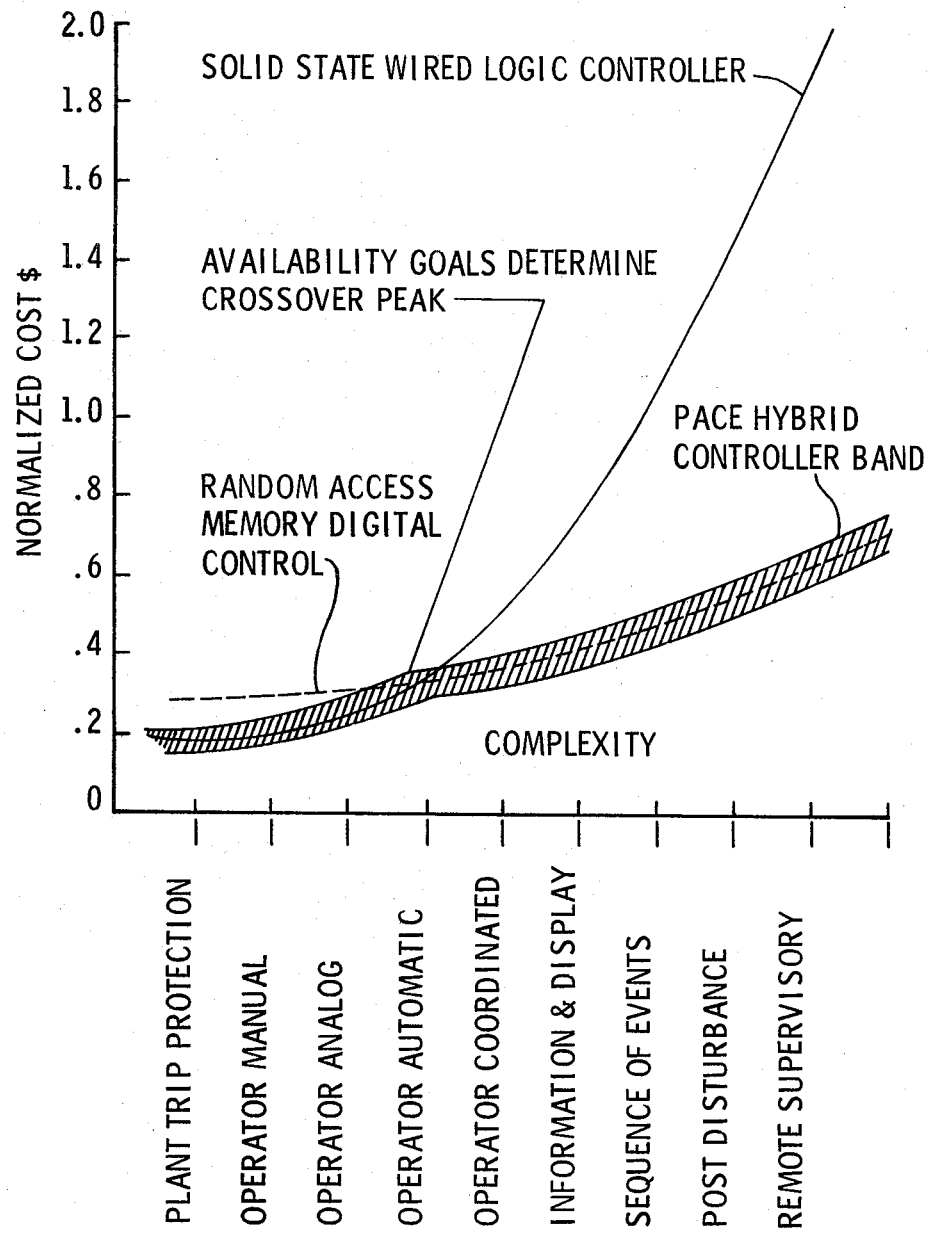
FIG. 6A shows a chart of control system costs as a function of complexity for wired logic and digital systems.

FIG. 6A shows graphically the relationship between normalized cost of a control system and its complexity. The hybrid system of the invention shows a clear advantage with increased automation of function (toward the right side of FIG. 6A).

Figure 3:
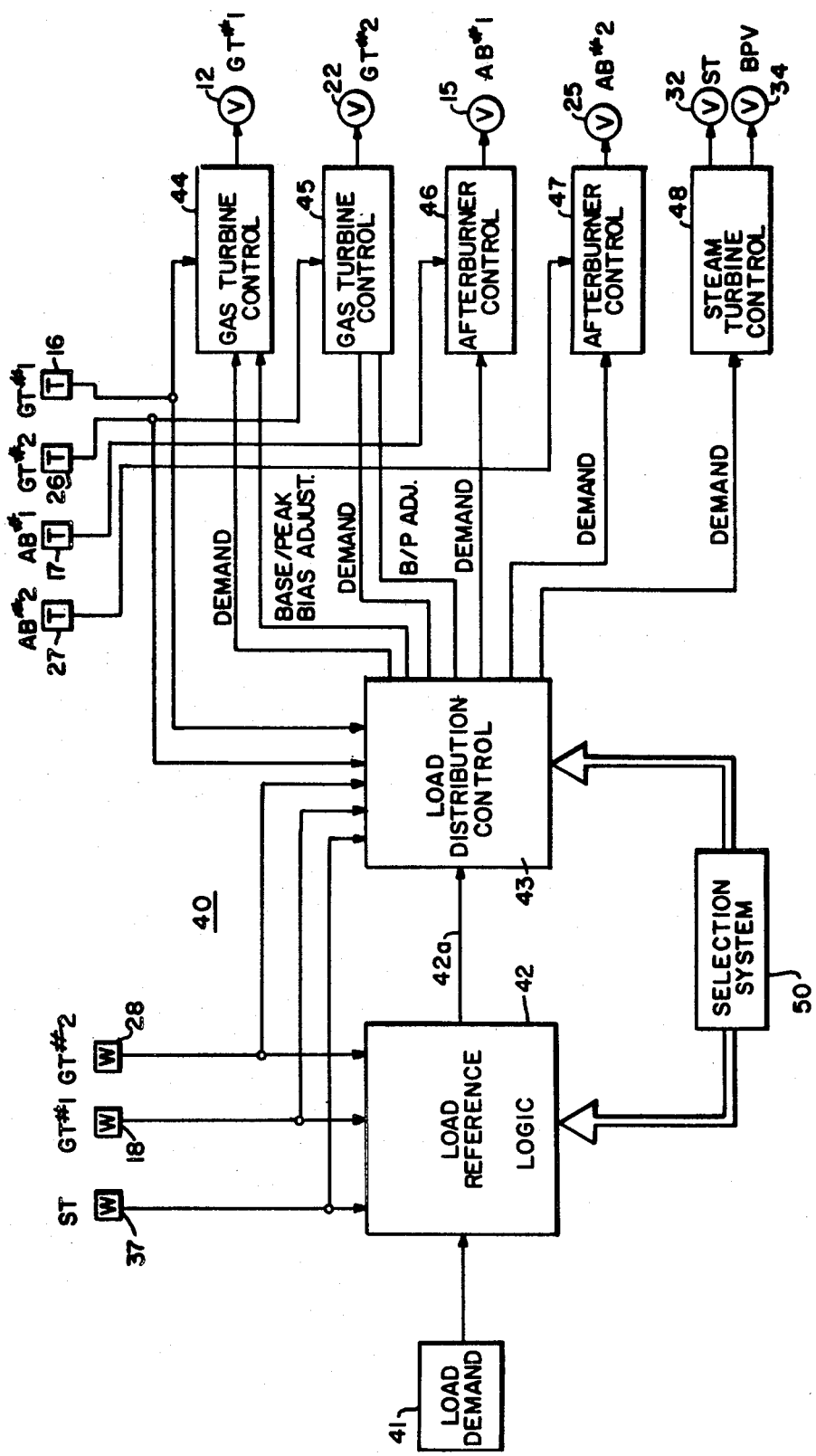
FIG. 3 shows in greater detail the nature of the control system shown in FIG. 1.

Referring now to FIG. 3, there is shown in greater detail the nature of the control system 40. As indicated in FIG. 3, the control system 40 includes a load demand unit 41 which generates an electrical signal representing the desired total plant output power level. Unit 41 includes means for enabling the plant operator or engineer to change the load demand signal to any value he may wish to select. The load demand signal from unit 41 is supplid to a load reference logic unit 42 which also receives the low level output signals from the megawatt sensors 18, 28 and 37. Load reference logic unit 42 produces on its output line a load reference signal which, depending on the operating mode, may or may not be the same as the load demand signal from unit 41. The load reference signal from unit 42 is supplied to a load distribution control unit 43.

Load distribution control 43 sends appropriate individual demand signals to a first gas turbine control 44 which drives the first gas turbine fuel valve 12, a second gas turbine control 45 which drives the second gas turbine fuel valve 22, a first afterburner control 46 which drives the first afterburner fuel 15, a second afterburner control 47 which drives the second afterburner fuel valve 25, and a steam turbine control 48 which controls the steam turbine throttle valve 32 and the steam bypass valve 34. Temperature indicating signals from temperature sensors 16, 17, 26 and 27 are supplied to the gas turbine control 44, the afterburner control 46, the gas turbine control 45 and the afterburner control 47, respectively. Signals from temperature sensors 16 and 26 are also suppplied to the load distribution control 43. Various operating modes for the load reference logic 32 and the load distribution control 43 are established by signals supplied to these units by a selection system 50.

Figure 4:
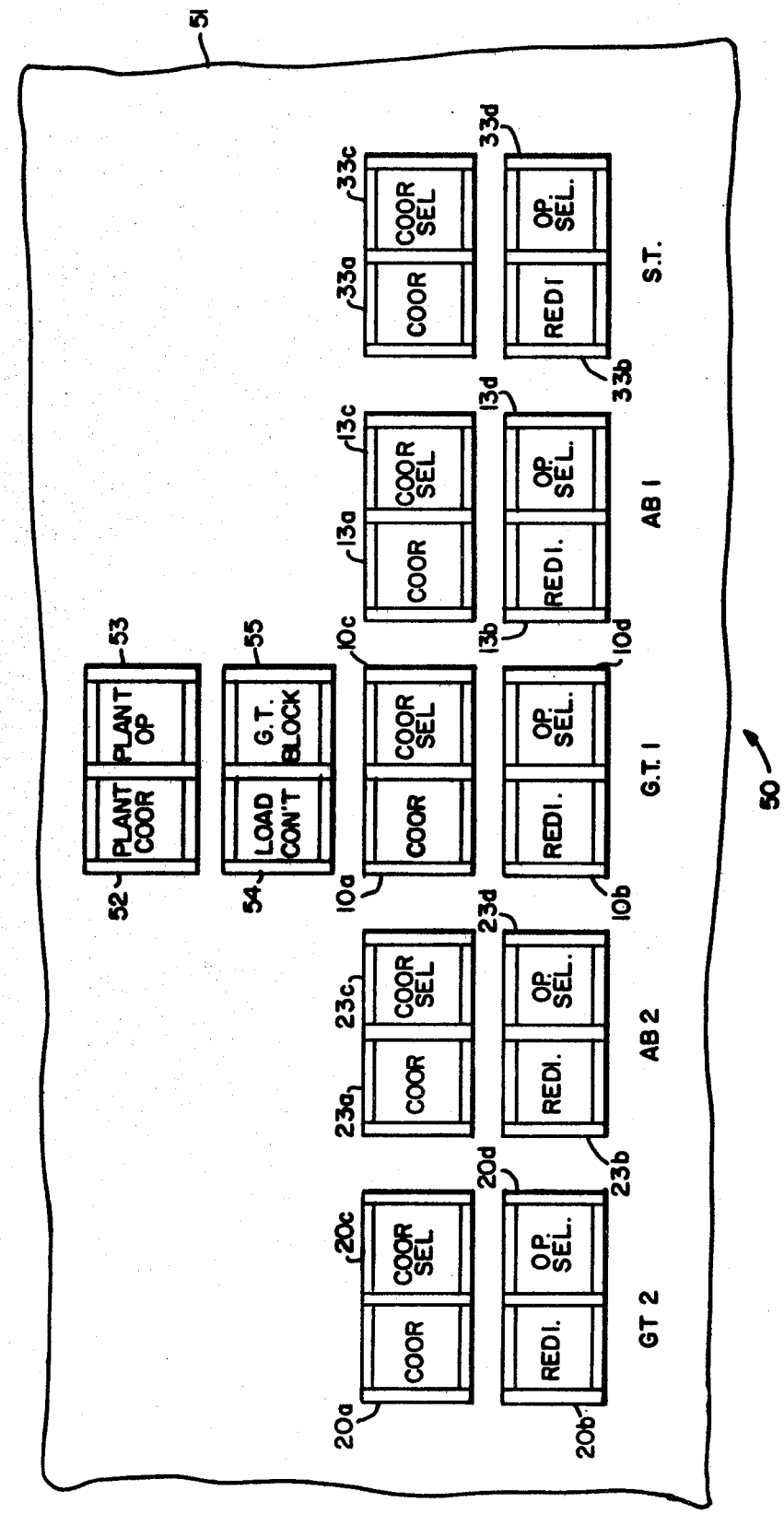
FIG. 4 shows in greater detail the nature of the selection system shown in FIG. 3.

FIG. 4 shows in greater detail the nature of the selection system 50 of FIG. 3. As indicated in FIG. 4, the selection system 50 includes an array of backlighted pushbutton switches and status lights 10a, 10b, etc. which are mounted on an operator control panel or control board 51. In the actual plant, additional switches, instruments and control devices will also be mounted on the operator control board 51 for performing various functions connected with the power plant. These additional devices have been omitted in FIG. 4 for sake of simplicity.

Prefix numbers 10 have been used for buttons and lights associated with the operation of the gas turbine 10, prefix numbers 13 have been used for buttons and lights associated with the operation of the afterburner 13 and so forth. Items in the 10, 13, 20, 23 and 33 series which have suffix letters "a" and "b" are status lights. Items in these series which have suffix letters "c" and "d" are spring-loaded backlighted pushbuttons which are lit when the switch contacts associated with the buttons are closed. A first momentary depression of one of these pushbuttons will close its switch contacts and the next momentary depression will open its switch contacts. Items 52–55 are spring-loaded backlighted pushbuttons which are used in establishing the different operating modes for the control system 40.

The control system 40 is constructed so that two major operating modes are provided for each of the gas turbine 10, the afterburner 13, the gas turbine 20, the afterburner 23 and the steam turbine 33. The first of these operating modes is a "plant coordinated" mode and the second is an "operator adjustable" mode. When a particular unit is in the plant coordinated mode, then its operation is automatically coordinated with those ones of the other units which are at that moment alos in the plant coordinated mode. When, on the other hand, a particular unit is in the operator adjustable mode, then its operation is more or less independent of the operation of the remainder of the units and its operating level is controlled by its own separate operator adjustable reference signal source.

Considering the pushbuttons 10c and 10d for the gas turbine 10, for example, the "coordinated select" button 10c is depressed if it is desired to have the gas turbine 10 operate in the plant coordinated mode. If, on the other hand, it is desired to have the gas turbine 10 operate in the operator adjustable mode, then the "operator select" pushbutton 10d is depressed. The depressing of either button 10c 10d does not cause the actual change in mode. The actual transfer from one mode to the other occurs when one or the other of mode transfer buttons 52 and 53 is depressed. In other words, when the plant coordinated button 52 is depressed, then all of the individual units which have their coordinated select buttons switch contacts closed are at that moment transferred to the plant coordinated mode. In a similar fashion, the depressing of the plant operator pushbutton 53 causes a transfer to the operator adjustable mode of those units for which the switch contacts have been closed by a depressing of their operator select pushbuttons. As will be discussed in greater detail hereinafter, mode transfer pushbuttons 52 and 53 are effective to provoke mode changes in the load distribution control unit 43, while mode transfer buttons 54 and 55 are effective to initiate mode changes in the load reference logic 42.

Considering now the status lights having the suffix a and b designations, the "redi" light having the "b" designation is lit if the particular unit in question is in the operator adjustable mode and is in a ready condition or proper condition to be transferred to the plant coordinated mode. If then the coordinated select button "c" for that unit is depressed to light same and if the plant coordinated transfer button 52 is thereafter depressed, the "redi" light "b" goes out and the coordinated light "a" comes on. The lighting of the coordinated light "a" indicates that the transfer to the plant coordinated mode has been accomplished and that such units is now operating in such mode. Conversely, if the "redi" light "b" is lit, then the unit in question is operating in the operator adjustable mode.

Figure 5:
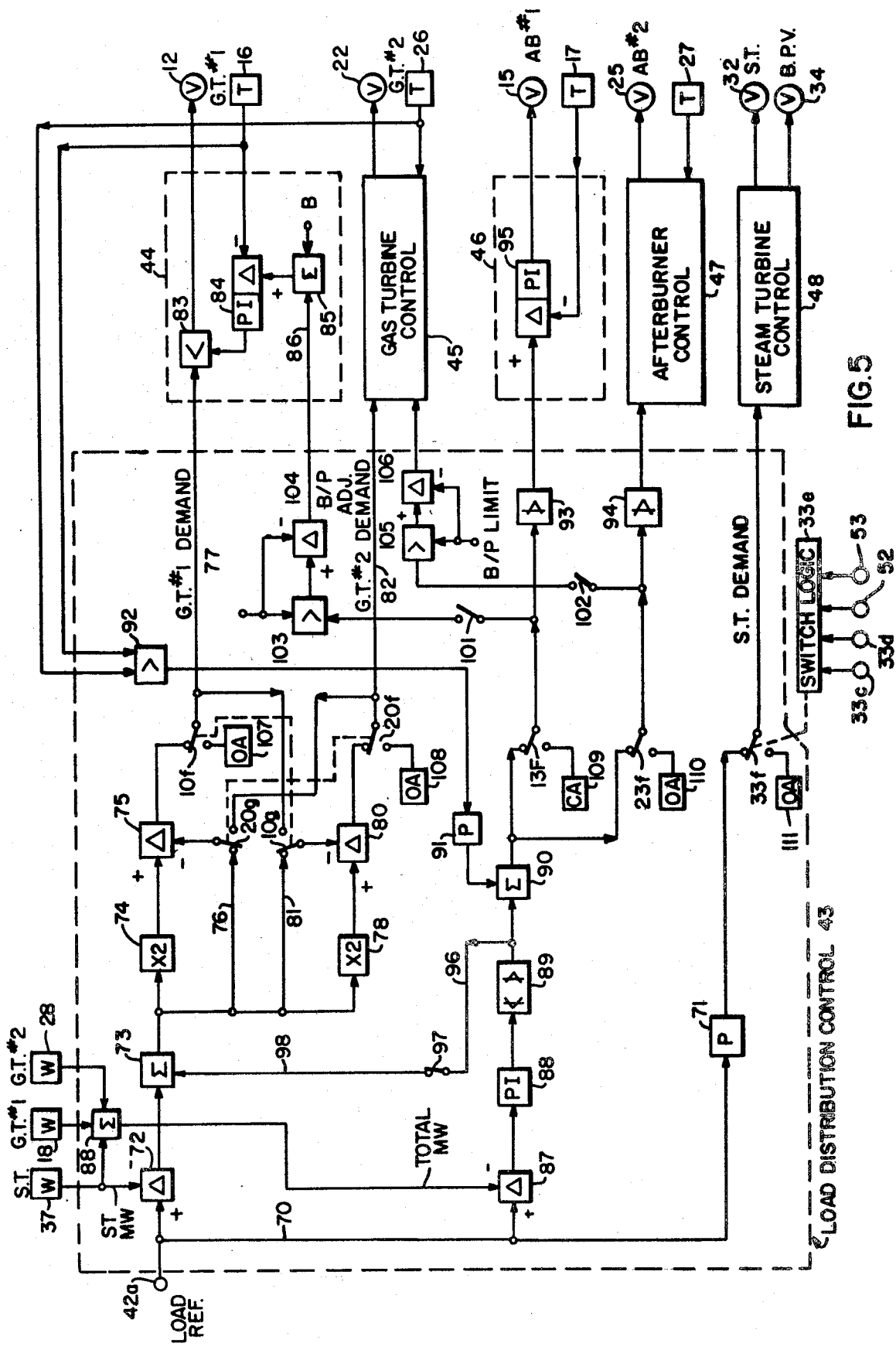
FIG. 5 shows in greater detail the nature of the load distribution control shown in FIG. 3.
Figure 7:
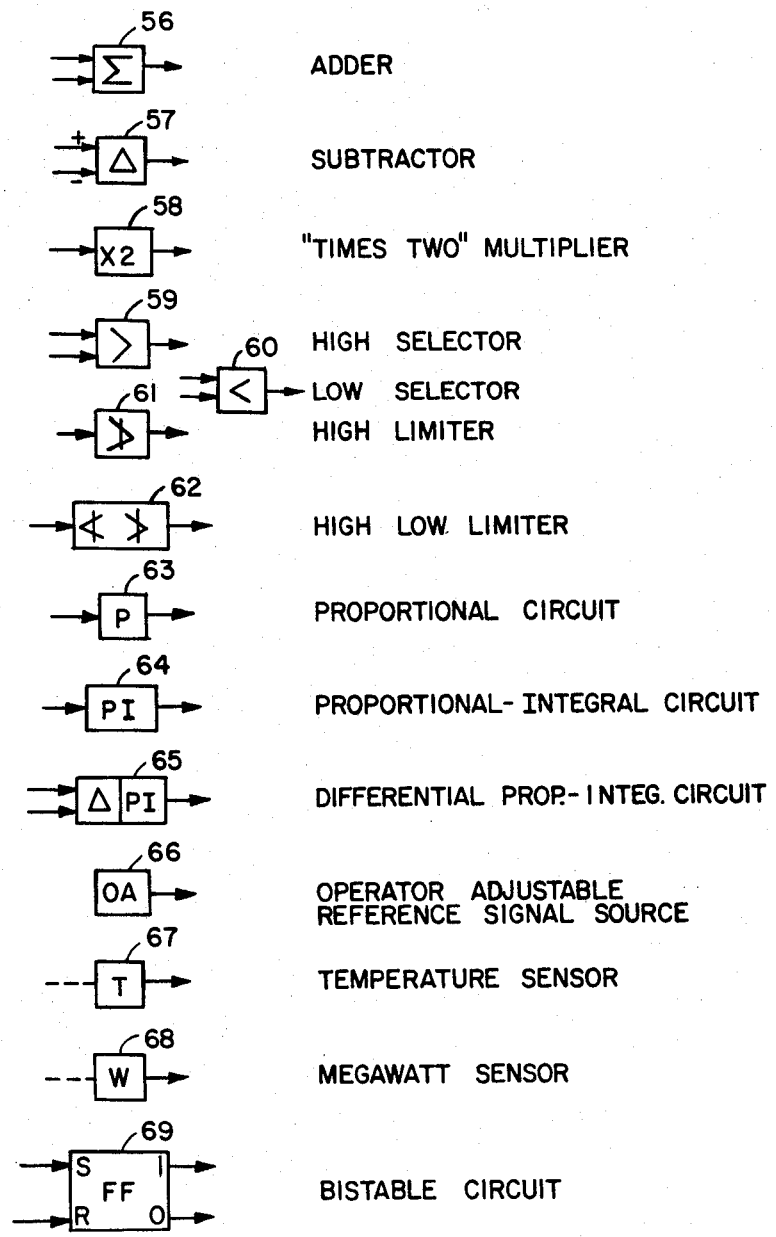
FIG. 7 is a table setting forth the meanings of the symbols used in FIGS. 5 and 6.

Referring now to FIG. 7, there is given an explanatory listing of the unit symbols that will be used in FIGS. 5 and 6. Symbol 56 of FIG. 7 represent an adder. The output signal leaving the adder is equal to the algebraic sum of the input signals entering the adder. Symbol 57 denotes a subtractor. The output signal leaving the subtractor is equal to the algebraic between the two input signals. The plus (+) sign on input lead 57a indicates that a positive signal on this lead will produce a positive increment on the output lead. The minus (−) symbol on the input lead 57b indicates that a positive signal on this lead will produce a negative increment on the output lead. Symbol 58 represents a multiplier which multiplies the input signal by a factor of two. In other words, the magnitude of the output signal is twice the magnitude of the input signal. Symbol 59 represents a high selector. The signal leaving the output of the high selector is equal to that input signal which is the greater of the two input signals. Symbol 60 represents a low selector. The signal leaving the output of the low selector is equal to the input signal which is the smaller or lesser of the two input signals. Symbol 61 denotes a high limiter. The signal on the output lead of the high limiter is equal to the input signal when such input signal is below the limit value and is equal to the limit value when the input signal is above such limit value. In other words, the output signal cannot exceed the limit value. Symbol 62 denotes a high-low limiter. The output signal of the high-low limiter is equal to the input signal when such signal is higher than the low limit and lower than the high limit. Otherwise, the output is equal to teither the high limit or the low limit, depending on whether the input signal is too high or too low.

Symbol 63 represents a proportional circuit wherein the magnitude of the output signal is directly proportional to the magnitude of the input signal. Symbol 63 can be assumed to be an amplifier circuit with the understanding that the gain of such amplifier can be either greater or less than unity. Symbol 64 represents a proportional-integral (PI) circuit. The output of PI circuit 64 is equal to a linear combination of the input signal and the time integral of the input signal. "P" denotes proportionality and "I" denotes integration. Thus, circuit 64 can be considered as being an amplifier having some integrating action. Symbol 65 represents a differential proportional-integral ($\Delta$ PI) circuit. It is the same as symbol 64 except that a pair of input signals are first algebraically subtracted and then the resulting difference signal supplied to the PI section of circuit 65. Thus, circuit 65 can be thought of as being a differential amplifier having some integrating action. Symbol 66 represents an operator adjustable reference signal source. In its simplest form, signal source 66 might take the form of a potentiometer energized with direct-current voltage, with the output being taken from the sliding tap of the potentiometer. Symbol 67 denotes a temperature sensor, while symbol 68 denotes a megawatt sensor.

Symbol 69 represents a bistable circuit such as, for example, a flip-flop circuit. Circuit 69 is placed in a set condition if the S input is energized and is placed in a reset condition if the R input is energized. When in a set condition, the one output is at a binary one level (e.g., a high level) and, when in a reset condition, the one output is at a binary zero level (e.g., a low level). The zero output is just the opposite of the one output.

Referring now to FIG. 5, there is shown in greater detail the nature of the load distribution control unit 43 of FIG. 3. FIG. 5 also shows in greater detail the nature of the gas turbine control 44 and the afterburner control 46. It is initially assumed that each of the major operating units, namely, gas turbine 10, afterburner 13, gas turbine 20, afterburner 23 and steam turbine 33 are operating in the plant coordinated mode. The switches shown in FIG. 5 are shown in the plant coodinated mode position. It is further assumbed for the moment that the load reference signal which is input to the load distribution control 43 on conductor 42a is the same as the load demand signal generated by the load demand signal generator 41. It is also assumed that the combined cycle plant is operating at some power level above minimum load.

Considering first the means used to develop the demand signal which is supplied to the steam turbine control 48, it is noted that the load reference signal appearing on the input conductor 42a is supplied by way of a conductor 70, a proportional circuit 71 and a mode establishing switch 33f to the input of the steam turbine control 48. The objective in the present embodiment is to have the steam turbine throttle valve 32 in the fully open position and the steam bypass valve 34 in the fully closed position whenever the total plant output power level is above the minimum load value. In other words, it is desired that the steam turbine 33 always be operated in a so-called "turbine following" mode whenever the plant is supplying electrical power to a load. In this case the steam turbine 33 follows the gas turbines 10 and 20. Whatever steam is produced by the hot exhaust gases from the gas turbines 10 and 20 is used in total by the steam turbine 33.

Since the exhaust gas temperatures of gas turbines 10 and 20 increase as the power output of these turbines 10 and 20 increase, this means that the output power of the steam turbine 33 is dependent on the output power of the gas turbines 10 and 20 and increases as the output power of such gas turbines 10 and 20 increases. For the moment, it is assumed that the afterburners 13 and 23 are at some minimum operating level and are contributing very little heat to the system.

The gain of the proportional circuit 71 is selected so that the magnitude of the demand siganl appearing at the input of steam turbine control 48 is sufficient to drive the throttle valve 32 fully open and the bypass valve 34 fully closed at the point where the load reference signal on conductor 42a becomes equal to the plant minimum load value. It is noted at this point that the load reference signal as well as the load demand signal from the load demand 41 are proportional to the total power or total megawatts which it is desired that the combined cycle plant should produce. Thus, for any load demand level above minimum load, the throttle valve 32 remains fully open and the bypass valve 34 remains fully closed.

Considering now the means for developing the drive signals or demand signals for the gas turbine controls 44 and 45, it is noted that the load reference signal on input conductor 42a is further supplied to a signal subtractor circuit 72. There is supplied to the second input of the subtractor circuit 72 the signal developed by the megawatt sensor 37, which signal is proportional to the megawatts actually produced by the electric generator 36 driven by the steam turbine 33. There thus appears at the output of subtractor circuit 72 a signal which is proportional to the megawatts required of the gas turbines 10 and 20. In other words, desired megawatts minus actual steam turbine megawatts gives the megawatts required to be produced by the gas turbines.

This gas turbine megawatt demand signal is supplied by way of an adder 73 and a "time two" multiplier 74 to the first input of a subtractor 75. This megawatt signal is also supplied by way of a conductor 76 and a switch 20g to a second input of the subtractor 75. Switch 20g is ganged to the mode establishing switch 20f and is in the position in FIG. 5 shown whenever the second gas turbine 20 is in the plant coordinated mode. In this case, the subtractor 75 subtracts the megawatt signal from a signal equal to twice the megawatt signal to produce at the output of the subtractor 75 a signal equal to the original gas turbine megawatt signal appearing at the output of adder 73. This gas turbine megawatt signal is then supplied by way of a mode establishing switch 10f for the first gas turbine 10 and a conductor 77 to the input of the gas turbine control 44.

In a similar fashion this same gas turbine megawatt demand signal is also supplied to the input of the second gas turbine control 45. In other words, the signal at the output of adder 73 is supplied by way of a second "times two" multiplier 78 to a subtractor 80. This signal is also supplied by way of a conductor 81 and a switch 10g to the second input of the subtractor 80. Switch 10g is ganged to the mode establishing switch 10f for the first gas turbine 10 so as to be in the position shown when the first gas turbine 10 is in the plant coordinated mode. The resulting difference signal at the output of subtractor 80 is supplied by way of the mode switch 20f and a conductor 82 to the demand signal input of the second gas turbine control 45. Thus, under the assumed operating conditions the signal supplied to the input of the second gas turbine control 45 is the same as the signal supplied to the demand input of the first gas turbine control 45. This causes equal loading of the two gas turbines 10 and 20, which is normally what is desired when both gas turbines are in operation.

For plant loads below the lower limit of base range C, the gas turbine demand signal on conductor 77 is supplied by way of a low selector circuit 83 in the control unit 44 to the fuel valve 12 for the first gas turbine 10. Gas turbine control 44 further includes means for holding constant the power level or load level of the gas turbine 10 over the base range C in FIG. 2. This limiting action is provided by a temperature controller 84 in the control unit 44. This temperature controller 84 is a differential proportional-integral ($\Delta$PI) circuit. The gas turbine exhaust temperature signal produced by the temperature sensor 16 is supplied to a first input of the controller 84, while a fixed set point signal B is supplied by way of an adder 85 to the second input of the controller 84. At this time, there is no signal on a second input 86 to the adder 85.

The value of the set point signal B is selected so that the output of the controller 84 becomes smaller than the megawatt demand signal on conductor 77 at the point where such demand signal reaches the lower limit of the base range C. With the signal from controller 84 being the smaller of the two, this means that such controller signal is then supplied by the low selector circuit 83 to the fuel valve 12. This enables the controller 84 to hold constant the exhaust temperature from the gas turbine 10. This constant exhaust temperature also means that the power output level of the gas turbine 10 is constant. This provides the horizontal plateau for curve A of FIG. 2 over the base range C. In saying this, it is assumed that the second gas turbine control unit 45 includes the same kind of temperature control loop as that just described for the control unit 44. This is, in fact, the case.

Considering now the means for controlling the afterburner fuel valves 15 and 25, it is first noted that the master load reference signal on input conductor 42a is also supplied to the first input of a subtractor circuit 87. There is supplied to the second input of the signal subtractor 87 a signal proportional to the total megawatts actually developed by the power plant as a whole. This total actual megawatts signal is obtained from an adder 88 which adds the three megawatt signals obtained from the three megawatt sensors 18, 28 and 37. Over the load range extending from minimum load (approximately 20%) to the lower limit of the base range C (approximately 80%) the total megawatt signal from adder 88 will, under static load conditions, be equal to the load reference signal on input conductor 42a. Thus, over this load range (20% to 80%), the output signal from subtractor 87 will remain at a value of zero. Since this difference signal is the one that will ultimately by used to raise the afterburners 13 and 23 above their minimum operating points, this means that such afterburners 13 and 23 will remain at their minimum points over this 20% to 80% load range.

The difference signal from subtractor 87 is supplied by way of a proportional-integral (PI) circuit 88 and a high-low limiter 89 to the first input of an adder 90. A signal proportional to (a wee bit less than) the gas turbine exhaust temperature is supplied to the second input of the adder 90. This exhaust temperature signal is obtained from a proportional circuit 91 which receives the output of a high selector 92. The two signals supplied to the input side of the high selector 92 are proportional to the exhaust gas temperatures of the gas turbines 10 and 20. The greater of these is passed by the selector 92 to the proportional circuit 91 and thence to the adder 90. For simplicity of explanation at the present point, it is assumed that the two gas turbine exhaust temperature signals are substantially equal so that it doesn't matter which one is passed by the selector 92 to the adder 90.

The output of the adder 90 is coupled by way of a mode establishing switch 13f and a high limiter 93 to the input of the afterburner control 46. The output of the adder 90 is also coupled by way of a mode establishing switch 23f for the second afterburner 23 and a high limiter 94 to the demand signal input of the second afterburner control 47.

FIG. 5 shows the details of the afterburner control 46 which are pertinent to the present discussion. In particular, afterburner control 46 includes a temperature controller 95 which takes the form of a differential proportional-integral ($\Delta$PI) circuit. Temperature controller 95 subtracts the afterburner output temperature signal from temperature sensor 17 from the demand signal supplied by way of the high limiter 93. The resulting signal occurring at the output of the temperature controller 95 is supplied to the afterburner fuel valve 15 to adjust same to make the afterburner output temperature signal correspond to the demand signal from high limiter 93. In the 20% to 80% load range, the signal from subtractor 87 is zero under static conditions. The demand signal supplied to the high limiter 93 for this load range is the gas turbine exhaust temperature signal supplied to the second input of the adder 90 by way of the proportional circuit 91. This gas turbine exhaust temperature signal is passed on to and appears at the output of the high limiter 93. Thus, the afterburner temperature controller 95 operates over this 20% to 80% load range to make the afterburner output temperature approximately equal to the gas turbine exhaust temperature. What this means is that the afterburner 13 is not required to provide any supplemental heat and, hence, that the afterburner fuel valve 15 should be set at its minimum point.

The second afterburner control 47 is of the same construction as the first afterburner control 46. As such, it likewise includes a temperature controller for adjusting its fuel valve 25 to make its afterburner output temperature correspond to the demand signal coming from the second high limiter 94. At this point, it is noted that the limit values for the high limiters 93 and 94 are equal and are set to correspond to the load level or power level representing the boundary line between the base range C and the peak range D. Thus, no limiting action occurs over the 20% to 80% load range presently being considered. Since, both of the afterburner controls 46 and 47 are, at this time, being driven by the same demand signal, both afterburner control valves 15 and 25 are at their minimum setting over this 20% to 80% load range.

Assuming that the master load reference signal on conductor 42a is increasing so as to increase the total plant output level, then as the master load reference enters the base range C (approximately 80% to 95%), the temperature controllers in the gas turbine controls 44 and 45 commence to hold constant the exhaust temperatures of gas turbines 10 and 20. Thus, even though the total plant load demand is increasing over the base range C, the gas turbines 10 and 20 cannot provide any additional output power at this time. Over the base range C, the additional output power which is required is provided by the afterburners 13 and 23. The fuel valves 15 and 25 for these afterburners 13 and 23 are opened up to provide more and more supplemental heat to the steam generators 14 and 24. This increases the steam flow to the steam turbine 33 and, thus, increases the total plant output power.

In terms of the FIG. 5 controls, when the master load reference signal on conductor 42a enters the base load range C, then the total megawatt signal supplied to the subtractor 87 is no longer equal to the load reference signal. This is because the gas turbine power levels are now being held constant. Thus, an increasing error signal appears at the output of the subtractor 87. This error signal is supplied by way of units 88, 89, 90 and 93 to the afterburner control 46. it is likewise supplied by way of the high limiter 94 to the afterburner control 47. This error signal causes the degree of openings of both of the afterburner fuel valves 15 and 25 to increase to provide more heat to the steam generators 14 and 24. As the load reference signal continues to increase through the base load range C, this condition continues to prevail until the point is reached at which the high limiters 93 and 94 commence to limit or hold constant the demand signal passed to the afterburner controls 46 and 47. This limiting action sets in at the 95% level which represents the upper end of the base range C or, in other words, the boundary line between base range C and peak range D. Over the peak range D, the demand signal at the inputs of the high limiters 93 and 94 continues to increase but, due to the limiting action, the demand signals supplied to the afterburner controls 46 and 47 remain constant. Thus maximum firing of the afterburners 13 and 23 occurs at the upper limit of the base range C.

The error signal appearing at the output of high-low limiter 89 when the master load reference signal on conductor 42a is in the base range C is also supplied by way of a conductor 96, a closed switch 97 and a conductor 98 to the second input of the adder 73. The purpose in doing this is to ensure that both of the gas turbines 10 and 20 are, in fact, operating at their base range levels when the load reference is in the base range. In other words, the error signal from high-low limiter 89 is used to further boost the demand signals supplied to the gas turbine controls 44 and 45 to ensure that the gas turbine fuel valves 12 and 22 are at their base load settings. For the case presently being considered where all units are in the plant coordinated mode, this extra boost is perhaps not really necessary, at least under static conditions. As will be seen, however, it becomes important when one of the gas turbines is not operating in the plant coordinated mode.

Switch 97 is controlled by the same switch logic which controls the afterburner mode switches 13f and 23f such that switch 97 will be closed if either one of the afterburner mode switches 13f and 23f is in the plant coordinated (upper) position. The objective is to be sure that both gas turbines are running at the maximum level for the base range before either or both of the afterburners 13 and 23 is increased from its or their minimum settings or other previous settings. In this regard, gas turbines are considerably more efficient in terms of fuel usage than are afterburners. Thus, for best efficiency, the gas turbines should be run to the limit before the afterburners are used. The gas turbine boost connection represented by conductors 96 and 98 and the switch 97 (when closed) help ensure that this object will be met.

Before the power plant can be moved into the peak range D, it is necessary that the plant operator close a pair of switches 101 and 102. The effect of closing the switches 101 and 102 is to increase the set points for the temperature controllers in the gas turbine controls 44 and 45. This allows the gas turbines 10 and 20 to operate at levels above the upper base range limit previously established by the temperature controllers in the gas turbine controls 44 and 45.

The signal passed by the switch 101, when closed, is supplied by way of a high selector 103 and a subtractor 104 to the second input 86 of the adder 85 in the gas turbine control 44. The same base/peak limit set point signal is supplied to the second input of each of the high selector 103 and the subtractor 104. As a consequence, so long as the signal coming from the switch 101 is less than the base/peak limit set point, the output of subtractor 104 remains at a value of zero. In this case, the fixed or constant base/peak set point signal is passed by the high selector 103 to the subtractor 104 so as to be subtracted from itself to produce zero. With the output of subtractor 104 at zero, the set point signal for the temperature controller 84 remains at the base level set point value B. The value of the base/peak limit set point is selected to correspond to the demand signal that will appear at the output of the adder 90 when the plant power output level is at the upper limit of the base range C and under static load conditions. Thus, below this upper limit the output of subtractor 104 remains at a value of zero even if the switch 101 is closed. The base/peak limit value for the high selector 103 and subtractor 104 is the same as the limit value for the high limiter 93 which supplies the demand signal to the afterburner control 46. Thus, after the upper limit of the base range C is reached and plant operation moves into the peak range D, limiter 93 prevents any further increase in afterburner heat and, on the other hand, high selector 103 and subtractor 104 commence to allow the gas turbine 10 to increase its load level and hence its heat output.

The same type of arrangement is provided for the gas turbine control 45 for the second gas turbine 20. More particularly, the signal passed by switch 102 (when closed) is supplied by way of a high selector 105 and a subtractor 106 to the set point portion of the temperature controller located in the gas turbine control 45. The value of the base/peak limit set point signal supplied to the high selector 105 and subtractor 106 is the same as that for the high selector 103 and subtractor 104 and is also the same as the limit value for the high limiter 94 which supplies the demand signal to the afterburner control 47.

As the master load reference signal on conductor 42a moves into the peak range D (and assuming that switches 101 and 102 have been closed), the peak range increment of the increase in the signal appearing at the output of subtractor 87 is, in effect, supplied to the adder 85 and added to the base level set point signal B to, in effect, increase the set point to the temperature controller 84 by the amount of the peak range increase of the megawatt error signal appearing at the output of subtractor 87. This increases the error signal appearing at the output of the temperature controller 84. At the same time, the demand signal on conductor 77 has increased. The smaller of these increased signals is supplied by the low selector 83 to the gas turbine fuel valve 12 to cause a greater opening of same to cause gas turbine 10 to run at a higher power level and, hence, to produce more heat. Thus, the output power of the gas turbine 10 is increased as the master load reference signal is increased through the peak range D. The same thing happens for the other gas turbine 20 and its control unit 45 and fuel valve 22.

One further effect remains to be considered. During operation in the peak range D, it is desired that the output power level of the steam turbine 33 remain constant. Among other things, this is because the steam turbine 33 is, at this time, operating at its maximum design limit. On the other hand, the heat produced by the gas turbines 10 and 20 increases as the plant operation moves further into the peak range D. This would tend to increase the production of steam and, hence, to increase the power level of the steam turbine 33. This is prevented from happening by the action of the temperature controllers in the afterburner controls 46 and 47. In effect, the output signal from the high limiter 93 can be thought as the set point signal for the temperature controller 95. During operation in the peak range D, this set point signal is held constant. Thus, the temperature controller 95 operates to adjust the afterburner fuel valve 15 so as to hold constant the afterburner output temperature sensed by the temperature sensor 17. The same type of action is also occurring at the second afterburner control 47. In particular, the temperature controller in control unit 47 is controlling the fuel valve 25 for the second afterburner 23 so as to hold constant the afterburner output temperature sensed by the temperature sensor 27, this constant temperature level being the same as that for the first afterburner 13. Thus, the power level of the steam turbine 33 is held constant during operation in the peak range D. This is accomplished by reducing the heat produced by afterburner 13 and 23 as the heat produced by the gas turbines 10 and 20 increases.

Mode switches 10f, 13f, 20f, 23f and 33f determine whether the different individual turbine and afterburner units are operating in the plant coordinated mode or the operator adjustable mode. In the switch positions shown in FIG. 5 (upper positions), all of the turbine and afterburner units are operating in the plant coordinated mode. In order to shift any desired one of the units to the operator adjustable mode, it is only necessary to move its mode switch to the opposite position (lower position in FIG. 5). In the present embodiment, this is accomplished by the proper manipulation of the pushbuttons on the control panel 51 (FIG. 4). The mechanism for connecting the pushbuttons to the mode switches will be considered in detail only for the case of the steam turbine 33, it being understood that the same type of mechanism is used for each of the other turbine and afterburner units. With this in mind and with reference to FIG. 5, it is there shown that the mode select pushbuttons 33c and 33d for the steam turbine 33 and the master mode transfer pushbuttons 52 and 53 are connected to switch logic 33e which, in turn, is connected to and controls the position of the steam turbine mode switch 33f.

If the switch contacts for coordinated mode select button 33c are closed and then the plant coordinated transfer switch 52 is pressed, then switch logic 33e sets the mode switch 33f to the upper or plant coordinated mode position. Conversely, if the switch contacts for operator select pushbutton 33d are closed and the plant operator transfer pushbutton 53 is depressed, then switch logic 33e switches the steam turbine mode switch 33f to the operator adjustable mode position (lower position).

Switch logic 33e may include, for example, a bistable circuit which controls a relay coil which controls the mode switch 33f. When such bistable circuit is in its set condition, switch 33f is placed in one of its positions and, when the bistable circuit is in its reset condition, the switch 33f is placed in the other of its positions. Switch 33e may also include a first AND circuit receiving inputs from the switch contacts for the pushbuttons 33c and 52 for passing a signal to the bistable circuit for placing same in the condition which produces the setting of mode switch 33f to the plant coordinated position. Switch logic 33e also includes a second AND circuit receiving inputs from the switch contacts for the operator select pushbutton 33d and the plant operator transfer pushbutton 53 for supplying to the bistable circuit a signal for setting same to the condition which causes the mode switch 33f to assume the operator adjustable mode position.

The same type of switch logic is provided for each of the other mode switches 10f, 13f, 20f and 23f. For simplicity of illustration, such logic is not shown in the drawing. In each case, such switch logic connects the individual mode switch to the appropriate ones of the pushbuttons on the control panel 51.

When the mode switch 10f for the first gas turbine 10 is in the operator adjustable position (lower position), an operator adjustable reference signal source 107 provides a reference signal or demand signal which is supplied by way of switch 10f and conductor 77 to the gas turbine control 44 for purposes of setting the power level of the first gas turbine 10. The reference signal produced by the OA source 107 can be set to any desired load level or power level by the plant operator or plant engineer.

When the mode switch 20f for the second gas turbine 20 is set to the operator adjustable position, an operator adjustable reference signal source 108 provides the reference signal or demand signal for the second gas turbine control 45. When the mode switch 13f for the first afterburner 13 is set to the operator adjustable position, an operator adjustable reference signal source 109 provides the reference signal or demand signal for the first afterburner control 46. It also provides the set points adjustment signal for the first gas turbine control 44 when operating in the peak range. When the mode switch 23f for the second afterburner 23 is set to the operator adjustable position, an operator adjustable reference signal source 110 provides the reference signal or demand signal for the second afterburner control 47 and also the set point adjustment signal for the second gas turbine control 45. When the mode switch 33f for the steam turbine 33 is set to the operator adjustable position, an operator adjustable reference signal source 111 provides the reference signal or demand signal for the steam turbine control 48.

One further feature needs to be mentioned, namely, the functioning of the switches 10g and 20g when either of the gas turbines 10 and 20 is in the operator adjustable mode. When, for example, mode switch 20f for the second gas turbine 20 is in the operator adjustable position, this sets the switch 20g to the right hand position so as to also supply the operator adjustable reference signal from source 108 to the second (minus) input of the subtractor 75. This causes the megawatt reference signal at the output of subtractor 75 to become equal to twice the megawatt demand signal at the output of adder 73 less the megawatt demand signal provided by the operator adjustable source 108. Assuming that the first gas turbine 10 is in the plant coordinated mode, this causes the sum of the demand signals supplied to the gas turbine controls 44 and 45 to be the same as it would have been if both the gas turbines 10 and 20 were in the plant coordinated mode. Thus, if the OA demand signal for the gas turbine control 45 is less than the demand signal at the output of adder 73 by, say, a factor of 10 megawatts, then the resulting demand signal at the output of subtractor 75 will be greater than the megawatt demand signal at the output of adder 73 by a factor of 10 megawatts. This holds constant the sum of the power outputs of the two gas turbines 10 and 20 as the plant operator adjusts the value of the reference signal produced by the source 108 and hence the power level of the second gas turbine 20. The total gas turbine megawatts can, of course, still be changed by changing the value of the master load reference signal on input conductor 42a.

A converse type of situation occurs when the first gas turbine mode switch 10f is in the operator adjustable position and the second gas turbine mode switch 20f is in the plant coordinated position. In this case, it is the switch 10g which is shifted to the right hand position to receive the output of the operator adjustable signal source 107 for the gas turbine which is in the operator adjustable mode. When both of the gas turbine mode switches 10f and 20f are in the operator adjustable position, then both of switches 10g and 20g are set to the right hand positions, though in this case their setting is immaterial since the outputs of the subtractors 75 and 80 are not used in this situation.

Each of the mode switches 10f, 13f, 20f, 23f and 33f are also preferably provided with appropriate "bumpless transfer" circuitry so that there will be no sudden change in the demand signal leaving the mode switch when such switch is switched from one position to the other. Such bumpless transfer circuitry is not shown in the drawings for sake of simplicity.

Referring now to FIG. 6 there is shown in greater detail the nature of the load reference logic 42 of FIG. 3. The purpose of load reference logic 42 is to provide different choices as the manner in which the plant will be operated for the case where the plant has been operating with only one of the gas turbines 10 and 20 in operation and it is then desired to bring the second gas turbine into operation. (When one of the gas turbines is out of operation, its afterburner is also out of operation.)

When bringing the second gas turbine up from a zero power level to some desired power level above minimum load level, load reference logic 42 provides the following choices as to the mode of operation: (1) a "load control" mode wherein the control system is operated to hold constant the total plant output power; (2) a "gas turbine plus steam turbine block" mode wherein the control system is operated to keep constant the sum of the power produced by the gas turbine and the power produced by the steam turbine already in operation, the total plant power increasing by the amount of power added by the second gas turbine coming into operation; and (3) a "gas turbine block" mode wherein the control system is operated to hold constant only the output power of the gas turbine previously in operation. In the following discussion, it is assumed that the second gas turbine which is being brought into operation is operating in the operation adjustable mode and that the load level or power output level of such second gas turbine is being increased by operator adjustment of the operator adjustable reference signal source for that gas turbine. The particular load reference logic mode selected for use when changing from one gas turbine to two gas turbine operation is determined by the manner of manipulation of the reference logic mode control pushbuttons 54 and 55 located on the control panel 51 (FIG. 4).

Condidering first the "load control" mode where the total plant power is held constant as the second gas turbine is brough into operation, this mode of operation is established by momentarily pushing the load control pushbutton 54. With reference to FIG. 6, this places a switch 120 in its upper position so as to supply the load demand signal from unit 41 directly by way of a conductor 121 to the output conductor 42a running to the load distribution control unit 43. In this mode, the total plant output power is held constant at the value established by the demand signal from unit 41 because of the action of the subtractor circuits 75 and 80 and switches 10g and 20g previously considered in connection with FIG. 5. Assuming that it is the gas turbine 20 which is the second turbine being brought into service, then the operator adjustable reference signal supplied to subtractor circuit 75 via switch 20g serves to reduce the demand signal to the first gas turbine control 44 as the operator increases the operator adjustable demand signal to the second gas turbine control 45. This action is such as to hold the total gas turbine power and, hence, the total plant power constant.

With reference to FIG. 6, the pushing of the load control pushbutton 54 sets a bistable circuit 122 to its set (S) condition. This drives a relay coil 123 to place the switch 120 in the upper position, this being the position shown in FIG. 6. This will not occur if the gas turbine block pushbutton 55 is also pressed at the same time as the pushbutton 54. This occurs because a NOT circuit 124 disables an AND circuit 125 upon such occurrence, namely, the simultaneous depression of both of the pushbuttons 54 and 55.

The second and third operating modes which can be used when changing from one gas turbine to two gas turbine operation make use of memory circuits 126, 127, 128 and 129. Before the process of bringing the second gas turbine into operation is commenced, bistable circuit 122 will be in its set condition. This not only places switch 120 in its upper position, it also closes the additional switches 130-133 to enable the memory circuits 126-129 to receive input signals. At this time, memory 126 monitors the megawatt signal coming from the first gas turbine megawatt sensor 18 and memory 127 monitors the megawatt signal coming from the second gas turbine megawatt sensor 28. These two signals are also supplied to respective ones of adders 134 and 135. The megawatt signal from the steam turbine megawatt sensor 37 is supplied to both adders 134 and 135. Thus, the output signal at the output of adder 134 is equal to the sum of the first gas turbine megawatts and the steam turbine megawatts. The signal at the output of adder 135, on the other hand, is equal to the sum of the second gas turbine megawatts and the steam turbine megawatts. The adder 134 signal is monitored by the memory 128, while the adder 135 output signal is monitored by the memory 129.

The setting of a further set of switches 136-139 is dependent on which of the two gas turbines is the second gas turbine being brought into operation. If gas turbine 20 is the one just being brought into operation, then switches 136-139 are set in their upper positions as shown in FIG. 6. If, on the other hand, it is the gas turbine 10 which is just being brought into operation, then switches 136-139 are set to their lower positions (opposite of those shown in FIG. 6).

The setting of switches 136-139 is controlled by a bistable circuit 140 which drives a relay coil 141 which is mechanically linked to the switches 136-139. Bistable circuit 140 is, in turn, controlled by the status of the switch contacts for the coordinated select pushbuttons 10c and 20c for the first and second gas turbines 10 and 20. If the switch contacts for pushbotton 10c are closed, then a signal is sent by way of AND circuit 142 to place the bistable circuit 140 in its set condition. This signifies that the gas turbine 10 is the one already in operation and that such gas turbine 10 is operating in the plant coordinated mode. If, on the other hand, the switch contacts for pushbutton 20c are closed, then a signal is sent by way of an AND circuit 143 to place the bistable circuit 140 in its reset condition. This signifies that the gas turbine 20 is the one already in operation and that such gas turbine 20 is operating in the plant coordinated mode. If the switch contacts for both of the pushbuttons 10c and 20c happen to be closed at the same time, then no signal is sent to the bistable circuit 140. This is because an AND circuit 144 produces a signal which is inverted by a NOT circuit 145, which signal disables the AND circuits 142 and 143 upon such occurrence, that is, upon sets of switch contacts being closed at the same time.

If gas turbine 10 is already in operation, then switches 136-139 are set to their upper position as shown in FIG. 6. If, on the other hand, the gas turbine 20 is the one already in operation, then switches 136-139 are set to their lower positions.

The status of a further set of switches 146 and 147 is dependent on whether the second or third load reference logic operating mode is to be used when bringing the second gas turbine into operation. The second mode is the "gas turbine plus steam turbine block" mode where the sum of the in-service gas turbine power and the in-service steam turbine power is to be held constant. This mode is selected by simultaneously depressing both the load control pushbutton 54 and the gas turbine block pushbutton 55. When this happens, an AND circuit 148 supplies a signal to a bistable circuit 150 for purposes of placing same in its reset condition. Bistable circuit 150 drives a relay coil 151 which, in turn, controls the switches 146 and 147. When the second mode is selected by depressing both of the pushbuttons 54 and 55, bistable circuit 150 is placed in the reset condition and this sets switches 146 and 147 to their lower positions (opposite of those shown in FIG. 6).

If it is instead desired to use the third or "gas turbine block" mode, then only the gas turbine block pushbutton 55 is depressed. This sends a signal to the bistable circuit 150 by way of AND circuit 148a to place same in its set condition. This causes relay coil 151 to set the switches 146 and 147 to their upper positions (the ones shown in FIG. 6). NOT circuit 148b disables AND circuit 148a when both pushbuttons 54 and 55 are depressed at the same time. The third mode is the one where only the output power of the in-service gas turbine is held constant.

When either the second or third reference logic mode is being used, the switch 120 is set to its lower position (opposite of that shown in FIG. 6). This is accomplished because, for both of these block modes, the gas turbine block pushbutton 55 is depressed. This sends a signal to the bistable circuit 122 to place same in its reset condition. This causes the switch 120 to be placed in its lower position. It also causes the memory circuit input switches 130-133 to be opened. When such input switches 130-133 are opened, memory circuits 126-129 hold or memorize the value of the memory input signals occurring just before the instant the switches 130-133 are opened. These memorized signals apppear at the outputs of these memory circuits 126-129.

The switchblade of switch 146 is connected to the first (+) input of a differential proportional-integral (ΔPI) circuit 152, while the switchblade of switch 147 is connected to the second (−) input of such ΔPI circuit 152. The output of ΔPI circuit 152 is conneced by way of a high-low limiter 153 to the lower stationary contact of the switch 120. Switch 120 is preferably provided with bumpless transfer circuitry so that no sudden change on the output conductor 142a occurs when the switch 120 is switched from one position to the other. Such bumpless transfer circuitry has been omitted for sake of simplicity.

In the "load control" mode the constant total plant power mode, switch 120 is set to its upper position and the load demand signal for unit 41 is supplied directly to the load distribution control 43. Memory input switches 130-133 are closed to enable the memories 126-129 to monitor or follow the megawatt signals produced by megawatt sensors 18 and 28 and adders 134 and 135. The settings of the remainder of the switches is immaterial during this "load control" mode.

For the gas turbine plus steam turbine block mode (depressing buttons 54 and 55), switch 120 and switches 146 and 147 are set to their lower positions and memory input switches 130-133 are opened. If gas turbine 10 is already in service, then switches 136-139 are set to their upper positions. With these various switch settings, there is supplied to the positive (+) input of the ΔPI circuit 152 the constant signal being held in the memory 128, which signal indicates the previous value for the combined power of gas turbine 10 and steam turbine 33, this being the power which it is desired to hold constant. The signal supplied to the minus (−) input of the ΔPI ciruit 152 is the actual megawatt signal coming from the output of the adder 134. During the bringing into operation of the second gas turbine 20, the actual megawatt signal from adder 134 will increase because of the increase in steam turbine power as the heat from the on-coming gas turbine 20 increases. This changes the output signal at the output of the Δ circuit 152 and, hence, the load reference signal on conductor 42a so as to decrease the demand signal supplied to the gas turbine control 44 for the gas turbine 10 so as to compensate for the increase in the steam turbine output power. In this manner, the sum of the gas turbine 10 and steam turbine 33 output power is held constant.

If, on the other hand, it is the gas turbine 10 instead of the gas turbine 20 which is being brought into service, then the switches 138 and 139 will be set to their lower positions so that the memory 129 is, in this case, used to provide the fixed reference for enabling the gas turbine plus steam turbine power to be held constant.

When the third or "gas turbine block" mode is selected, then switches 146 and 147 are set to their upper position. If gas turbine 10 is the in-service gas turbine, then switches 136 and 137 are at their upper positions. In this case, it is the memorized gas turbine 10 power level stored in the memory 126 which is supplied to the plus (+) input of the ΔPI circuit 152. The signal supplied to the minus (−) input is the actual megawatt signal for gas turbine 10 as supplied by the megawatt sensor 18. If the actual signal differs from the memorized signal, then the output of ΔPI circuit 152 changes to change the demand signal to the gas turbine control 44 for the gas turbine 10 so as to bring the actual megawatt signal back into agreement with the desired megawatt signal being held in memory 126.

For the "gas turbine block" mode case where the gas turbine 20 is the one already in service, then switches 136 and 137 are in their lower positions so as to supply to the ΔPI circuit 152 the signal being held in the memory 127 and the acrtual megawatt signal coming from the megawatt sensor 28 for the gas turbine 20. the signal from ΔPI circuit 152 in this case holds constant the output power of the gas turbine 20 as the operator brings up or loads the on-coming gas turbine 10.

Not only does the control system of the present embodiment provide a high degree of efficiency but, in addition, it is also very flexible in its manner of operation, particularly under dynamic conditions where the plant power output level is changing from one level to another. For example, if the gas turbines 10 and 20 are somewhat slow in increasing their power outputs to meet a desired higher level of total plant output, then the afterburners 13 and 23 will automatically be turned on in an effort to increase the rate of increase of the total plant output power. This type of flexibility enables the plant to change to a new operating level or power level in a minimum of time.

As described in connection with FIGS. 5 and 6, the load reference logic 42 and the load distribution control 43 are implemented by analog control circuits. In the an alternate and preferred embodiment, the load reference logic 42 and the load distribution control 43 are implemented by a programmed digital computer. Generally, the inputs to the units 42 and 43 are inputs to the digital computer and the outputs from unit 43 are in the form of outputs from the digital computer.

PREFERRED DIGITAL COMPUTER EMBODIMENT

A. COMBINED CYCLE PLANT

1. GENERAL

Change bred by technological progress has brought many new dimensions to the electric utility industry.

In the past, as new and more efficient capacity was added to a typical system, older units with less efficiency were moved up to intermediate duty first and then, eventually, to peaking and/or standby status. However, in recent years the heat rate improvement of newly added units has been less dramatic, making this traditional shifting pattern less attractive. Also, average unit size is increasing, making future cycling duty of these units less desirable.

Furthermore, system power shortages have been aggravated by the recent rapid increase in the extent and duration of peak load demands. As a result, peaking units, initially installed to shave system "peaks," are, in many cases, now operating in excess of their optimum economic operating times. It appears then that the intermediate load band is now being met in many cases by a combination of displaced base-load units and overtaxed peaking units. With today's technology, this approach may not be optimal economics.

A more realistic approach is to recognize intermediate generation as a new need to be specifically satisfied. To attack this problem, a criteria should be established by combining the best features of peaking generation and base load generation since they blend to make up the intermediate range.

Good operating efficiency is the key to base-load operation. Fast starting, rapid load follow and short order-operational lead time are important to peaking. Capital cost should fall between base-loaded central steam plants and the peaking gas turbine plants. In addition, the escalation of field construction costs are rising at an accelerated rate over manufactured costs. To reduce this expense, a maximum amount of the plant work should be done in the manufacturing facilities.

It is easy to see why a combination cycle involving both gas and steam turbines would be best for intermediate-load duty. The Westinghouse PACE (Power At Combined Efficiencies) plant utilizes the inherent advantages of each cycle with a unique method of combining hardware.

2. SYSTEM ECONOMICS

When we look at the overall system economics, the simple gas turbine will generally be more economical than a nuclear plant when generating for 3,000 hours or less per year. The oil fired steam peaking plant will usually have better economics than the gas turbine or the nuclear plant in the band between 2,000 and 5,000 hours per year. From approximately 1500 hours per year out to about 7,000 hours per year, PACE will generate power at the lowest total cost. The actual band for maximum economy will vary with individual utility economics. However, in general, PACE will come out better than a simple gas turbine somewhere between 1,000 and 3,000 hours per year and will remain the most economical means of power generation out to about 5,000 to 7,000 hours per year. In some cases PACE will actually be the most economical means of power generation through the entire base load range.

3. PLANT DESCRIPTION

The PACE 260 consists of two W-501 gas turbines, and two steam generators. The output from both steam generators is fed into a single cylinder steam turbine designed with axial exhaust and generator drive from the high pressure end, to accommodate grade level installation.

The thermal operating cycle utilizes two gas turbines, each exhausting into its own heat recovery steam generator. Approximately 80% of the fuel is used in the gas turbines and 20% goes into the supplementary burners which raise the gas turbine exhaust from approximately 900° to about 1200°. The gases pass through the four sections of the steam generator exhausting at 340°.

Each steam generator contains a superheater, a high pressure evaporator, economizer, and low pressure evaporator. The units are designed to utilize forced or controlled circulation which provides a better capability to meet the rapid starts and transits associated with the gas turbine. The steam generator used in the PACE plant imposes no limits on operation of the gas turbines. Steam is generated at 1200 lbs. 950° and fed to a common header. A single cylinder axial exhaust steam turbine utilizes this steam to develop approximately $\frac{1}{2}$ of the total output. The steam turbine has a single extraction point from which steam is taken to the deaerating feedwater heaters which utilize not only extraction steam but also steam generated in the low pressure evaporator coil. At loads below approximately 80%, all of the steam required for feed heating is produced in the low pressure evaporators.

In the design of the overall plant, the prime objective was to obtain a relatively large block of highly efficient power that could be installed in a minimum of time and cost. Wherever possible, the plant is designed for simplicity of operation. Reliability is recognized to be an extremely important factor in power plant of this type since the plant must be capable of going on line with minimum operating attendance. Therefore, the basic design is targeted to allow plant operation at a load of at least 50 percent with any single component not operable. A number of features are included in the plant for operating simplicity:

1. The feed heating system was selected to allow for a single stage of feedwater heating while still retaining a good level of operating efficiency.

2. The system was designed so that bypass stacks and dampers would not be required while retaining operating flexibility.

3. Design features were included to allow self-regulation of steam temperature and pressure simplifying the control concept.

4. COMPONENT SELECTION

The key to matching the components for a specific plant is the relative sizes of the steam turbines and the gas turbines. Because of their unique design characteristics, the components are not available in an infinite number of sizes, and so must be combined to produce optimum efficiency.

Basic economics favor a combination of the largest gas turbine, heat recovery boiler, and steam turbine possible, pre-packaged for minimum installation time.

The largest Westinghouse gas turbine available on a production basis is the W-501 frame, which has a rating of approximately 80 MW.

The largest low-pressure, 3600-r/min steam turbines that can be packaged are the 23-, 25-, or 28.5-inch low pressure ends. These values refer to the last-row blade height of the steam turbine and are indicative of their flow capacity.

A single W-501 gas turbine would reach a limit on allowable firing temperature for heat recovery boilers before the boiler could produce a maximum allowable steam flow for a single-flow 23-inch end. Also, the resultant power level of approximately 125 MW was considered too small for most utility intermediate-peaking applications. However, the application of two W-501 gas turbines could produce sufficient steam in the boilers to reach the maximum allowable exhaust steam flow from either a double flow 25" or a single 28.5"end. The amount of firing required is about 1100°–1200° F. which are reasonable values for packaged boilers. Therefore, a combination of the two W-501 gas turbines and a single 28.5" end steam turbine was chosen in order to maximize the power production of the plant which corresponds to lowest cost.

The application of two W-501 gas turbines can produce sufficient steam in the boilers to reach the maximum allowable exhaust steam flow for either a double flow 25-inch end or a single 28.5-inch end. The amount of firing required is about 1100–1200 degrees F. which are reasonable values for packaged boilers. The 28.5-inch end was chosen in order to maximize the power production of the steam plant which corresponds to lowest cost.

5. GAS TURBINE

The W501 gas turbine incorporated into the PACE plant utilizes all of the proven Westinghouse design features including single shaft two bearing construction, in which no bearings are located in the high pressure high temperature zone. The bearings are accessible without lifting the major equipment casings and power is taken from the cold or compressor end of the machine to avoid potential misalignment problems. Cooling air is taken out of the combustor shell, externally cooled and filtered and returned to the turbine to cool the first two stationary vanes and the first rotating row. In an application where the turbine is applied in base load duty, it is extremely important that the cooling air used be filtered as cooling passages in the blading are quite small. The turbine exhausts axially to provide a most efficient flow entrance into the supplementary fired waste heat boiler.

The gas turbine includes a variable inlet guide vane which is used to adjust compressor air flow during the starting cycle and to increase part load efficiency.

A number of important changes have been made in modifying this unit for application in the PACE plant. The opened air cooled generator has been replaced with a hydrogen cooled generator that not only reduces the noise emitted by the plant but in addition eliminates the need for the air filter pads and their associated maintenance. The gas turbine and its inlet system remain relatively unchanged; however, the exhaust stack silencer is removed and the turbine exhaust gases are ducted directly into the steam generator. The oil to air cooler, located on top of the auxiliary package is removed and replaced by oil to water heat exchangers which not only provide better packaging and reduced installation costs but also eliminates a noise contributor. The control module is removed and the entire system is controlled from a central control house.

6. STEAM TURBINE SYSTEM

The steam turbine is designed specifically for the PACE application, (Note #2). It is a single cylinder axial exhaust unit whose design allows grade installation with a centerline elevation of 10 feet. The steam turbine drives through the high pressure end and an automatic turning gear similar to that used in the gas turbine is incorporated on the end of the exciter.

The condenser has also been designed for maximum packaging and system reliability. Each of the two tube bundles is shipped fully tubed and has been designed to meet the limits of the largest shippable module. The hotwells and water boxes are divided so that the condenser functions as if the plant actually contained two separate half sized units. With one section completely down, the limit of 5 inches of Hg imposed by the steam turbine is not exceeded.

7. STEAM GENERATOR

The steam generator which matches the gas and steam turbine is also a packaged unit to minimize installation time. Selection of the basic cycle parameters for a heat recovery steam generator begins with the choice of steam turbine inlet conditions: Inlet steam pressure determines what the saturated steam temperature in the evaporator must be; inlet steam temperature determines how much energy must be added to the saturated steam as superheat; and the approach temperature selected (normally 5 to 20 degrees F.) determines how much energy must be added to water coming into the evaporator to bring it up to saturation temperature. The sum of those energy requirements is the energy required for each pound of steam flow through the turbines.

The steam generator is designed as a basic heat exchanger with external high and low pressure steam drums. The unit uses forced or controlled circulation to provide for rapid load changes and start-up. The low pressure steam drum has no internals since all of the steam produced in the low pressure coil is utilized for feedwater heating. The high pressure steam drum is of vertical design following nuclear steam generator design practice. Tests performed in both laboratories and the field have demonstrated that Westinghouse steam separation technology will more than meet the requirements for long life superheater operation.

The circulating pump is a vertical unit in which all of the bearings are outside of the fluid flow path. Floating ring seals are used to provide high reliable long life pumping assembly.

The horizontal tube surface utilizes serrated finned tubing arranged in serpentine coils. Each tube in any one section of the steam generator has the same circulation rate as any other tube in that section. This allows the design of the unit to be stable in operation over the entire load range. All of the tube surface is fully welded. Again, to allow the steam generator to follow the gas turbine characteristic in its ability to respond rapidly to load variations.

8. ENVIRONMENTAL EFFECTS

The gas turbine combined cycle is unusually good in having minimum environmental impact. Not only does it achieve an extremely high efficiency contributing to the conservation of fuel resources but it achieves this efficiency with relatively little thermal enrichment to the cooling media. In addition, emissions to the atmosphere, are less than any other type of power generating source using fossil fuels. The Westinghouse combustion system not only operates without smoke emission, while burning most normal turbine fuels; but in addition, because when operating on liquid fuel, the burner does not require an atomizing media. The air atomization holes used during the startup procedure are available for injection of water which reduces $NO_x$ concentrations well below the most stringent air pollution regulations in effect today.

Combustion contaminants, which are generally defined as any material in the exhaust gases other than $NO_x$ and sulfur combustion products are also kept to a very low level. Contaminants generally consist of unburned hydro-carbons, sulfuric acid formed by the combustion of sulfur with water vapor, and carbon representing the smoke constituent. These combustion contaminants can be kept to a level that meets the air pollution regulations of the Los Angeles control board which is among the most stringent in the United States (10 lbs/hr for each power generating unit).

B. TOTAL PLANT ENERGY MANAGEMENT

1. GENERAL

A total energy management approach is employed to control the combined cycle plant power. New control system requirements are employed with this approach. These new dimensions include factory packaging of the plant control building in transportable van modules, integration of the control equipment within the van structure and a unique approach to provide systems quality assurance. The systems quality assurance utilizes a 100% real time dynamic simulation of every cable interconnecting the plant with the controller.

The best features of the modern day technologies—analog, wired logic and software were selected to implement an optimum hybrid configuration. A direct result is high plant operational availability. The controller configuration utilizes wired logic for the plant protection, solid state analog control, dual PRODAC 2000 computers and a unique real-time software package, PACEWARE, to implement total plant coordinated control. Loss of either or both computers results in no plant generation loss. Critical analog loops are redundant on a plant module basis.

On-line maintenance of both the analog and digital systems is designed into the basic configuration. Single operator operation is provided with the coordinated mode of control. This allows either the control dispatch computer or the operator to set the desired load and then function only as an observer. In the event of a plant malfunction, the operator can control the generation of each unit from a central panel.

The introduction of a total management energy concept to combined cycle power brings a new dimension of sophistication to the industry. This meets the varying load and frequency demands of the modern power system and provides a unique tool to support power grid system security requirements.

PACE is an acronym applied to the packaged pre-engineered combined cycle power plant of the present assignee. It stands for Power At Combined Efficiencies. The PACE 260 is a combined cycle power plant for intermediate peaking with particular emphasis on design features resulting in simplified control and operation. The PACE plant has a rating of 260 MW and a heat rate of 8,500 Btu/KwHr. The plant can be located on a site approximately 250 ft. square. It includes two gas turbine steam generator modules feeding a common header which supplies steam at 1200 lbs. 950° to a packaged steam turbine generator. Each of the major turbine assemblies has auxiliaries packaged in weather proof acoustical enclosures adjacent to the turbine. From the control room, a single operator can control the entire plant. An additional roving man is required for approximately one shift per day to take steam samples, check the chemical feed system, and walk thru inspection of the various equipment modules. In addition, it may be desirable to have an instrument technician available for maintenance on a one shift basis.

In addition to basic plant considerations, the application of combined cycle power has grown from a few isolated units to the present day configurations that are utilized with large interconnecting ties that demand area load and frequency control to meet the overall power grid system security requirements. No longer can the control systems engineer consider only subsystem control of each section of large rotating apparatus. Instead, each subsystem must be coordinated by a centralized control concept such that remote coordinated control of the plant can be achieved from a single point.

Along with power grid remote control, coordination is provided for all elements of the system through all operating modes—from startup to full load including both transient and steady state conditions along with any plant apparatus malfunctions. PACE 260 plants are used for either peaking or base load and the control system is designed for maximum plant availability.

It is assumed and recognized that faults will occur in the controller subsystems. However, by utilizing parallel equipment, a concept of *No Generation Fault Control* is implemented.

Finally, in the installation of modern day control, testing of the system and the training of the operators can no longer be left to the field. Instead, advantage is taken of the factory packaged centralized control room and a 100% dynamic simulation is provided for each cable entering and leaving the control room in real time. Thus, full dynamic operation of the control system is obtained that previously was only obtained by complex simulators in the nuclear power industry.

2. TOTAL ENERGY MANAGEMENT NEEDS

Over the past decade, electrical energy shortages have been aggravated by the recent rapid increase in the extent and duration of peak load demands. A direct result has been that peaking units initially installed to minimize the load "Peaks", in many cases operate in excess of their optimum economic operating level. Often the intermediate load band is not being met by a combination of displaced base load units and overtaxed peaking units. With today's power plant technology, this approach may not be optimal economics.

A more realistic approach is to recognize intermediate generation as a unique power grid requirement needed to meet varying load system security requirements. The ultimate solution rests with a power plant design that is established by combining the best features of peaking and base load generation which blend to make up the intermediate load range. While good operating efficiency is the key to base load operation, fast starting, rapid load follow and short order operational lead time are important to peaking. It then becomes a simple design decision to select a combination cycle involving both gas and steam turbines as optimum for intermediate load duty. The PACE 260 Plant utilizes the inherent advantages of each cycle with a unique method of combining hardware.

The intermediate range of power plant operation places stringent demands on the design of the control system. The designer cannot be satisfied with a simple subsystem controller for each unique section of the plant and assume the operator will coordinate the power plant to meet the needs of power grid area load and frequency control. Instead, the operator must function as an observer, able to handle abnormal conditions resulting from a system malfunction.

Once the needs of coordinated control required to meet power grid operation and the operator observer concept are established, it becomes obvious that non-integrated subsystem control is inadequate. The requirement for the total energy management of the power plant becomes evident. From this overall power grid approach, two simple and direct operational requirements are defined for the PACE system:

(1) Maximum generation availability to the power grid with centralized area load and frequency control.
(2) And, second, a centralized controller configuration designed for minimum operations staffing.

Additional installation requirements demand a centralized control approach with plant interconnecting cables that are factory manufactured and tested such that no screw terminations are required. Also, the total control system including operations consoles, voltage regulators, protective relaying, controller and power supplies are all factory tested in real time with a dynamic simulator. And, at last, a new dimension, the final system is used for operator training at the factory.

3. MAJOR PLANT FEATURES RELATED TO TOTAL ENERGY MANAGEMENT

(a) AUTOMATION AND CONTROL

Coordinated Control—A centralized operator panel allows the operator or dispatch center to request a megawatt plant level at a specified rate and have a master control to bring together the functional operation of the two gas turbines, two heat recovery steam generators, steam turbine and the balance of the plant with the operator only observing the unit performance.

Operator Automatic—The operator from a central panel, has the ability and added flexibility to control the generation level of each individual generating unit as desired when in any plant non-coordinated operating configuration, with the same high degree of information and display available to the operator as is available in coordinated control.

Operator Analog—The operator from a central panel has the capability to start and load the full plant operating configuration when the digital system is not available.

Operator Manual—The operator has available manual operation stations, direct to the process, such that in the event of two failure modes, coordinated and analog, the plant can still produce power.

Plant Protection System—The protection system is always in operation.

Bumpless Transfer From One Control Operating Level to Another—The manual control system tracks systems operation during automatic control so that it is ready to accept control at the operator's discretion or under contingency conditions with no plant valve movement at the moment of transfer. Similarly, all higher levels of control implementation digital or analog track manual operations are ready to accept control on the request of the operator providing the plant equipment status permits the next higher level of control.

Plant and Unit Loading Rates—Under plant coordinated control, each generation unit is loaded at its optimum loading rate required to meet the desired plant generation level as constrained by the availability of plant equipment.

Fast Plant Startup—The plant is intended for either peaking or base load operation and the control system brings the entire plant from hot start to full power in minimum time under plant coordinated control.

Improved Gas Turbine Heat Rate—This is obtained by modulation of the gas turbine inlet guide vanes.

Automatic Plant Sequencing—The operator participation during startup and shutdown under coordinated control is limited to observation. Lower control operating levels requiring more operator participation are available as discussed above. However, operation at the lower levels is checked by protective systems and the operator may be automatically overriden to protect the plant.

Surge, Overspeed, Vibration and Temperature Protection—All these critical areas are protected during operation in all control levels.

(b) AVAILABILITY AND MAINTAINABILITY

High Net Plant Availability—No single failure of a control component will reduce generation less than 50%.

On-Line Maintenance—Maintenance panels are provided as an integral part of the control system such that controller fault analysis and calibration can be accomplished with the plant on line.

Redundancy of Control Equipment—Redundancy of control equipment is available to insure that no single component failure results in less than a 50% decrease in generating capacity.

(c) INSTALLATION

Centralized Control—All control systems are located in a centralized control room.

Plant Interconnecting Cables—All control plant interconnecting cables are factory assembled, tested and use quick disconnect hardware.

Factory Testing—The entire control system is factory tested in real time operation as a unit.

Operator Training—The simulator is of such a quality that the actual control system can be used for operator training before shipment.

4. PACE TOTAL ENERGY MANAGEMENT

(a) HARDWARE AND SOFTWARE CONFIGURATION SYNTHESIS

The synthesis of the total energy management concept for a factory packaged power plant included at the outset the design of controller plant modules. The controller modules are required to become the plant control building in the field installation. They are tested with all the electronic equipment installed at the factory and shipped by trailer truck as a complete control system.

To meet the varying plant operational requirements, the control system designer is ever challenged to choose among random access memory digital controllers, relay and solid state logic and analog components. The final selection becomes complex for the hardware and software configurations as each particular system application depends on the following factors: Complexity and control decisions, flexibility of control criteria, response, reliability, on-line maintenance and economics. All the factors must be considered simultaneously if the optimum configuration is to be selected. First, the functional describing the cost versus complexity is established. Then, the need to develop a simple mathematical model that is capable of expressing the plant availability requirements. This model must also provide a direct translation to working hardware and software. The functional relationship is shown in FIG. 6B.

Figure 6B:
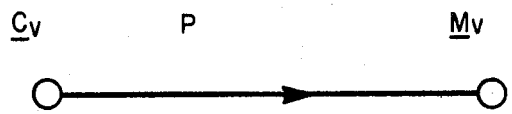
FIGS. 6B-6F show various vector charts illustrating the synthesis of the combined cycle plant control system.

The signal flow diagram approach provides the model in a descriptive manner as shown for the plant in FIG. 6B where:

$C_v$ = Total Plant Control Vector
$M_v$ = Total Plant Measured Variable Vector
$P = G_1 + G_2 + G_{st}$
$P$ = Total Plant Matrix defined by two gas turbines and a steam turbine

(b) PLANT TRIP PROTECTION SYSTEM

Figure 6C:
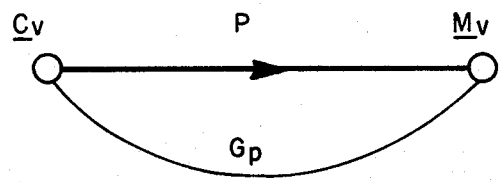

The Plant Protection Trip System is defined as automatic and always must be in operation as shown in FIG. 6C where $G_p$ = The Protection Matrix. $G_p$, the protection matrix, implements the plant protection system. A detailed analysis of the Matrix $G_p$ demonstrates the need for simplicity and for independent paths to achieve reliability. In addition, the potential electrical noise of the measured variables must be considered. This makes the selection of a random access controller prohibitive from both a cost and availability viewpoint. In the protection area, therefore, relay and solid state logic are employed.

(c) PLANT OPERATOR MANUAL SYSTEM MODE

Figure 6D:
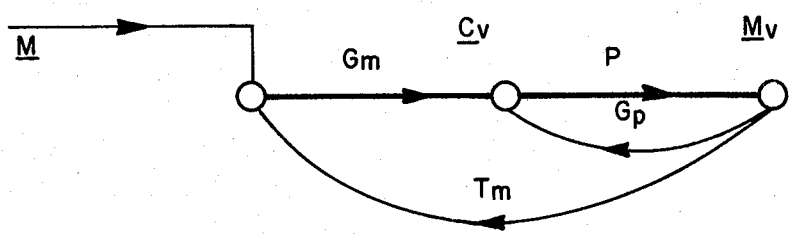

The manual system must enable the operator to control valve positions from an automatic-manual station. However, during the manual operation, the protection must still be capable of overriding the manual control to protect the plant if necessary. The plant flow diagram with manual is shown in FIG. 6D where:

M—Automatic-Manual Station Control Vector
$T_m$ = Measured variable transformation vector for minimum feedback and display signals to allow manual operation.
$G_m$ = Manual control matrix including the interface to all plant actuators, motor control centers, etc.

Again, a detailed analysis of the manual matrix indicates an analog system because the number of control decisions remains critical.

(d) PLANT OPERATOR AUTOMATIC MODE

Figure 6E:
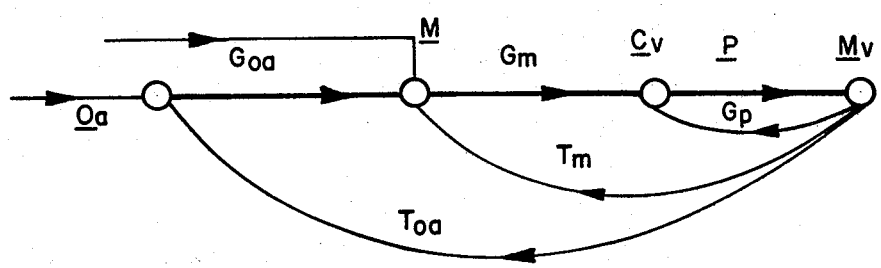

The plant operator automatic mode becomes a very sophisticated control system because the operator must be able in this mode of operation automatically to start up either gas or steam turbines by just setting the desired level and hitting the "go" button. However, in no way can a fault in this mode of operation result in loss of generation. Therefore, the signal flow diagram is like that shown in FIG. 6E where:

$G_{oa}$ = Operator Automatic Controller Matrix
$T_{oa}$ = Transformation matrix to select and conditions the measured variables required for control.

This signal diagram demonstrates the feature that failure in the $G_{oa}$ Matrix controller or the measurement matrix result in no loss of generation. However, the control decisions and complexity now demand consideration of a random access controller and it is at this point in the definition of the configuration that hybrid technology is utilized.

(e) PLANT COORDINATED CONTROL MODE

Figure 6F:
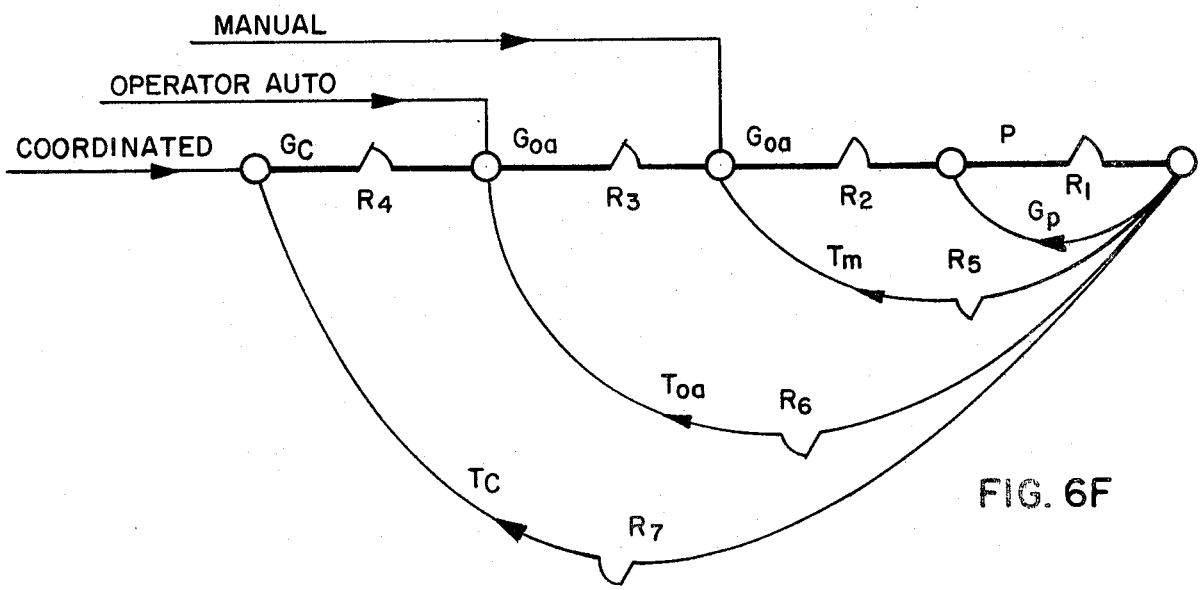

The highest level of control is the coordinated mode where the plant operator or the power grid dispatcher can request 260 megawatts and obtain the power in approximately one hour with the operator acting only as an observer. The total PACE control signal flow diagram is shown in FIG. 6F.

The Reliability state vectors $R_1$ through $R_7$ define the probability of a failure taking place in their respective multivariable signal paths. The entire vector can fail or only a single variable. A simple example is demonstrated with the vector $R_1$. $R_1$ represents the plant status such that either gas turbine or steam turbine can be taken out of service with only partial loss of generation. Likewise, partial failures can occur in the controller configuration with only reducing the level of automation instead of loss of plant generation.

It becomes evident from this diagram that the plant protection matrix becomes the critical reliability thread and must be in service to retain no loss of generation. Therefore, this system becomes a minimum component controller implemented with independent wire logic.

The coordinated matrix, $G_C$, and the operator automatic matrix, $G_{oa}$, require complex control decisions and action and these controllers are implemented with a hybrid configuration.

5. TOTAL ENERGY MANAGEMENT OPERATIONS OF THE PACE PLANT

The hybrid automation and control system allows full operation of the entire plant by a single operator. The highest level of plant automation, coordinated control, is achieved with dual PRODAC 2000 computers, data link and disc storage. Their associated input/output equipment and a programmer's cabinet, are located in the third control module. One computer is used basically for plant information and display, sequence of events parallel to each annunciator drop, post disturbance analysis, historical logging & trending and automatic steam turbine startup. The second computer performs the entire control function. Failure of either or both computers results in no generation loss.

The computer input/output equipment is separate for each gas turbine and for the steam turbine. This hardware segregation and duplication allows on-line maintenance of a given section of the control without danger of tripping the entire plant. The computer programmer cabinet includes a selectric typewriter for input and output, a tape reader and a punch.

The solid state analog control system consisting of eleven cabinets of equipment is designed also on a plant segregation or modular basis to allow maximum reliability and on-line maintenance. As in all other sections of the system, arrangement of this equipment is modular, with separate cabinets for each gas turbine, heat recovery steam generators, steam turbine and the balance of the plant.

6. PACE PLANT OPERATING MODES

PACE plant operational characteristics include both steady state and transients which may exist for some period of time. The total plant operation is defined by the following matrix. Each major mode and its resulting functions are listed in the following table for each section of the plant.

Hot Standby—Ready to Start—The plant can reach full load in one hour from this condition.

Running Mode—The turbine generators selected for operation are running at 3600 RPM and all associated auxiliaries are in normal operation. Excitation has been applied to the generators and all equipment is ready for synchronization. The running turbines are operating primarily on speed control and the afterburner is firing. The steam turbine bypass acts as a back pressure control to maintain 350 psia in the main steam header.

Power Generation—Gas Turbine Only—When the steam turbine is not needed for power generation or is shut down for routine maintenance, the gas turbines can be used alone to generate base load power. Generated steam can be bypassed to the condenser, or the heat recovery steam generators can be drained and vented.

Power Generation—Combined Cycle—When the steam turbine-generator is to be started with one or both gas turbines, the gas turbines are synchronized first, then the steam turbine. The steam temperature required to roll the steam turbine (determined by the steam turbine rotor temperature) is attained by loading the gas turbines and/or firing the afterburners. It is also possible to start the plant with one gas turbine and the steam turbine, then bring the second gas turbine on-line later.

Regardless of the combination of equipment selected

| Operating Mode | | | |
|---|---|---|---|
| Plant Coordinated | | TOTAL PLANT<br>Plant Automatic Startup<br>Plant Automatic Shutdown<br>Plant Electric Load<br>Plant Protective Systems<br>Trips<br>Limits<br>Runbacks<br>Runups | |
| Operator Automatic | GAS TURBINE<br>Automatic Startup<br>Automatic Shutdown<br>Turbine Generator Auto-Sync<br>Turbine Speed<br>Turbine Load<br>Turbine Temperature<br>Inlet Guide Vanes<br>Protective Systems:<br>Overspeed<br>Surge<br>Temperature Limits<br>Trips<br>Inlet Guide Vane Limits | HEAT RECOVERY STEAM GENERATOR<br>Automatic Startup<br>Automatic Shutdown<br>Afterburner Automatic Synchronization<br>Afterburner Automatic Shutdown<br>Gas Temperature<br>Drum Level<br>Feedwater Treatment<br>Protective Systems:<br>Boiler Feed Pump Recirculation<br>Economizer Recirculation<br>Steam Overpressure<br>Temperature Limits<br>Minimum Steam Temperature | STEAM TURBINE<br>Automatic Startup<br>Automatic Shutdown<br>Turbine Speed<br>Turbine Load<br>Deaerator and Hotwell Level<br>Steam Header Pressure<br>Protective Systems:<br>Overspeed<br>Throttle Pressure<br>Trips<br>Condensate Pump<br>Recirculation |
| Operator Analog | Automatic Startup<br>Automatic Shutdown<br>Protective Systems:<br>Overspeed<br>Surge<br>Temperature Limits<br>Trips<br>Inlet Guide Vane Limits | Automatic Startup<br>Automatic Shutdown<br>Afterburner Automatic Start<br>Afterburner Automatic Shutdown<br>Gas Temperature<br>Drum Level<br>Feedwater Treatment<br>Protective Systems:<br>Boiler Feed Pump Recirculation<br>Economizer Recirculation<br>Steam Overpressure<br>Temperature Limits<br>Minimum Steam Temperature | Deaerator and Hotwell Level<br>Protective Systems:<br>Overspeed<br>Throttle Pressure<br>Trips<br>Condensate Pump<br>Recirculation |

The PACE Controller has several steady state major operating modes.

by the operator for power generation, the control system offers a choice of four control operating levels:

plant coordinated control, operator automatic control, operator analog control and manual. However, it is not necessary for all generating units in the system to be operating at the same control level at the same time. One unit may be at the operator analog level and another at operator automatic. Therefore, the control subsystems can be used on different control levels at a given time for added plant flexibility. Plant coordinated control and operator automatic control require that the digital computer control system be operative. Loss of the information monitoring and display computer does not preclude plant coordinated control when in the generation operating mode (i.e. all breakers closed) or operator automatic control at any time, because all of the essential display functions are provided by the analog display system. Automatic startup of the plant is not possible unless the information monitoring and display computer is operating because it includes the automatic start program for the steam turbine. In case of failure of one or more control subsystems, plant coordinated control can be maintained for the rest of the system and only the affected equipment rejected to a lower control level. In case of failure of critical portions of the digital control system, the entire plant is automatically placed on operator analog control.

7. PLANT COORDINATED CONTROL

At this level of control, the plant achieves the highest possible level of automation from hot standby to preset load. Operator activity is limited to selecting the fuels, the operating configuration and the total plant electrical output. In this mode the plant is operated at maximum efficiency by the control system. Coordinated control can be selected by the operator either when the plant is in hot standby condition (in which case the system coordinates the startup, synchronization and loading of all units) or after all equipment is generating power (loading only is coordinated).

Quick plant startup and loading are essential to the combined cycle power plant, particularly when it is used for peaking. Therefore, the plant coordinated control system is programmed to bring all three generating units on line in approximately one hour.

Sequence control, ramp and limit functions for the steam turbine are provided by programs in the control computer Steam turbine inlet and rotor temperatures are monitored to determine allowable steam turbine acceleration and loading rates. The control system at this level forces the transition from hot standby condition to synchronous speed (for both gas turbines and the steam turbine) and after the units have been synchronized automatically, it loads the system to the preset reference and produces the load automatically at the optimum heat rate. During operation in the coordinated control operating level, a maximum amount of information on the plant is displayed to the operator on the coordinated control console and is available as hard copy print out in typewriter located in the operations control center.

Since the digital and analog controls are not two separate and parallel systems but interacting controls which work together in this mode, the analog controls are constantly ready for bumpless transfer to operator analog control should the control computer fail.

When coordinated control has been selected with the plant in hot standby condition, the control system first checks the validity of the equipment configuration selected by the operator, then checks the equipment and the plant to make certain that all equipment is ready to be started. It then starts the HRSG feed pumps, opens stack covers, lights the afterburners, sets and holds temperature setpoints and establishes levels of unit operation as required to maintain safe plant operation at the required level. The sequence has been arranged so that at any point at which the preselected plant load setpoint is reached, the plant will be operating on the optimum heat rate curve.

With either one or two gas turbines and the steam turbine operating, KW control of the total plant output is maintained by the variable load reference setpoint which is entered through the data entry panel in the operations control center. Deviations of actual load from the load reference setpoint initiate load increase/decrease instructions to the gas turbines and firing rate increase/decrease instructions to the waste heat boiler. Coordinated control programs change gas temperature setpoints to keep steam temperature and temperature rate within allowable limits.

As the value of the load reference increases, the gas turbines are loaded equally until base load is reached. Beyond this point, the afterburner firing rates are increased together until maximum fired gas temperature or steam pressure is reached. If the operator selects peak load operation, further increases of load reference cause turbine loads to increase until peak load is reached. This sequence is the same if only one gas turbine and waste heat boiler are in operation. The loading rate is determined by gas temperature ramps which are preset in the computer.

Total plant electrical output is prevented from exceeding minimum and maximum limits. If plant auxiliaries, such as condensate, circulating or cooling pumps, should fail, plant output will be limited indirectly by halting the operation of certain system components (for example, stopping the afterburners in case of a condensate pump failure).

Regardless of the combination of equipment selected for coordinated control, the KW control system is sensing total plant load and adjusts the plant output accordingly Thus, if a unit is removed from coordinated control, future adjustments to the system are made with those remaining on coordinated control. Bumpless transfer onto or off of coordinated control is assured for the total system and for individual units. Automatic rejection of the steam turbine and boilers to a lower level of control occurs whenever a malfunction is detected in either the hardware or the software. The nature of such a transfer depends on the amount of control lost. The system is designed to maintain the highest level of control operation that permits safe operation.

8. OPERATOR AUTOMATIC CONTROL

Any part of the system may be selected by the operator for operator automatic control by use of switches in the operation control center. When the steam turbine is on operator automatic control, the operator can use pushbuttons on the steam turbine control console to set the target speed reference and the acceleration rate instead of using the automatic turbine start capability. He may choose automatic synchronization, but it is not mandatory.

If operator automatic control is selected for one or both of the gas turbines, pushbuttons on the gas turbine control consoles are used to start or stop the turbine. The operator may choose automatic synchronization, or he may use pushbuttons to operate the field breaker and the generator breaker for manual synchronization.

The operator can also select load or temperature control, enter the MW reference and reference ramp and hold and restart the control reference ramp.

9. OPERATOR ANALOG CONTROL

The analog control system is designed to provide for full and safe operation of the total plant or any part of the plant by the plant operator. Provision is made for startup in any selected plant operating configuration and for operation of the plant at any load. The system is capable of accepting transfer of the plant from coordinated control or operator automatic control at any time; since the digital and analog controls are interacting in both of those control operating levels, transfer to operator analog level is completely bumpless. Since maximum use of the digital controls is anticipated, the analog control system is not a 100% duplication of the digital systems. For example, no provision is made for closed loop megawatt control in the analog system. In addition, the display system is confined to essential indicators, warning lights and annunciators. Protective trip circuits are in analog hardware only.

During analog operation, steam turbine and heat recovery steam generator valves are positioned by automatic/manual stations on the control consoles in the operations control center. Analog subloops maintain operator-selected setpoints. Automatic/manual stations are provided for the afterburner fuel throttle valves, the superheater bypass valve, both feedwater valves, makeup return and condensate valves and the economizer recirculation valve. The four electric heaters are controlled as a single unit from a three-position switch on the steam turbine control console. Pushbuttons on the panel are provided for manual control of the low and high-pressure circulation pumps, the standby boiler feed pump, each of the condensate pumps, the main boiler feed pump and the chemical feed pumps. If the gas turbine-computer interface fails or the entire control computer is inoperative, the plant operator has manual controls to start or stop the gas turbines, select the fuel to be used and to transfer from one fuel to another at a preselected rate, select the firing temperature limit, select the fuel control and inlet guide vane control signals.

10. PACE CONTROL PROGRAMS

Control programs for the PACE control system are based on the Westinghouse PROGEN software system with its efficient file management system which minimizes memory storage requirements. Disclosure on PROGEN is set forth in referenced case Ser. No. 250,826. Control chains representing the tasks to be performed keep program execution time low. Sequence logic is provided as necessary to assure the orderly changes in equipment status needed to bring the system on-line automatically.

Gas Turbine fuel ramp control is generated by the computer as a function of the desired acceleration rate. After synchronization, the speed reference for the gas turbines is set for maximum load at approximately 106% regulation. The speed reference for the steam turbine can be indexed by the automatic turbine startup program, the automatic synchronizer or the operator, depending on the level of control. The rate of change of the speed reference can be adjusted up to the preset maximum by the automatic turbine startup program or by the operator. Under operator automatic control, the operator controls gas turbine load by use of dedicated pushbuttons and digital system keyboard to set desired load setpoint and loading rate.

Control programs for the steam turbine include automatic startup and load control up to the point where all generated steam is passing through the turbine with the steam turbine control valve fully open. Both hardware and software protective features are provided to assure safe turbine operation at any level of automatic operation.

11. CONTROL SYSTEM PROTECTIVE FEATURES

The control system for PACE power plants utilizes hardware and software protection systems to assure the utmost reliability of the total plant. Whenever an operating unit fails, associated equipment is tripped automatically if necessary to protect the equipment. When a computer element fails, control is rejected to the next lower level of control which is operable. Some of the other major protective features are listed below:

- Redundant signal transmission assures the reliability of essential measurement signals, blade path temperatures, gas turbine speed and drum level.
- Continuous monitoring and display provisions for all critical turbine generator temperatures and vibrations are independent of the status of analog or digital control centers.
- Surge, overspeed and temperature protection is provided during both automatic and analog operation.
- Throttle pressure limiting circuit protects the heat recovery steam generators from high steam velocity and, therefore, reduces the probability of water carryover into the steam turbine.
- Priority sequence for steam turbine valve position signals assures that the protective circuit signals will override any other signals received. The priority sequence is: (1) turbine trip runback; (2) overspeed protection controller runback; (3) coordinated control system runback; (4) throttle pressure limit runback; (5) manual operator pushbutton decrease; (6) valve test open; and (7) operator pushbutton increase.
- Steam turbine valve runup or runback can be performed at four different rates as necessary to protect the equipment. Manual increase and decrease pushbuttons can be used to achieve rates of 30% or 130% per minute. Under plant coordinated control, rates of 100% and 200% per minute can be achieved. Automatic runback of control valves is performed as necessary, even when part of the plant is operating on analog control.
- Two frequency/voltage circuits are provided for steam turbine speed measurements within 0.1% error.
- Hard-wired annunciator alarms of all critical devices assures fast operator attention.
- Check of pressure and flow measurements for failure permits substitution of other measured variables to calculate a failed signal.
- Diagnostic programs are performed during automatic control to determine the reasonability of control.

12. COMPUTER DATA LOGGING

During all modes of operation, the information monitoring and display computer provides the plant operator with a number of periodic and special logs of plant operation. The following table lists and describes the printouts which are produced.

| Type of Information | Description |
| --- | --- |
| Sequence of Events | High time resolution recording and printout of critical status changes in plant operation. The recording is triggered by a change in the status of contacts monitoring significant points in the process. |
| Post-Disturbance | Periodic pre-trip and post-trip collection of preselected variables. Post trip collection is triggered automatically in a critical situation or may be printed at any time at the request of the operator. A summary printout of saved variables is made at the request of the operator. |
| Group Reviews | A snapshot record of steady state, valve point, condition of interest or logically related groups for maintenance purposes. At the operator's request for review of a group, the computer provides a printout which gives the English language name or description of each point in the selected group and its status at the moment. |
| Block Trends | High frequency periodic reporting on the status of functionally related variables or miscellaneous variables selected by the operator. The operator chooses the frequency of reporting. The printout is tabular with mnemonic descriptions of the points as column headings and point status of each at the times of reporting on succeeding lines. |
| Analog Trends | High frequency periodic continuous chart pen recording on up to six operator-selected analog points at one time. |
| Hourly Logs | Periodic reports of total plant status plus long-term trend of plant parameters which reflect plant performance. |

13. OPERATING CONTINGENCIES

Certain operating contingencies require a special sequence of responses from the plant. These involve tripping certain units on the failure of essential systems. A few of the major operating contingencies are discussed briefly in the following paragraphs.

In case of a condenser hotwell high-level trip, the control system trips the steam turbine, the afterburners and the gas turbines, opens the condensate return valve, closes the makeup water stop valve and trips the heat recovery steam generators. If one afterburner trips, the second afterburner is tripped and the afterburner fuel systems are secured.

If one heat recovery steam generator trips, the afterburner is shut down, the boiler stop valve is closed and the associated gas turbine is tripped and the steam turbine controls the rate of decay of pressure level. The control system also closes the condensate feed valve and shuts down all pumps associated with that turbine and generator. The steam turbine control valve closes to limit pressure decay.

Loss of a single auxiliary cooling water pump has no effect on plant performance; each pump has 100% plant capability. An outage of a boiler feed pump or a high-pressure circulation pump results in a trip of the associated heat recovery steam generator and, therefore, the associated gas turbine. An outage of a low pressure circulation pump will not trip the steam generator; normal operation can continue with no immediate change in operating point.

14. PACE SYSTEMS QUALITY ASSURANCE FACILITY

A 100% dynamic factory test including environmental considerations is a standard PACE quality control process. The purpose of the test facility is threefold:
1. Dynamic testing of all production units as a standard quality control process.
2. Batch facility for software enhancement, field retrofit, verification of software and automatic software retrival for all units in the field.
3. Operator training including extensive plant and controller malfunction training.

Figure 6G:
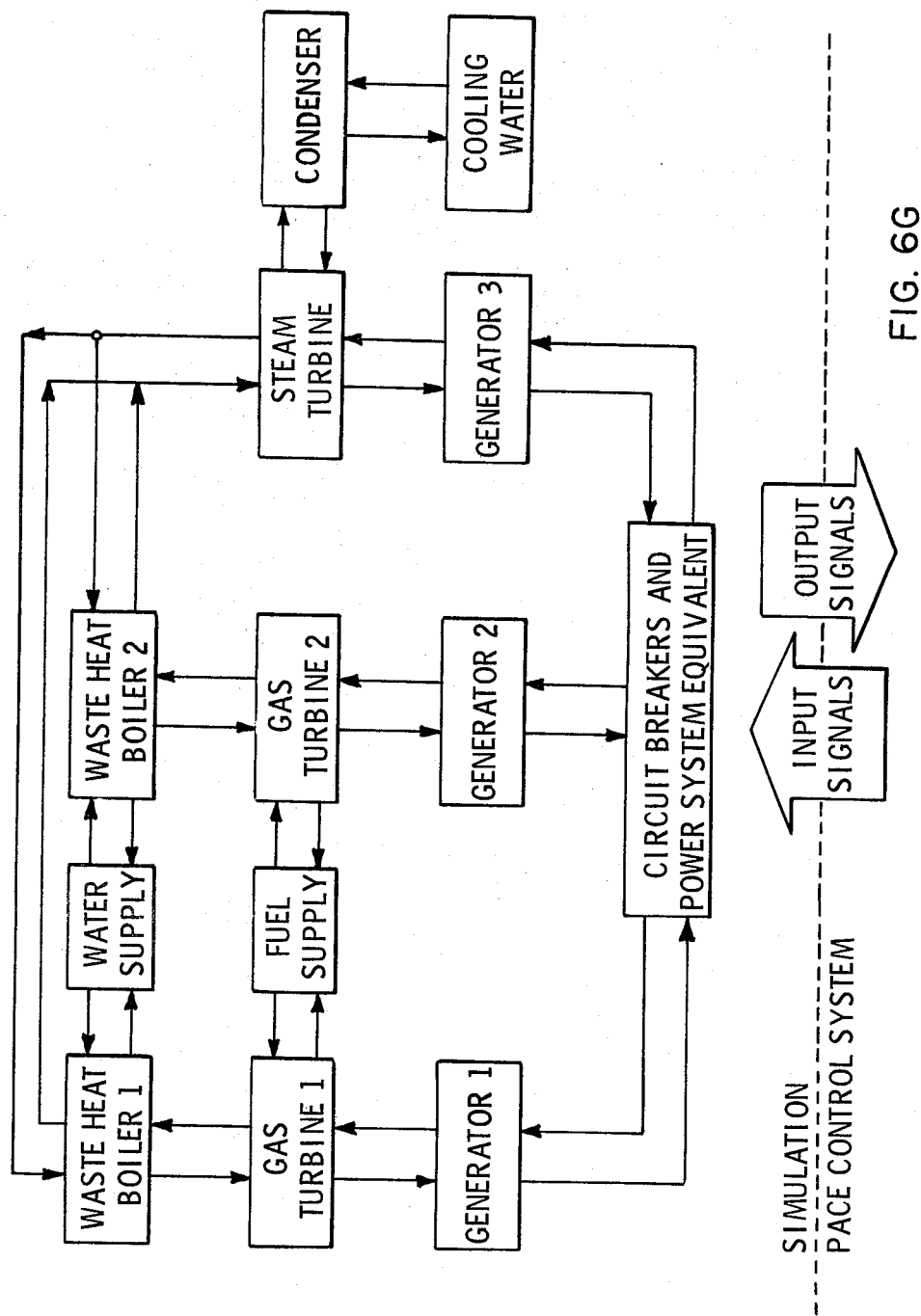
FIG. 6G shows a block diagram of a mathematical plant model employed in simulation testing of the control system.

The PACE Systems Quality Assurance Facility is a hybird PRODAC 2000 hardware/software test configuration that is used to implement a dynamic mathematical model of the complete power plant as seen by the input/output controller cables that connect the vans to the plant. The mathematical model interaction is shown in FIG. 6G.

All the sequencing, plant interlocking and dynamics of the plant are modeled as seen by the sensors and the control interface. The interface detail duplicates the exact field electrical signal characteristics-13 dynamic and static. All the sensors, motor control centers, valves, actuators, etc. are modeled and dynamic actions taken by the simulator. Sensor, actuator and plant components failures are simulated for operator training and control system design evaluation.

Each gas turbine model includes the dynamics of the fuel valve, combustor shell pressure, gas turbine cycle parameter such as speed, flow, pressure and temperature. Variables are related by families of performance curves. Torque is computed. The model of the steam turbine includes the dynamics of the control valve, steam conditions and the torque produced. Energy extracted from the steam is a function of flow and inlet steam conditions. Waste heat boilers are treated as heat exchangers. Dynamics include the effect of flow in both the primary and secondary sides. Steam conditions, temperature and pressure dynamics are related by physical laws of continuity, heat transfer coefficients and steam condition curves. The thermal capacity in the metal mass is represented by a time constant, depending on the mode of operation, which affects heat transfer and, therefore, overall waste boiler dynamics.

Plant auxiliaries modeled include recirculating valves, pump motors, fuel and water supplies and the condenser loop. Water levels are represented by an integrator with limits. The levels are functions of the inflow or the outflow rates. Pumps and motors are modeled by using performance characteristic curves and equations of continuity. Input and output signals are incorporated at appropriate points in the model, and decision tables, time delays, transport delays and signal shaping are introduced to define the functional interfacing of the various parts of the simulator. Each part of the model thus has well-defined sets of inputs and outputs and a clearly defined internal structure. Sophisticated software is provided to run the models. This software, including a monitor and I/O handlers, is similar to that furnished with the control system.

The PACE simulator is designed for both user convenience and simulator integrity. Although every effort has been made to make the simulator easy to use through pushbuttons on the operator's console and the card reader, the operator cannot change the software packages of the simulator. This prevents the introduction of inadvertent errors. It is possible, however, for a knowledgeable programmer to alter the simulation or the system by introducing changes through the programmer's console. In other words, the flexibility designed into the system is accessible only to specific personnel, thus minimizing the chance of accidental alteration of the programs.

The operator controls the simulation by pushbuttons on an opertor's console. Those pushbuttons allow him to start and stop the simulation, set initial conditions and introduce malfunctions.

The many benefits of the simulator are summarized as follows:
1. It provides the basic tool required to implement a system's level quality control process that includes hardware, software and even the control building.
2. Since the control system is checked out so thoroughly before shipping, costly field installation charges are reduced and, more importantly, the reliability of the control system is increased.
3. Changes in the control philosophy (hardware or software) can be investigated quickly, without costly field tests to the actual plant.
4. The plant simulation can be made to operate in dangerously abnormal conditions so as to check out automatic alarming and tripping functions. This type of checkout is almost impossible to accomplish in the actual plant without endangering plant equipment.
5. Certain sensor malfunctions are easily introduced to check out the control system response.
6. The simulator is being used for operator training. This training is conducted at the factory using the actual control system before it is shipped to the customer's site.

C. PLANT STRUCTURE AND OPERATION IN GREATER DETAIL

1. GENERAL

The PACE-260 combined cycle plant comprises two W-501B gas turbine packaged units, each exhausting into a heat recovery steam generator (HRSG). The heat recovery steam generators supply steam to a single cylinder, single flow condensing steam turbine. Supplementary firing in the heat recovery steam generators, hereafter referred to as "afterburning," is used to raise the gas turbine exhaust gas temperature as it enters the heat recovery steam generators.

Figure 6H:
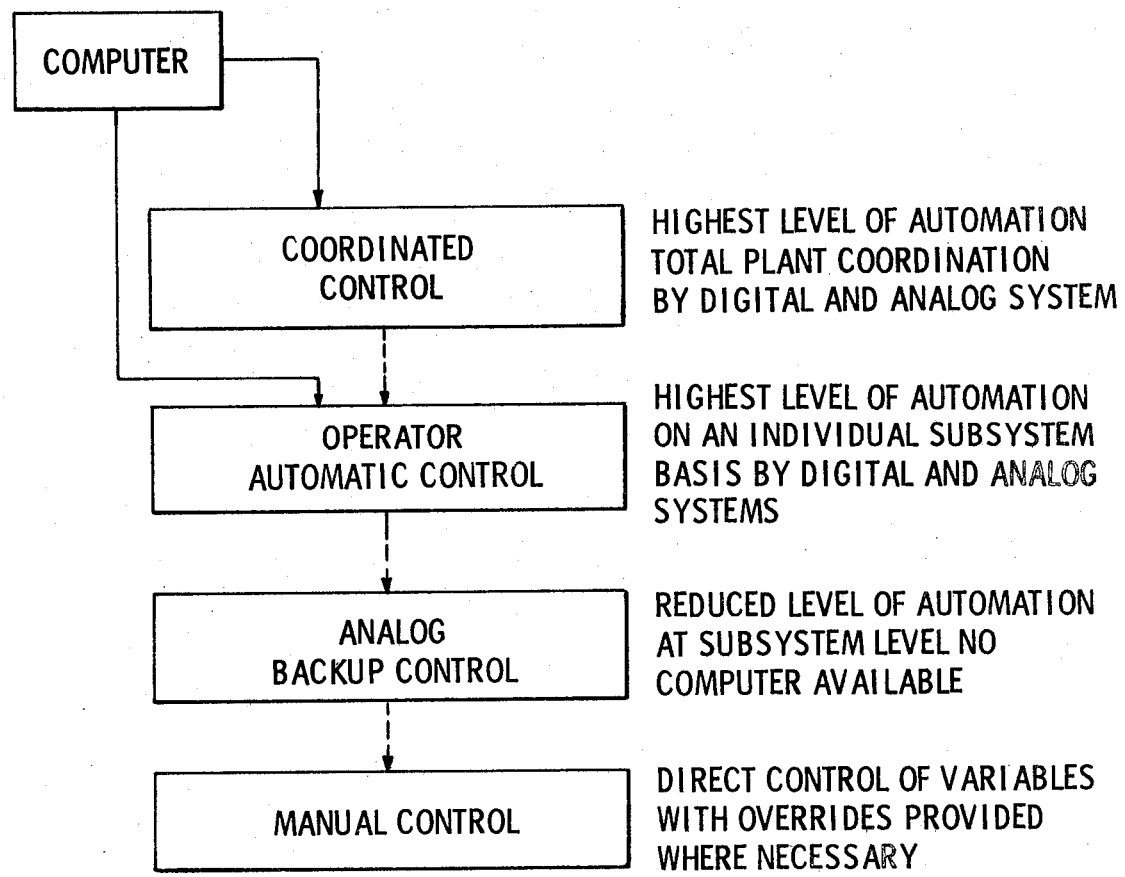
FIG. 6H shows a block diagram indicating the hierarchical structure of the control system.

From the point of view of controls, the plant status at any point in time is described by the following:
1. Operating Equipment Configuration
2. Operating Mode
3. Control Operating Level The progression of plant control modes, from full automatic downwardly through intermediate stages of operator automatic control and analog backup control to manual control, is shown in FIG. 6H. This is further discussed below.

2. OPERATING EQUIPMENT CONFIGURATION

The PACE-260 plant can generate power with various operating equipment configurations as indicted in FIGS. 6I-6N. These figures illustrate diagramatically the progression of the subsystems (Gas Turbines—Heat Recovery Steam Generators—Steam Turbine) through the four basic steady state operating modes for the various operating equipment configurations. For each of the equipment configurations, the mode progression proceeds from left to right.

Figure 6I:
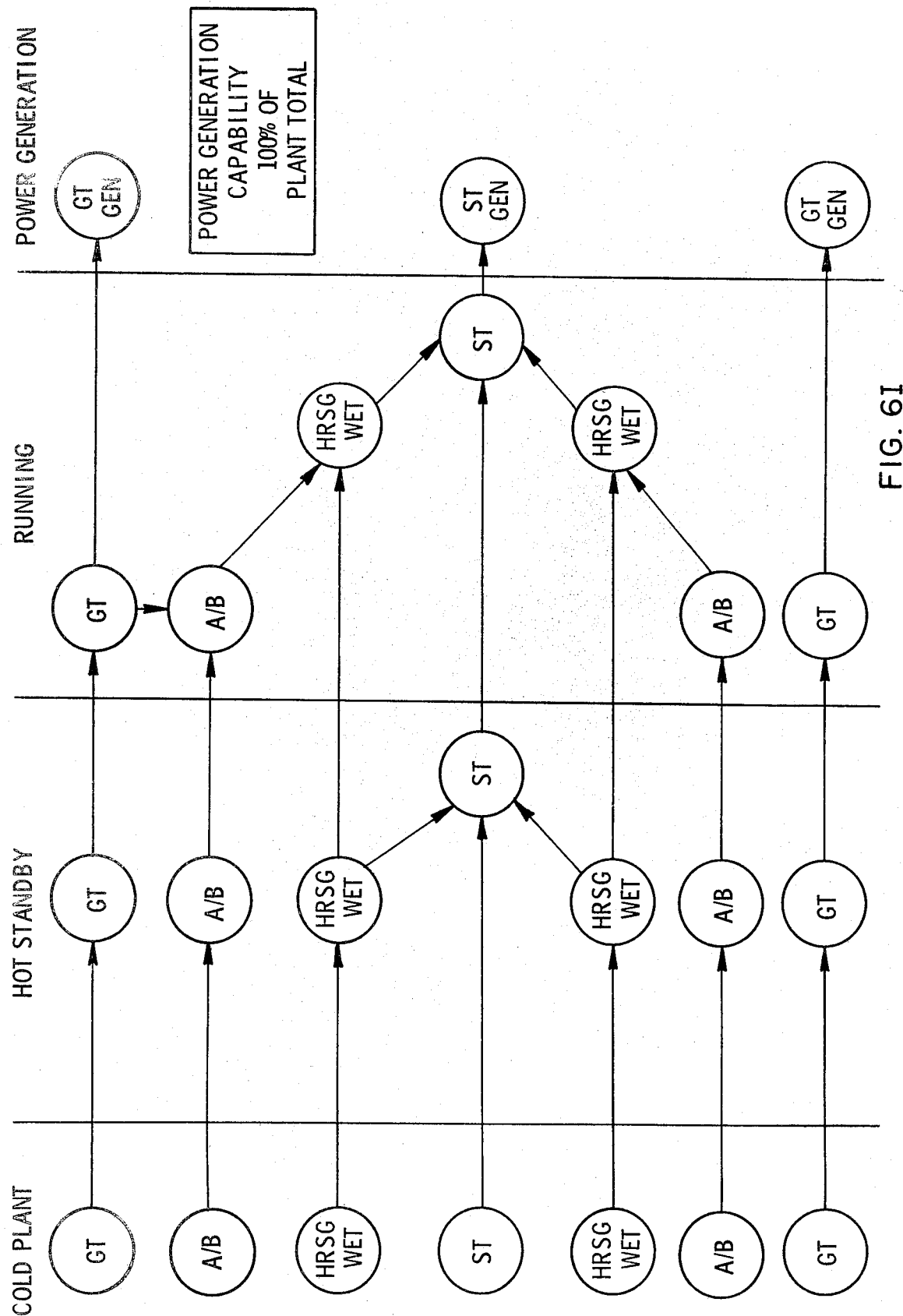

For example, FIGURE 6I illustrates the full plant operating configuration with both gas turbines, both heat recovery steam generators, both afterburners and the steam turbine in service from the cold plant through the hot standby and running modes to the power generation mode.

The plant starting equipment configuration is operator selected and is a function of the required plant power output and the equipment availability. Full plant power output can be achieved using the operating equipment configuration of FIGURE 6I which is that equipment configuration with which the plant will be started when the required power output is greater than 50% of the total plant generating capability.

Figure 6J:
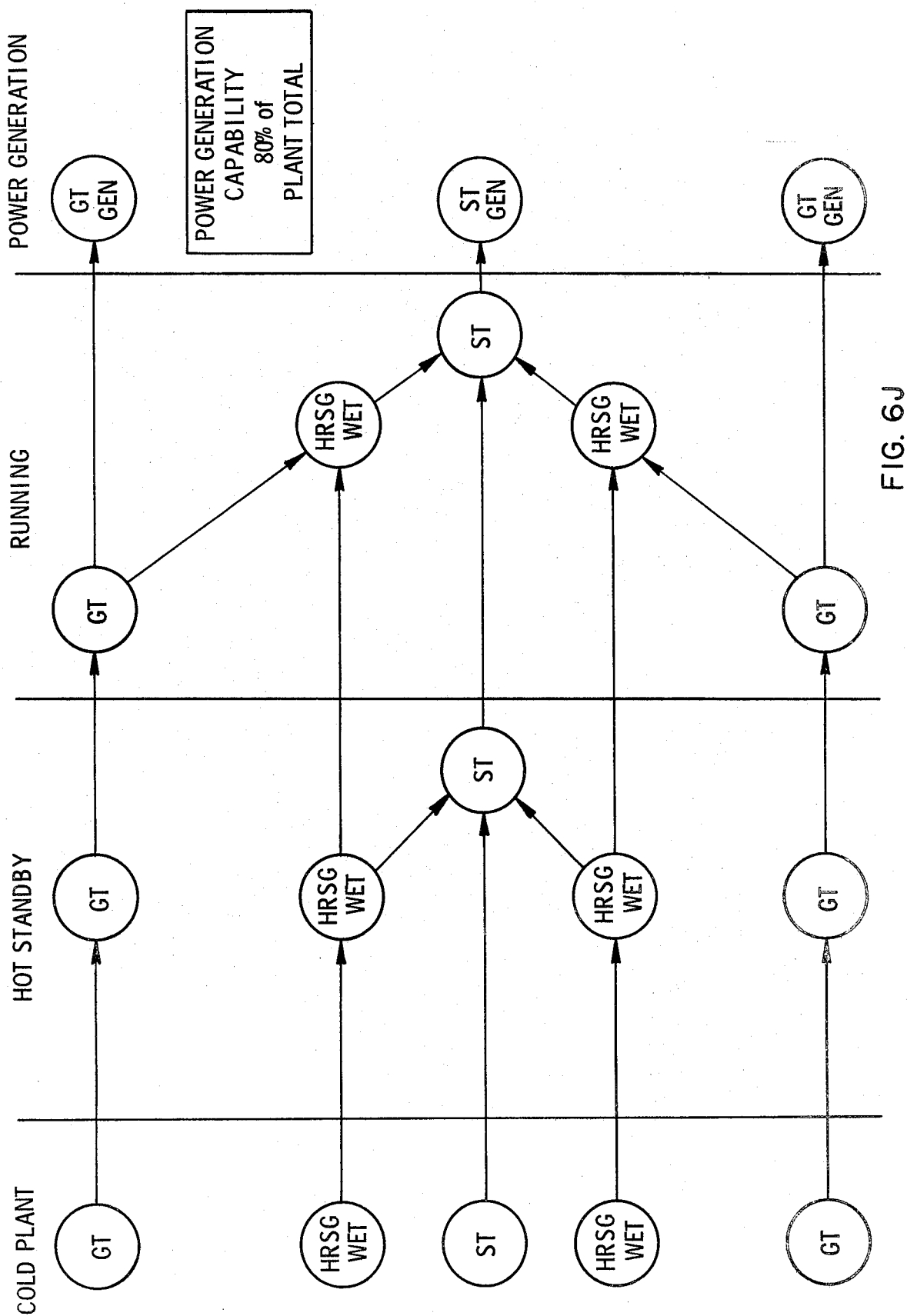

FIGS. 6J-6N illustrate alternate operating equipment configurations possible with the PACE-260 plant. FIGS. 6I and 6J illustrate similar equipment configurations, the only difference being that the afterburners are not firing in the configuration of FIGURE 6J. When the afterburners (both) are not used, an approximate reduction in power generation capacity of 20% will result.

The plant should not be operated with only one afterburner for an extended period of time. Therefore, an operating equipment configuration with only one afterburner is not shown.

Figure 6K:
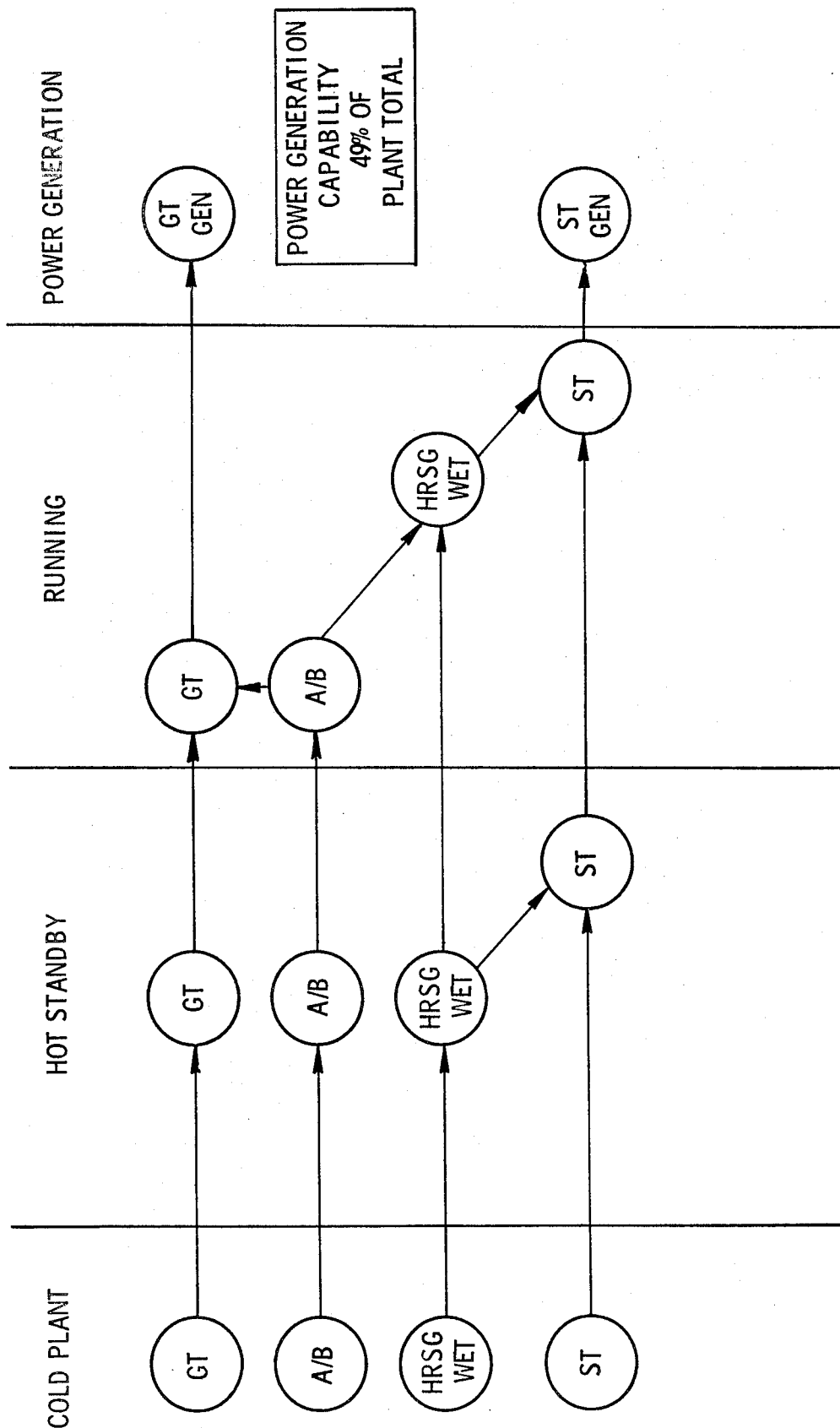
Figure 6L:
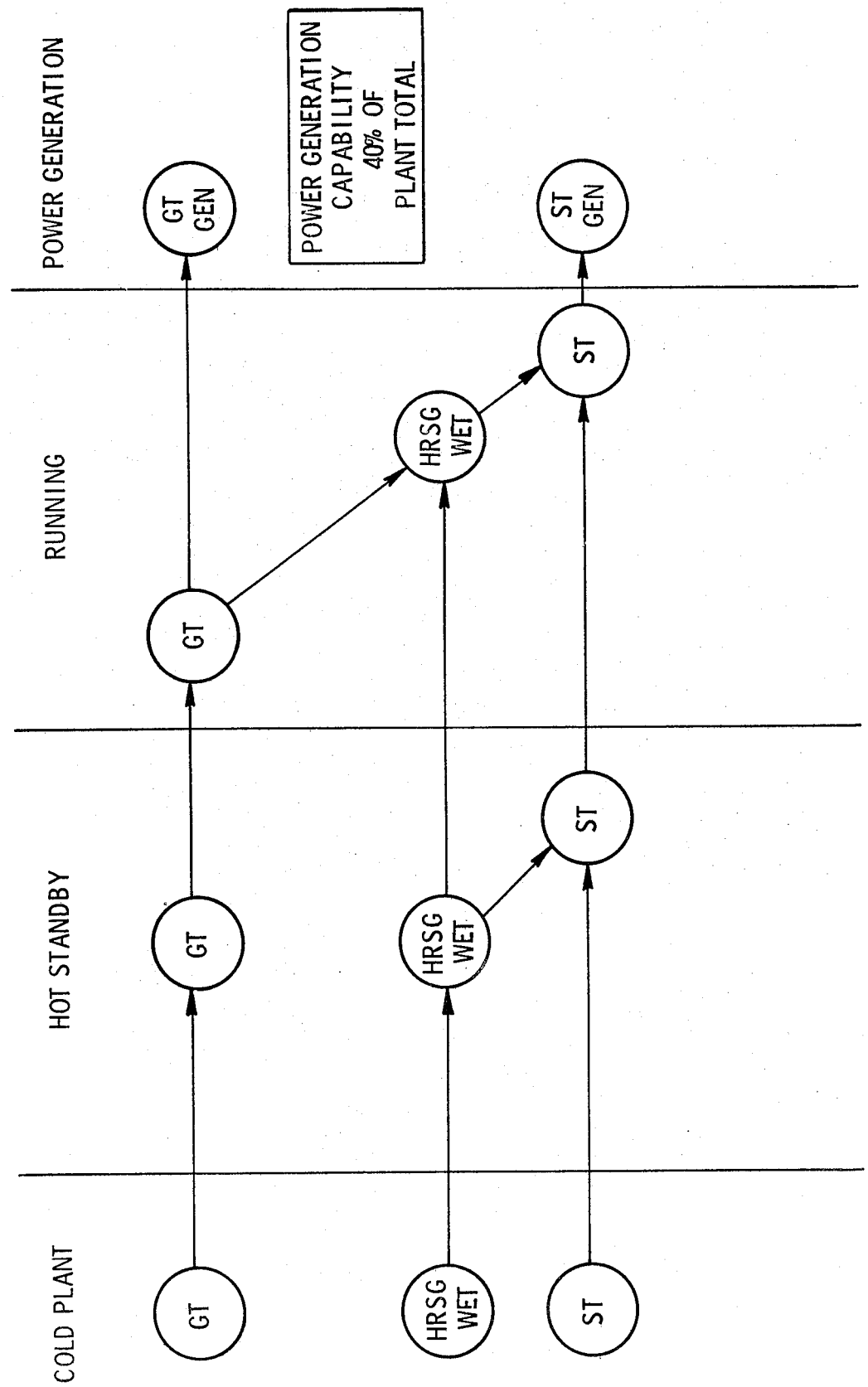

FIG. 6K and FIG. 6L illustrate the operating equipment configuration of one gas turbine, one heat recovery steam generator and the steam turbine with and without afterburning. These equipment configurations will result in a reduction of power generating capability of approximately 51% and 60% of the total plant power output capability respectively.

FIG. 6M illustrates gas turbines operating with the steam generated by the heat recovery steam generators bypassing the steam turbine through the steam turbine bypass valve. This operating equipment configuration results in a reduction of approximately 40% of the rated total plant power generating capability.

Figure 6N:
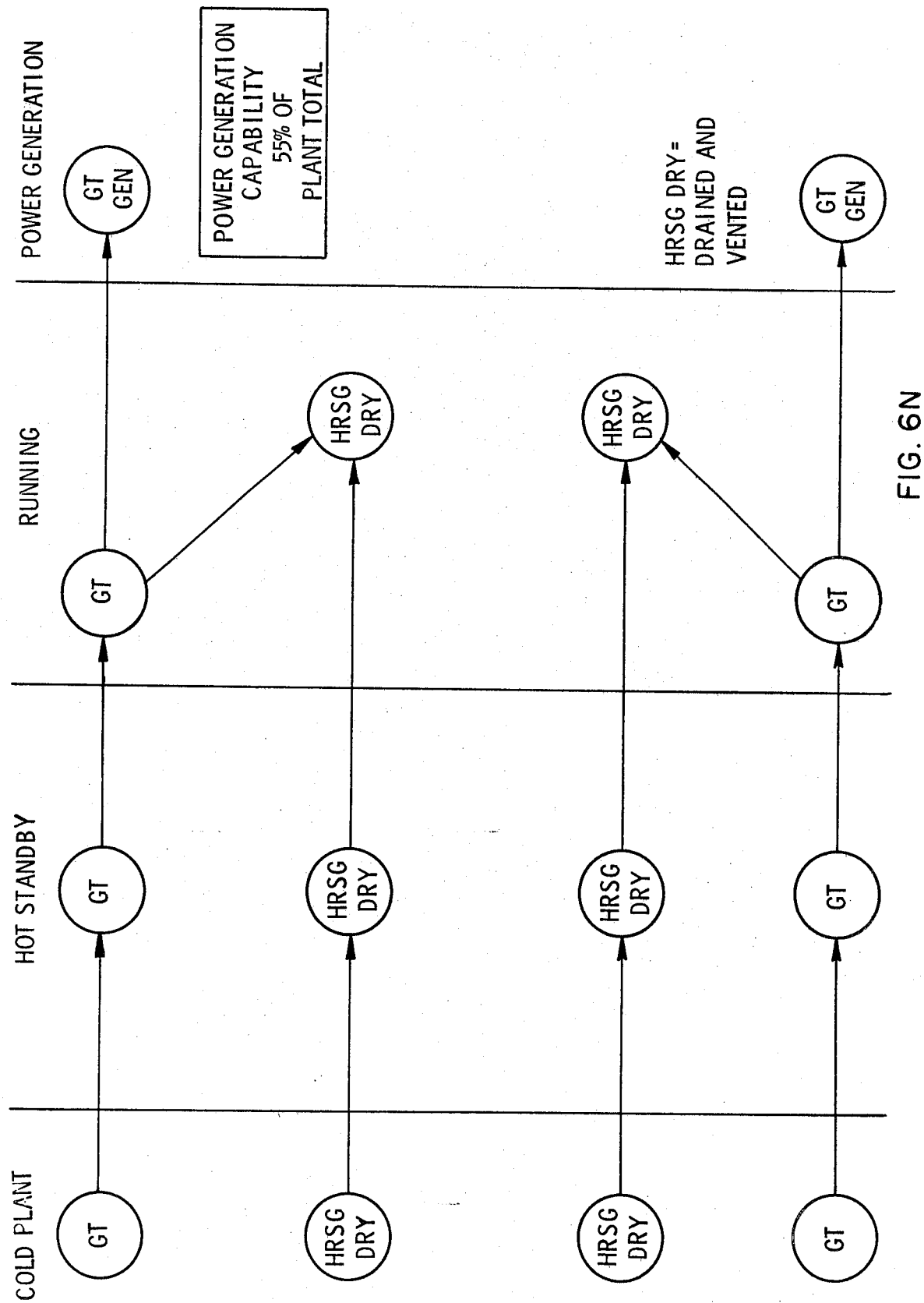

FIG. 6N illustrates a gas turbine operating with the heat recovery steam generators drained and vented (dry). Operation in this configuration is limited to 6000 hours with the inlet gas at a temperature of 900° F. This equipment configuration results in a reduction of approximately 45% of the total plant power generating capability. A 900° F. exhaust gas temperature limits the amount of loading that can be placed on the gas turbines, and as such this configuration cannot generate as much power as the configuration of FIG. 6M.

If the power demands so dictate, and the equipment availability so permits, the equipment configurations of FIG. 6J through 6N can be brought up to the configuration of FIG. 6d. In all of the equipment configurations of FIGS. 6d through 6N, the generator systems have been omitted. Generator system requirements for each operating mode are listed in the Appendix.

3. OPERATING MODES

Four basic steady state operating modes are defined for the PACE-260 plant. The four operating modes are (1) Cold Plant, (2) Hot Standby, (3) Running and (4) Power Generation It is possible for the various subsystems (gas turbine/gas turbine generator—heat recovery steam generator/afterburner—steam turbine/steam turbine generator) to be in any one of the four steady state operating modes. In fact, it is possible for any one of the subsystems to be in an operating mode which is different from the operating mode (or modes) in which the remaining plant subsystems are operating.

Changes in the operating mode status include the transition between the cold plant mode and hot standby mode, the hot standby mode and running mode, and the running mode and power generation mode.

Steady State Operating Modes

The following descriptions summarize the status of the full plant, the various subsystems within the plant and related auxiliary equipment during operation in each of the four basic steady state operating modes.

For a specific listing of subsystem and auxiliary equipment status during operation in the four operating modes, refer to the Appendix.

Cold Plant Mode—In the cold plant operating mode, the plant is shut down.

If ambient conditions so dictate freeze protection will function in this mode. The generator hydrogen seal oil systems will normally function during this mode unless they are specifically shut down for generator maintenance or a planned, prolonged outage. To be in this mode the plant equipment must be available and/or ready to start.

Hot Standby Mode—When the full plant is in the hot standby operating mode rated power output can be attained in approximately one hour.

In the hot standby mode the heat recovery steam generator will generate enough steam to maintain 300 psia in the high pressure drum. The steam will be used to warm up the main steam line and to supply the steam turbine gland seals. The deaerator, high pressure drum, and the steam turbine hotwell condensate levels will be on single element control during operation in the hot standby mode.

The hot standby mode must be attained as a minimum condition before the control system will accept commands from the Coordinated Control for an automatic, forced sequence start to a preselected power output.

Running Mode—In the running operating mode the gas turbines are on speed control operating at a speed of approximately 3600 RPM and being ready to synchronize.

When the heat recovery steam generators are in service in the running mode, any excess steam that is generated bypasses the steam turbine through the steam turbine bypass valve. The steam turbine will operate on speed control during the running mode at a speed of approximately 3600 RPM. The afterburners will fire to maintain the required steam temperature of 700° F. or rotor temperature plus 30° F., whichever is greater, and the steam turbine bypass valve will act to maintain 350 psia in the main steam header. Both condensate and both circulating water pumps must be operating when the afterburners are firing above their minimum firing position. The control of the condensate level in the deaerator, high pressure drum and the condenser hotwell will be maintained by three element controls during the running and power generation operating modes.

Power Generation Mode—This mode includes all loading of the Plant at or above minimum load. The control system permits operation at the following defined loads:
1. Plant minimum load
2. Plant base load
3. Plant peak load The control system also permits operation at loads between minimum load and peak load.

Minimum Load

Following synchronization, each gas turbine generator picks up a minimum load of approximately 4 MW. The steam turbine generator picks up a minimum load of approximately 10 MW. The minimum load, therefore, in the full plant operating equipment configuration (FIG. 6I) with both gas turbines and the steam turbine generating power is approximately 18 MW. This minimum load is initially picked up to prevent the turbine generators from tripping due to reverse current.

During operation at minimum load, the afterburners are fired to maintain minimum steam conditions of 350 psia, 700° F. (or rotor temperature plus 30° F., whichever is greater). The inlet guide vanes (IGV's) are modulated to their maximum closed position. The steady state condition does not represent an economical operating mode for the PACE-260 plant. It is rather an intermediate state achieved following synchronization when indeed the plant is intended to be loaded to a higher output such as can be attained by operating at base or peak load.

Base Load

The plant is considered base loaded (using the configuration of FIG. 6I) when the gas turbines are loaded to the base turbine exhuast temperature limit and the IGV's are opened to their design position. When operating the gas turbine at the base limit power generation mode, the afterburner firing is increased to its maximum rate to provide additional plant power output. The steam turbine bypass valve is fully closed so that the total steam flow is passing through the steam turbine. Plant base load will vary as a result of changes in ambient temperature and pressure because of inherent gas turbine characteristics.

Peak Load

The plant is considered peak loaded (using the configurartion of FIG. 6I) when the gas turbines are further loaded to the peak turbine exhaust temperature limit with all the other conditions of base load steady state operation remaining the same. The afterburners will be at the maximum allowable firing rate and the IGV's will remain in their design position unless modulation of the IGV's is required to prevent excessive moisture in the steam turbine exhaust. If the superheater outlet temperature is less than 950° F., and the superheater bypass valve is closed, the IGV's will be closed as required to get the superheater outlet temperature back up to 950° F. This is a function of, and will vary as a result of ambient conditions. The superheater bypass will modulate to limit the steam temperature to 952° F. at the superheater outlet. Plant peak load will also vary as a result of ambient changes.

Transitions Between Operating Modes

The transitions between the hot standby, running and power generation steady state modes can be performed either automatically or manually. However, the transition from the cold plant to the hot standby operating mode must be accomplished manually. Once the plant is in the hot standby operating mode an automatic start is possible from the Coordinated Control.

The required degree of operator participation during a transition depends upon (1) the control operating level, (2) the equipment operating configuration and finally (3) the modes between which the transition is being made. For example, the transition between the cold plant mode and the hot standby mode requires that all the equipment status changes must be initiated by the operator and, as such, is a manual control level function. Operator participation to make the transition from the hot standby mode to the power generation mode in the highest control operating level, Coordinated Control, is reduced to the selection of fuel, selection of desired load and initiation of the startup sequence. The required operation (automatic or manual) of subsystem equipment during the transition between modes is indicated by the change in the equipment status for the different modes (see Appendix). In addition, the BTG board manual operation capability is indicated by a check list of BTG board devices (pushbuttons and auto/manual stations).

Cold Plant Mode to Hot Standby Mode

The transition from the cold plant mode to the hot standby mode requires a sequence of operation which must be performed by the operator at the manual control level. The equipment operating status changes which must be operator initiated to go from the cold plant mode to the hot standby mode are indicated in the Appendix.

To begin the transition from the cold plant to the hot standby mode, the operator must check to insure that equipment trips are reset, equipment fluid inventories (lube oil, condensate, etc.) are correct and that the equipment to be started is generally in condition to start. The equipment which must function during the transition to and operation at hot standby must be started or turned on. Status lights on the BTG board and Coordinated Control panels indicate when the equipment has reached the hot standby mode.

Hot Standby Mode to Running Mode

Depending upon the starting configuration, it is possible to start the plant from the hot standby mode with any of the subsystems in any one of the four control operating levels. The minimum configuration for a startup in the Coordinated Control level consists of one gas turbine, its accompanying heat recovery steam generator (with or without afterburners) and the steam turbine (FIGS. 6K and 6L). However, the normally expected configuration for a coordinated startup is the full operating configuration of FIG. 6I. Therefore, startup of the subsystems in the equipment configuration of FIGS. 6M and 6N will not be performed by the plant coordinated control. The startup of the subsystems in these configurations require more operator participation when starting in the operator automatic, backup or manual control levels.

The following procedure describes briefly the sequence of events which must occur during the transition from the hot standby mode to running mode.

Startup of Full Plant Configuration (FIG. 6I)

1. Start auxiliaries not in service in the hot standby mode.
2. Start gas turbine acceleration. The flow of fuel is controlled to maintain the desired acceleration within specified limits on blade path temperature and compressor surge margin.
3. At the gas turbine speed of 2600 rpm or approximately 7.5 minutes from initiation of the startup, the afterburners are ignited. The afterburners fire to maintain the fired gas temperature to produce steam at 350 psia and 700° F., the steam conditions required to accelerate the steam turbine.
4. The steam turbine bypass valve opens when the boiler pressure exceeds 350 psia and will modulate to maintain 350 psia. The valves in the HRSG 2-inch bypass-drain lines remain closed during two gas turbine-heat recovery steam generator operations.
5. The steam turbine control valves start to open when the steam condition of 350 psia and 700° F. (or rotor temperature plus 30° F., whichever is greater) is attained, and are modulated to accelerate the steam turbine to 3600 rpm in approximately 6½ minutes.

Startup of One Gas Turbine, Heat Recovery Steam Generator, and Steam Turbine (FIG. 6K)

The operations during the transition from the hot standby mode to the running mode with one gas turbine, one heat recovery steam generator, and the steam turbine are the same as when starting two gas turbines, two heat recovery steam generators and the steam turbine except that the actions associated with the second gas turbine and heat recovery steam generator are omitted. The isolation valves in the extraction and main steam lines of the heat recovery steam generator not being started are closed.

When only one gas turbine is in operation, the steam turbine control valve will modulate to control the upstream pressure to be above the normal pressure that would otherwise exist with the steam turbine control valve fully open.

The normal pressure during one heat recovery steam generator operation at high steam production, with the steam turbine bypass valve fully closed and the steam turbine control valve fully open, would be too low to insure that water carry over would not occur as a result of high steam velocities.

Running to Power Generation

Synchronization and Minimum Load

The transition from the running to the power generation mode involves synchronization of the turbine and the pickup of minimum load. The gas turbine and the steam turbine generators can be synchronized automatically or manually.

Automatic synchronization is performed with a hardware synchronizer which inputs to the computer; thirty seconds is allotted in the automatic startup sequence for synchronizing. Manual synchronization must be accomplished from the subsystem panels on the BTG boards.

A hardware synchronizer is used for synchronizing the three generators sequentially when synchronization is performed automatically. The computer will control the order of synchronization based on the readiness of the turbo-generators. The operator selects the order of synchronization if the synchronization is done manually. The sequence of operations for synchronizing is briefly as follows:

1. The individual generator exciter field breaker is closed. This operation specifies which turbogenerator is to be synchronized. When the synchronization is done automatically, the breaker is closed at 92% of synchronous speed. When the synchronization is done manually, the operator must close the breaker approximately at 92% of synchronous speed.

2. The turbine speed is raised or lowered as required to achieve the required speed to synchronize.
3. The voltage is adjusted as required for matching the line voltage. If the voltage regulator is not in automatic service, the operator must also make a manual voltage base adjustment during the manual synchronization operation.
4. The generator breaker will be closed when a phase match is achieved. Plant minimum load is established with the gas turbines at minimum load, sufficient steam flow through the steam turbine control valve to establish minimum load on the steam turbine, and bypassing excess steam to the condenser. Steam conditions are maintained approximately at 350 psia and 700° F. by controlling the firing rate of the afterburners. The steam turbine bypass valve modulates to maintain the steam pressure at 350 psia until the control valve is fully opened after synchronization.

Minimum to Base Load

When the gas turbines are generating the minimum load of 4 MW each, the inlet guide vanes (ICV's) are rotated to their maximum closed position. This results in a higher gas turbine exhaust temperature; thereby reducing the amount of afterburning required to maintain the desired steam conditions. Power output is increased above plant minimum output by increasing the flow through the steam turbine by simultaneously opening the steam turbine control valve and closing the steam turbine bypass valve while maintaining the initial steam conditions.

Plant load is further increased by increasing fuel flow to the gas turbine at a rate that results in a gas turbine exhaust temperature change of 35.4°/min. As the gas turbine exhaust temperature increases, afterburner fuel flow is reduced to maintain the initial steam conditions. The IGV's remain in the maximum closed position.

At some point, as gas turbine fuel is increased, and afterburner fuel flow decreased, it is no longer possible to decrease afterburner fuel flow without risk of an outfire. From this point on, increased load on the gas turbine results in increased heat to the heat recovery steam generator with afterburner fuel flow at minimum. The steam turbine bypass is ramped closed (if it is not already closed) when the steam turbine control valve is fully open.

When the minimum afterburning rate is reached, the gas turbine loading rate is limited so that a fired gas temperature rate of change of 7.25°/min. is not exceeded. Since the afterburner is at a minimum firing condition, the required steam temperature ramp of 7.25°/min. is achieved as the steam temperature follows the gas temperature. The gas turbine exhaust temperature is increased with gas turbine load until rated base gas turbine exhaust temperature is reached with the IGV in the maximum closed position. Further load increase is made by opening the IGV until the IGV's are in the design position.

Once base load with optimized IGV setting is reached on the gas turbine, higher load is obtained by increasing afterburner fuel flow from minimum flow at a rate so that the gas temperature rate of change does not exceed 7.25°/min. Steam turbine load increases as steam pressure and temperature increase. Should a steam temperature of 952° F. be reached at the superheater outlet, the Superheater Bypass Valve will open to prevent the steam temperature from exceeding 952° F. Maximum load is limited by gas turbine output which is a function of ambient temperature, maximum steam temperature or maximum gas temperature at the afterburner outlet.

Base to Peak Load

In the final load condition, load is increased by increasing allowable gas turbine temperature to the peak limit. The steam temperature limit is maintained by reducing afterburner firing. The Superheater Bypass Valve continues to limit the maximum steam temperature to 952° F. Steam turbine power remains constant with constant steam conditions.

The following values will act as limiting values:

The superheater inlet gas temperature will at all times be restricted to the lower values of:
(a) 1240° F. gas temperature
(b) Steam pressure=1250 psia
(c) Steam temperature=952° F.

Special Transitions

Startup with Hot Steam Turbine Rotor

If the steam turbine is tripped or shut down more rapidly than normal from approximately half load or more, the rotor will remain for a time at a temperature above the hot standby mode level. In the event that the rotor temperature is above the level required for the hot standby mode when the plant is restarted, the maximum afterburner firing, and the gas turbine exhaust temperature at minimum load, may not achieve the necessary fired gas temperature (approx. rotor temp. +100° F.) to produce the steam temperature required (rotor temp. +30° F.) to start the steam turbine. In this situation it is necessary to put additional load on the gas turbine(s) as required to achieve the desired temperature. Starts of this type are conducted in the Operator Automatic Control Level.

The operating sequence would be as follows:
1. Gas Turbine and Afterburner Startup
   Startup—Sequence the gas turbine(s) and heat recovery steam generator(s) from hot standby mode to power generation mode. As previously described except afterburners fire to reach fired gas temperature of steam turbine rotor temperature +100° F. Steam pressure at the steam turbine bypass valve may exceed 350 psia when high steam temperatures are required to roll the turbine, because of off-design volumetric flow.
2. Temperature Ramp—The gas turbines are loaded at a rate that will not result in a rate of change in exhuast gas temperature in excess of 35.4°/min. The load on the gas turbine(s) is increased to provide the required heat input to the heat recovery steam generator to produce steam at the condition required by the steam turbine rotor.
3. ST Startup—The steam turbine control valves start to open at steam temperature of rotor +30° F. The steam turbine is accelerated and synchronized with the control valves and initial load is applied.
4. Transfer to Load Control—As the afterburner fuel inputs are decreased, the gas turbine fuel inputs are increased at constant fired gas temperature until either the afterburners reach minimum firing or the gas turbines reach base load exhaust gas temperature. This puts the plant back on the optimum heat rate curve. The control level can then be transferred to the Coordinated Control level.

5. Loading—The gas turbine and afterburner fuel inputs are adjusted along the normal loading curves until the desired plant load is attained.

Startup of the Second Gas Turbine—Heat Recovery Steam Generator

The gas turbine is started in the same manner as it is started in a two unit startup. The afterburner is ignited when the gas turbine reaches a speed of 2600 RPM. When the steam pressure in the heat recovery steam generator exceeds the 300 psia hot standby level, the electric heaters are turned off. The 2" HRSG bypass valve opens when the steam pressure rises above 330 psia. When the pressure in the second HRSG matches the pressure in the main line, the stop/check valve opens to admit the steam to the main line. The 2" HRSG bypass valve closes when the flow from the heat recovery steam generator coming on line exceeds 75,000 lb/hr.

Plant Unloading and Shutdown

Shutdown of one of two operating gas turbine-heat recovery steam generator units It may be desirable to shut down one gas turbine-heat recovery steam generator unit (perhaps to achieve better part load efficiencies). In this case the gas turbine exhaust temperature is reduced by reducing the gas turbine load and the afterburner firing increased to hold the steam temperature within the allowable mismatch to the extent of its capability. When the allowable mismatch is exceeded, the main stop/check valve will be actuated closed, and the 2" bypass valve will open as required to maintain the upstream pressure 75±25 lb. less than the pressure in the main line.

At the time the stop/check is closed, the afterburner is tripped, and the gas turbine exhaust temperature is further reduced to the point where the gas turbine generator breaker can be opened (it may be necessary to trip the gas turbine if the operating conditions are such that the 2" bypass valve cannot maintain the upstream pressure 75±25 lb. less than the main steam line pressure). Following this, the gas turbine is shut down (if the GT is being fueled by "heavy" oil it should be transferred over to #2 F.O. prior to shutdown) and the necessary auxiliaries are also shut down.

When the stop/check on the HRSG goes closed, the steam turbine control valve is run back by the Throttle Pressure Control (TPC) to maintain the pressure required for the HRSG still on line. The steam turbine bypass valve will remain closed. The steam turbine control valve will then be ramped open at the allowable rate to put the plant on the proper operating curve for one heat recovery steam generator.

Shutdown of Both GT-HRSC Units

The afterburner firing rate is reduced according to the allowable gas temperature reduction rate until the afterburners are at the minimum firing position. The gas turbines are then unloaded, again limited by the gas temperature reduction rate. When the gas turbines have reached minimum load, the gas turbine generator breakers are opened. The steam turbine control valve closes when minimum steam conditions are achieved. The steam turbine bypass valve setpoint is set to hold 1200 psia.

The 2" HRSG bypass valves control to hold the upstream pressure at 75±25 lb. less than that in the main steam line. The gas turbines are shut down and all auxiliaries except those required for hot standby operation are also shut down. If the gas turbines have been running on "heavy" fuel oil, they should be transferred over to #2 F.O. prior to shutdown.

4. CONTROL OPERATING LEVELS

The plant control operating levels are briefly described in the following sections. The control hierarchy is illustrated diagrammatically in FIG. 6H.

Plant Coordinated Control Operating Level

In the plant Coordinated Control operating level, the digital computer system must be operating and will provide the highest degree of plant automation during startup and operation from the hot standby mode to the power generation mode. Coordinated Control can provide control of the combined cycle equipment configurations or FIGS. 6I, 6J, 6K and 6L. The other equipment operating configurations will require operation at a lower control level such as operator automatic. No provision is made to include the operation of these equipment configurations (FIGS. 6M and 6N) in the Coordinated Control level.

Operator participation in the Coordinated Control operating level, once having attained the hot standby mode, is reduced to the selection of the fuel, the selection of equipment operating configuration (one or two gas turbines, afterburners, etc.), and the selection of the desired plant power output. Sequence, control, ramping and limiting functions required to coordinate the startup and loading of the plant from the hot standby mode to the desired preset load reference is completely automated by the PACE 260 control system. In this control operating level, the maximum information display will be available to the operator.

Transfers to the lower levels of control from the Coordinated Control operating level can be accomplished by the operator, as he determines the need for more direct control of the plant or an individual subsystem, or automatically by the control system in the event of a subsystem or a control loop failure. The automatic transfers will be restricted to the next lower control level practical with the remaining equipment capability. The transfers will be made on an individual subsystem basis, if possible, in an effort to maintain as high a percentage of the plant at the Coordinated Control level as is possible.

Plant Operator Automatic Control Level

In the plant operator automatic control level, the computer must be operating and permits the operator to start each or all of the subsystems, but on an individual rather than a coordinated basis. The subsystems are started by the operator from the individual BTG boards. The distribution of plant power at this control level is, therefore, an operator function. The information display in this control level is essentially the same as the information available in the Coordinated Control level. As can be see on FIG. 6H this control level is the next highest level of control; second only to the Coordinated Control operating level. Equipment must be operating in this control level before it can be transferred into the Coordinated Control level. Adequate tracking is maintained to insure a bumpless transfer from Coordinated Control to the operator automatic operating level.

Plant Backup Control Level

The backup control level does not depend upon the availability of the digital system. It does, however, provide for the startup and loading of the entire plant. The plant can be operated at any load (above minimum load) in this control operating level. This control operating level requires more direct operator participation. The operator, for example, must supervise and control the steam turbine acceleration and loading ramp rate, the inlet guide vane position and plant power output distribution. At this control level the display information is reduced to the hardwired annunciators, indicators, gauges, recorders and status lights on the individual BTG boards.

Plant Manual Control Level

At this control level the operator has direct control of the subsystem equipment. A/M stations and pushbuttons on the BTG board give the operator control of such things as valve position, pumps, etc. At this control level the operator has considerably more responsibility in regard to sequencing during control mode transitions. For example, the operator must open valves, start motors, start and control afterburner firing and control the steam temperature ramp rates. The operator has no direct control over the steam turbine control valve position, the gas turbine fuel valve position or the afterburner fuel valve position. He can, however, in the case of the gas turbine fuel valve and the afterburner fuel valve set a reference which then sets valve control rates. Operations like gas turbine fuel increases, afterburner firing rate increases, steam temperature rate increases, and steam turbine control valve position changes are subject to overrides to protect the plant from damage during operations at this control level. The transition from the cold plant to the hot standby mode must be performed by the operator in this control level. As such, this control level is important not only as a backup or redundant control level, but as a necessary control level in the plant startup operation.

The information display capability in this control level is essentially the same as in the preceding control level (analog-backup) in that the devices used in both levels are hardwired. Transfers from this control level to higher control levels can be made at various points in the plant operation; when the hot standby operating mode has been reached, when the turbines are at synchronous idle in the running mode, or when the turbines are at a power level and distribution which will permit a transfer.

D. GENERAL CONTROL SYSTEM CONFIGURATION

Primary and Backup Systems

The control system comprises a hybrid controller containing a P-2000 digital computer and associated analog circuitry for primary control, and independent hardwired back-up controllers for alternate control in case the primary computer control system is inoperative. A second P-2000 computer is used for supplementary data processing, special displays, the augmented capabilities of the PACE Controller. It is possible to operate the plant at the plant coordinated control level using the primary control system with only one computer available.

Both primary and back-up control systems along with associated common elements and safety systems are partitioned according to major plant sub-systems such that each such subsystem may be operated independently as appropriate using either the primary or back-up control system. A further implication to the primary digital system is that the failure of Input/Output serving a particular major plant sub-system does not prevent primary digital system control of the other major plant sub-systems. The intent is that the plant be operable in mixed primary and back-up modes.

Certain elements service both prime and back-up system without redundancy, such as selected instrumentation, actuators and sub-control functions. The decision to employ such non-redundant services depend on engineering judgement and trade-offs of cost, reliability, failure effects and time to isolate and repair failures.

The back-up control system does not duplicate the degree and sophistication of the primary system but is sufficient to allow single operator control in normal operation of standard power levels and combinations, single operator rapid switch to a safe condition (including shutdown or reduced level of a major system) in case of malfunction, single operator adjustment of load according to demand, and single operator capability to place the system on line from standby at a slower permissible rate than the primary control system. The back-up system is also capable of starting up all major systems and management of contingency situations but more than one operator may be employed except as stated above. Trips and alarms for the back-up system are consistent with all these requirements.

Transfer Between Systems

Transfer from the primary to back-up control system and vice versa is accomplished with minimal effect on the steady state operating conditions of the major systems at the time of transfer. Transfer may occur either automatically in the case of a self detected control malfunction or on operator selection. If transfer occurs during a load transient, the transfer is annunciated and the transient will not continue. It is up to the operator to re-initiate the transient.

Transfer to the backup control system is possible provided the backup control system and associated common elements are operable. Any major system for which neither the primary nor backup controls including common elements are operable, must be shut down. No shutdown occurs as a result of a control malfunction as long as a transfer is possible. Control elements generally are placed in a nonoperable status either by operator control or by a self detected malfunction where appropriate.

E. PLANT CO-ORDINATION

1. GENERAL

The co-ordinated control system fulfills the PACE-260 plant design requirements of full plant startup from Hot Standby to Full load in approximately one hour with one operator in the control room by reducing the required operator activities to the selection of operating equipment configuration and fuels, and setting the electrical output for the total plant. The operator interfaces with the plant as a single unit rather than at the level of the individual power generating units as in the Operator Automatic Control Mode. The coordinated control programs convert the plant level operator instructions into coordinated sequencing signals, and temperature and loading setpoints to the individual power block control subsystems.

2. STARTUP SEQUENCING

The coordinated control startup program provides the following functions:

Check validity of equipment configuration selected by operator.
Check equipment and plant for ready to start.
Start main boiler feed pumps.
Standby boiler feed pumps shut down automatically during startup from standby on signal from sequence logic.
Open HRSG stack louvers.
Start and minimum load instruction to gas turbines.
Start second condenser circulation pump (circulation pump isolation valve opens automatically).
Start second condensate pump. At this time the hotwell, DA, and HP drum level controls should be transferred to 3 element.
Start second cooling water pump.
Start chemical feed pumps.
When a gas turbine reaches predetermined combustor shell pressure, light-off instructions to its afterburner.
Set afterburner outlet gas temperature setpoint to 800°.
(As the steam pressure rises, the boiler electric heaters go off and the steam turbine bypass valve starts to open to limit throttle pressure to 350 psia. When the gas turbines reach 3600 rpm they are synchronized and minimum loaded).
When the steam reaches 700° and 350 psia, start instruction to the steam turbine.
(When the steam turbine reaches 3600 rpm, it is synchronized.)
Close the steam turbine bypass valve at the rate of allowable load pickup on the steam turbine-generator.
(As the bypass valve closes, the steam turbine throttle valves, which are now on back pressure control, open and the steam turbine load increases).
When the bypass valve is closed, start to load the gas turbines at the rate of 35.4°/min. exhaust temperature rise.
(As the gas turbine exhaust temperature increases, the afterburner firing rate decreases to maintain the fired gas temperature setpoint).
When the afterburners reach minimum firing, decrease gas turbine loading rate such that the steam temperature does not increase faster than 7.25°/min.
When the gas turbines reach base load exhaust temperature, start to open the IGV's. (The gas turbine controls will maintain base load exhaust temperature for the existing ambient while the IGV's are opening).
When the IGV's reach the 22° design point setting, increase the fired gas temperature signal to the afterburners to achieve 7.25°/min. steam temperature rise.
(When the steam temperature reaches 952°, the superheater bypass valves will start to open to limit steam temperature).
When the steam pressure reaches 1222 psia or the fired gas temperature reaches 1200°, whichever occurs first, the plant is base loaded.
If additional load is requested, increase gas turbine exhaust gas temperature to peak rating.

The sequence has been arranged so that at any point at which the preselected plant load setpoint is reached, the plant will be operating on the optimum heat rate curve.

3. CO-ORDINATED LOADING

The operator is provided with the following types of plant load control when operating with one or two gas turbines. Instructions are transferred to machines operating at the coordinated level.

(a) Process limit loads:

| Plant Load | GT Firing | HRSG Firing | | |
|---|---|---|---|---|
| Minimum | Minimum | Firing to maintain minimum steam conditions required | | |
| Base | Base | { exhaust temperature | Maximum | { steam press. or |
| Peak | Peak | | Maximum | fired temp. |

(b) Load Reference

KW control is provided for the total output of the three generators. The setpoint is the variable Load Reference which is entered through the Ref/Lim data entry function. Error initiates load increase/decrease instructions to the gas turbines and increase/decrease firing rate instructions to the waste heat boilers. The increase/decrease firing rate instruction to the waste heat boiler or gas turbine control programs causes the gas temperature setpoints to change at the rate to keep steam temperature and temperature rate within allowable limits.

As the value of Load Reference increases, the gas turbines are loaded equally until base load is reached. When the Load Reference is increased beyond this point, the afterburner firing rates are increased together until maximum fired gas temperature or steam pressure is reached (maximum firing). Further increases of Load Reference cause the gas turbine loads to be increased equally until peak load is reached. When a single gas turbine and waste heat boiler are in operation, the same sequence is employed.

Loading rate in co-ordinated control mode is determined by gas temperature ramps that have been preset in the computer. The operator can control loading rates by manipulation of the load setpoint in the operator automatic mode.

Total plant electrical output is prevented from going beyond minimum and maximum limits entered by the operator. In the event of failure of plant auxiliaries such as condensate, circulating or cooling pumps, plant electrical output will be limited either directly by preset load limits stored in the computer or indirectly by precluding the operation of certain components such as the afterburners in the event of condensate pump failure.

4. MODE TRACKING AND SWITCHING (a) Operator Initiated

Equipment can be added to and removed from coordinated control during power generation by control level selection at the control consoles. The KW control is sensing total plant load regardless of the combination of co-ordinated equipment. When a generator is added to load co-ordination, the unit loads are adjusted to conform with the load distribution program. If a unit is taken away from co-ordinated control, future adjustments are made with those remaining at the co-ordinated level.

The necessary tracking, permissive and sequence logic are provided to assure bumpless transfer in both directions to available levels.

(b) Automatic Transfer

Automatic rejection to a lower control level occurs when a malfunction is detected in the co-ordinated control hardware or software. The transfer will be to the operator automatic or the backup mode depending upon the equipment affected by the malfunction.

5. STEAM TURBINE BYPASS VALVE CONTROL

The steam turbine bypass valve functions are:

(a) Header Pressure Control—
   Plant startup
   Gas turbine operation with HRSG wet
   Steam turbine trip
   Gas Turbine trip In the header pressure control mode the steam turbine bypass valve is positioned by a main steam header pressure controller with setpoint fixed approximately 50 psi above the standby steam conditions. The controller is activated in the following situations:

Steam Plant Startup from Hot Standby. As the rate of steam generation increased due to the heat of the gas turbine exhaust and afterburners, the bypass valve will start to open and limit the steam pressure to the level prescribed.

Operation with Gas Turbine only. When operating a gas turbine without the steam turbine with the boiler filled, the steam generated flows to the condenser through the bypass valve which is being positioned to control steam pressure as described.

Steam Turbine Trip. In the event that the steam turbine valves are tripped, the steam pressure controller is permitted to open the bypass and reduce the boiler pressure to the control level from which the steam turbine can be restarted.

(b) Steam Turbine Low Load Control. After the steam turbine is synchronized, the bypass valve is ramped closed. The steam turbine control valves are in back pressure (throttle pressure) limiting control mode at this time and will open as the flow through the bypass valve is decreased. Since this will cause a substantial increase in steam turbine electrical load, the bypass valve must be closed at a rate of acceptable load pickup on the steam turbine generator.

The steam turbine bypass valve is equipped with an A/M station on the BTG Board. Auto Mode must be selected by the operator; manual is selectable by the operator or by the computer in the event of a failure in the control loop.

F. PLANT OPERATING CONTINGENCIES

Plant operating contingencies are defined which require a special response sequence from the plant. Some of these contingencies and their subsequent action sequence are listed herein. The more general contingencies involving major plant equipment are also included.

The following sequences are performed after the occurrence of the indicated contingency:

Steam Turbine Trip

Close steam turbine control valve
Open steam turbine bypass valve
Open steam turbine generator breaker
Close steam turbine stop valve
Close exit line non return valve
Shut down afterburners This assumes that trip is of such a nature as to preclude expedient restart of the Steam Turbine. If the trip was such that the steam turbine could be quickly restarted, then the afterburners would only be reduced to their minimum firing position, and not shut down.

Steam Turbine Generator Trip

Open steam turbine bypasses
Reduce afterburner firing to minimum fuel flow
Steam turbine on running
Standby The above sequence assumes that the steam turbine generator can turn. Otherwise the steam turbine must be shut down.

Condenser Hotwell High Level Trip

Trip steam turbine
Trip afterburners
Trip gas turbines
Open condensate return valve
Close make-up water stop valve
Trip HRSG's

Gas Turbine Trip (One)

Open gas turbine generator breaker
Open individual HRSG bypass-drain valve*
Close boiler stop valve*
Trip afterburner*
Trip HRSG
*on associated HRSG only.

Gas Turbine Generator Trip

A gas turbine generator trip will result in a gas turbine trip.

Afterburner Trip

Trip second afterburner
Secure afterburner fuel systems
Steam turbine control valve closes to limit rate of decay of pressure

Heat Recovery Steam Generator Trip (One)

Shut down afterburner
Open individual HRSG bypass-drain valve
Close boiler stop valve
Trip gas turbine
Close the condensate feed valve
Close the economizer recirculation valve
Close blowdown valve
Shutdown all pumps
   Boiler feed pump
   Standby boiler feed pump
   High pressure circulation pump
   Low pressure circulation pump
Steam turbine control valve closes to maintain pressure.

Condensate Pump Outage

One pump out
   Shutdown both afterburners*
Both pumps out
   Trip afterburners
   Trip steam turbine
   Trip heat recovery steam generators
   Trip gas turbines

*One pump capacity is 80%. This is also plant capacity with afterburners out.

Condenser Circulation Pump Outage

One pump out
  Shutdown afterburners
Two pumps out
  The loss of two condenser circulation pumps will cause the whole plant to trip on loss of vacuum.

Service Water (Cooling Water) Pump Outage

One pump
  This should have no immediate effect on plant performance because remaining pump has 100% capability.
Two pumps
  Alarm both service water pumps out
  Shutdown afterburners
  Trip steam turbine
  Trip gas turbines
  Trip HRSG's

HRSG Feed Pump Outage

The outage of a boiler feed pump results in a HRSG trip.

HRSG High Pressure Circulation Pump Outage

The outage of a high pressure circulation pump results in a HRSG trip.

HRSG Low Pressure Circulation Pump Outage

The outage of a low pressure circulation pump will not trip the HRSG. Normal operation can continue with no immediate change in operating point.

Chemical Feed System Outage

Normal operation can continue within the limits of chemical analysis.

Condenser Tube Failure (Manual Sequence)

Shutdown afterburners
Isolate source of condensate contamination
Reduce plant output to be consistent with condenser vacuum
Continue to operate within the limits of chemical analysis with high flow chemical feed pumps in operation.

Loss of Vacuum

Partial Loss of Vacuum
  Shutdown afterburners
  Reduce plant output to be consistent with condenser vacuum—5" Hg maximum allowable back pressure on ST
Complete Loss of Vacuum
  Shutdown afterburners
  Trip steam turbine
  Trip gas turbines
  Trip HRSG's

High HRSG High Pressure Drum Level

A high level in the high pressure drum will result in a HRSG trip. Special action is required as follows, however:
  Check: High pressure feedwater valve closed Economizer recirculation valve open

High HRSG Low Pressure Drum Level

A high level in the low pressure drum will result in a HRSG trip. Special action is required as follows, however:
  Open low pressure drum blowdown valves.

Low HRSG High Pressure Drum Level

This condition will result in a trip of the HRSG.

Low HRSG Low Pressure Drum Level

This condition will result in a trip of the HRSG.

G. GAS TURBINE CONTROL

Coordinated Control

The following instructions from the coordinated control program package are accepted by the gas turbine controller:
  Off line and return to run standby
  *Min. load
  *Base load
  *Peak load
  Start
  Shutdown
  Load increase
  Load decrease
  Gas turbine trip
*After auto synchronizing The following information concerning gas turbine status is scanned by the coordination programs:
  Ready to start
  Control operating level
  Ready to synchronize
  Min. load
  Base load
  Peak load
  Trip
  IGV status—open/closed
  Power output—MW Aside from the control level, fuel selection and emergency trip pushbuttons, the gas turbine pushbutton control center is inactive during coordinated control.

Operator Automatic Control

The operator automatic control functions are implemented through the digital computer. They provide the operator with the following control capabilities through pushbuttons at the gas turbine control consoles:
  Select control level
  Start and stop turbine
  Auto/manual generator voltage regulation
  Operate field breaker
  Operate generator breaker
  Select auto/manual synchronize
  Select load control or firing temp.
  Enter MW reference
  Enter MW reference ramp
  Hold and restart control reference ramp

Backup Control

This level of operation is independent of the computer. Transfer to this level occurs as a result of computer failure or gas turbine - computer interface malfunction. The following functions are provided:
  Select fuel
  Start and stop the turbine
  Select auto/manual synchronize Transfer fuels
Select fuel transfer rate (fast or slow)
Select firing temperature limit
Test overspeed trip
Select auto/manual fuel control signal
Select auto/manual IGV control
Change fuel reference
Change speed reference

Sequence Logic

The sequencing of all auxiliaries, valves and setpoints required to bring the gas turbine from hot standby to running standby will proceed automatically.

Speed Control

At the coordinated and operator automatic control levels the speed reference is generated by the computer from ignition to synchronous speed. After synchronization the speed reference is set for maximum load at approximately 106% regulation.

Load Control

The operator has control of the KW reference signal at the Operator Automatic Level through load setpoint and rate pushbuttons. At the Coordinated Level loading will proceed at a rate corresponding to 35.4°/min. rate of change of exhaust gas temperature unless the afterburners are shut off or at minimum firing, in which case the exhaust gas temperature rate shall be 7.25°/min.

When the gas turbine has reached base firing temperature the load will be increased by opening the IGV's to the design point (22°) setting.

Protective and Limiting Controls

The following gas turbine protective control functions are provided at the coordinated and operator auto control levels:
 Surge Protection
 Blade Path Temperature Limiting
 *Exhaust Temperature Limiting
 Overspeed
 CSO Low Limit (High & Low)
*Exhaust temperature limiting is not provided in the back-up system.

Interlocks with the Boiler

The following information is exchanged with the boiler controls:
 Stack cover position
 Back pressure normal
 Turbine run permissive
 afterburner permissive
 Gas turbine trip
 Boiler wet/dry

Generator Hydrogen and Seal Oil System

The gas turbines have hydrogen cooled generators. The hydrogen and seal oil systems are equipped hardwired control and alarm annunciator systems locally mounted. The annunciators and motor starters required on the BTG Board will be hardwired.

H. HEAT RECOVERY STEAM GENERATOR CONTROL

The HRSG for the PACE plant comprises a finned-tube superheater, high pressure evaporator, economizer, and low pressure evaporator with drum-mounted deaerator-feedwater heater. The gas turbine exhaust gases are heated before entering the boiler by burners located in the duct connecting it with the gas turbine.

Feedwater flows from the condensate pumps to the deaerator through the low pressure feedwater valve. When the pressure at the turbine extraction point exceeds the deaerator pressure, the check valve in the extraction line opens, thereby allowing steam to flow from the turbine to the deaerator to supplement the steam generated in the low pressure drum. Fluid leaving the low pressure drum enters the boiler feed pump which discharges into the economizer. Feedwater flowing into the high pressure drum from the economizer passes through the high pressure feedwater valve. Excess feedwater flow at steam plant part loads is circulated back to the deaerator through an economizer recirculation valve to prevent economizer steaming. The superheater is equipped with a bypass line and valve. A single throttle valve is located in each fuel line (burners are designed for dual fuel operation).

Coordinated Control

The following instructions from the coordinated control program package are communicated to the HRSG controls:
 Initiate burner sequence
 AB outlet gas temp. setpoint
 Dead computer
 Revert to operator auto
 Shutdown burner
 Start HRSG
 Shutdown HRSG The following status information is scanned by the coordination programs:
 HRSG Status
 AB Status
 All Trips
 Control Level
 AB Ignition Complete
 Runbacks Only the control level selection and fuel selection pushbuttons are functional during coordinated control.

Operator Automatic Control

Through the pushbuttons the operator is able to select:
 Afterburner fuel and transfer
 Afterburner lightoff and shutdown
 HRSG start
 HRSG shutdown
 Gas temp. setpoint

Gas Temperature Control

The main steam temperature is influenced by the gas temperature entering the steam generator. The gas temperature is controlled by afterburner fuel flow. The afterburner fuel throttle valves control to maintain the gas temperature at setpoint. The gas temperature setpoint is ramped up or down by either the operator through the BTG board (Operator Auto Level) or the coordinated control load distribution program. The steam temperature is to be no less than 700° F. nor greater than 952° F. In addition, the fuel valve signal may not be increased beyond the point at which the superheater outlet pressure reaches 1250 PSIA. While the afterburner lightoff sequence is in progress, the afterburner fuel throttle valves will control to maintain burner lightoff valve position. The fuel pressure to the afterburners is prevented from going below their maximum turndown capability when the burners are lit.

From the allowable rate of change of steam turbine throttle temperature, the rate of change (ramp) of the afterburner fired gas temperature is preset in the controls. The afterburner fuel throttle valves are equipped with A/M stations on the operator's console. Manual action is limited by a safety cutback on superheater inlet gas temperature.

The superheater bypass is fully closed until the steam temperature reaches 952°. It then opens to limit steam temperature as additional afterburner fuel flow is called. The superheater bypass valve is equipped with an A/M station on the operator's console. The automatic mode must be selected by the operator; manual is selectable by the operator or by a high steam temperature runback.

Burner Lightoff Sequence

The afterburner sequence package can receive a request to light the afterburner from the operator through the HRSG pushbutton input matrix (Operator Auto Level) or internally from the coordinated control packages plant startup program.

Upon receipt of a signal to light the afterburner, the logic system checks the following permissives:
1. HRSG in run status
2. No HRSG trip conditions
3. Gas turbine above afterburner ignition speed
4. Afterburner system ready If all permissives are met, logic system resets fuel throttle valves to lightoff positions and initiates safety system ignition sequence.

Upon receipt of a signal from the HRSG controls indicating that lightoff has been completed so that the fuel demand may be varied, the fuel demand setpoint is permitted to vary as required.

The fired gas temperature remains fixed during the initial loading of the steam turbine.

When the steam turbine takes on initial load, the gas temperature rises at the rate prescribed until the desired plant load or limit is reached.

HP Drum Level Controls

HP drums as equipped with electronic feedwater control systems of the three element type such that the boiler drum level for the H.P. elements shall be maintained within the limits required for safe operation and specified performance during all operating conditions. H.P. drum feedwater flow, steam flow and H.P. drum level signals are employed for the high pressure drum level control.

Since the steam turbine operates with valves wide open over much of its load range, the steam pressure leaving the superheater will vary from approximately 380 to 1250. The pressure in the economizer remains relatively constant with the result that substantial throttling will occur across the high pressure feedwater valve over much of the plant load range.

When the plant is on standby, the steam flow from each waste heat boiler is less than 1% of full load flow. Level control will be single element with proportional control of the feedwater valves. Both feedwater valves are equipped with A/M stations on the BTG Board.

Deaerator Tank and Hotwell Level Controls

The steam turbine and the condenser in the PACE-260 plant have common centerlines and elevations. This results in a design with a very shallow hotwell with much more stringent level control requirements than is typical of conventional utility generating units. As a result, the hotwell level control is of the conventional three-element type utilizing measurements of steam flow to the condenser, total condensate flow to the deaerator, and hotwell level to control hotwell level.

The two deaerator tanks fed from a common source of feedwater comprise an interacting system. Difference in level between the deaerators is used to open one condensate valve more than the other. If either tank level exceeds a high limit, the return valve opens to remove water. If either level reaches a low limit, the makeup valve opens to admit water.

At total plant hot standby each condensate valve is controlled by the deaerator tank level of the HRSG to which it is connected, and the makeup and return valves are controlled directly by hotwell level. The makeup, makeup return, and condensate valves are equipped with A/M stations.

Deaerator Pressure Trim System

The pressure in the deaerator is prevented from falling below the minimum allowable by a self-contained pressure regulator in the line from the high pressure drum.

Economizer Recirculation System

The economizer recirculation system maintains full flow through the economizer over the full range of plant loads (steam flows) by circulating that portion of economizer flow not required by the high pressure drum back to the deaerator. The controller modulates the economizer recirculation valve in proportion to the error between its setpoint and the signal coming from a flow transmitter in the line from the low pressure drum to the boiler feed pump. The valve is equipped with an A/M station on the BTG Board.

I. STEAM TURBINE CONTROL

The single element non-reheat steam turbine is equipped with two stop valves and two control valves. One stop valve is feeding each control valve. The control valves are always operated in parallel (single valve).

The need for quick plant startup and loading is vital to the success of the combined cycle concept, particularly for peaking units. Allowable steam turbine acceleration and loading rates are dependent on steam and rotor temperatures. The steam turbine inlet conditions and rotor temperature will be monitored at the coordinated and automatic turbine startup control levels.

Due to the complexity of the protective schemes, the main logic is implemented in software. However, a simplified version must be provided in the analog portion to permit steam turbine operation at the manual level with additional operator responsibilities.

Coordinated Control

Turbine start, loading, and shutdown commands are accepted from the coordination program package. Turbine status information is used by the coordination programs for plant startup and loading sequencing. At the coordinated level, the control is transferred to the coordinated section. Operator initiated transfer to operator automatic or manual originates at the steam turbine control panel.

Operator Automatic Control

The steam turbine pushbuttons provide the operator with the following control capabilities:
 Set the target speed reference
 Set the acceleration rate
 Select the automatic synchronizer Set the loading rate
 Initiate the turbine acceleration program
 Perform valve test
 Perform OPC test
 Index the valve position limit.

Manual Control

At the manual control level the operator controls valve position directly. Valve test can be completed but not initiated at this level.

Speed Control

The speed control loop positions the control valves through the hybrid interface. The speed reference can be indexed by the ATS program, the automatic synchronizer, or the operator, depending upon the control level. The rate of change of the speed reference can be adjusted, up to the preset maximum, by the Automatic Turbine Startup, ATS program or the operator.

Automatic Turbine Startup

Prior to the initiation of automatic turbine startup from hot standby, the steam turbine is latched, autostop oil pressure is established, and the turbine stop valves are wide open. The operating mechanism on the extraction line non-return valve(s) is energized to allow the valve(s) to open when proper pressure conditions exist.

In addition to the standard checks performed by the ATS program prior to admitting steam to the turbine, the control valves are not permitted to open until the throttle steam temperature is 50° F. above the rotor temperature except in the 800°–930° rotor temperature region.

The maximum turbine acceleration rate is fixed and equal to 20%/min.=720 RPM/min. However, the rate is reduced by the ATS program to protect the steam turbine against such abnormal operating conditions as excessive vibration, differential expansion, bearing temperature, etc. as provided by the program.

The steam turbine is synchronized with the system by the automatic synchronizer, and the generator breaker closed. Following synchronization, the control valves open to carry minimum load. The control valves continue to open and the bypass valve closes to maintain pressure. The control valves cannot be opened faster than the rate of HRSG steam production permits. The minimum turbine inlet pressure must be maintained.

During normal load operation (control valves wide open), the steam turbine load is dictated by the turbine inlet and exhaust conditions. The turbine load can be varied, when required, by changing the inlet steam conditions at the specified temperature rate. The actual temperature ramp is monitored by a recorder and alarmed if the measured rate is outside acceptable limits.

Load Control

When the steam turbine operator breaker is closed and the MW (electrical code) signal is in service, the MW setpoint can be adjusted by the Plant Unit Master at the Coordinated Control Level until all the generated steam is passing through the steam turbine. At this point the turbine assumes a turbine following role. At the Operator Automatic Level the operator can adjust the MW load setpoint and setpoint rate.

Throttle Pressure Control (TPC)

Whenever the steam turbine is operating above its Hot Standby mode the steam turbine throttle pressure is prevented from falling below 350 psia by closing the control valves as required.

During single HRSG operation, or operation with two HRSG's in parallel but at different flows, throttle pressure is maintained above a minimum limit as a function of HRSG steam flow. This reduces the probability of water carryover into the steam turbine by preventing excessive steam velocity through the HRSG's.

If a transfer from two to one HRSG operation occurs, the throttle pressure is slowly reduced to the one HRSG setpoint value.

Overspeed Protection System (OPC)

In the event that the generator breaker is suddenly opened when the steam turbine is carrying load, the overspeed protection system (OPC) is triggered if the initial load was above 30%. An OPC action is also indicated if the turbine speed exceeded 103%. The OPC closes both control valves. Simultaneously, the turbine control system is switched to the speed control mode and the speed reference is reset to rated speed. The speed loop closes the control valves to prevent overspeed. If the generator breaker opens and the overspeed protection system (OPC) operates and limits speed below overspeed trip setting (110% rated speed), the steam turbine returns to the run standby status. Exceeding the overspeed trip setting will reject the turbine to the hot or cold standby status, depending on other plant conditions.

There is a 3 position key switch on the operator's panel, marked "OPC." The positions are:
1. OPC Test
2. In Service
3. Overspeed Test Permissive In the OPC Test position, the OPC solenoid valves and the hydraulic dump system are tested by applying a voltage to the OPC solenoid coils. This action can be initiated only during speed control (main generator breaker not closed).

In Service is the normal operating position.

In the Overspeed Test Permissive position, the OPC is locked out to permit the speed to raise to the mechanical overspeed trip setpoint to allow checking of the trip mechanism. A small indicating lamp is furnished for this switch position. If an OPC action is initiated when the turbine control system is in the manual mode the manual valve condition position signal will be run back to Full Closed.

If in the operator auto or coordinated control modes, OPC action will close both control valves through the action of the OPC relay, and the control system transfer to speed control with the reference set to rated speed (3600 RPM). This places the steam turbine in a run standby condition, ready for re-synchronization.

Monitor

An ATS program monitors process variables for out-of-limit (alarm) and trip conditions.

Automatic Synchronization

The steam turbine software package uses the hardware automatic synchronizer of the type employed by the gas turbine control system.

Turbine Trips

The steam turbine is tripped by one or more of the following signals:
 Low bearing oil pressure
 Thrust bearing
 Low vacuum
 Overspeed trip
 EH fluid reservoir lockout trip
 Low EH fluid pressure
 EH power supply failure
 High hotwell level
 Plant trips Additional trips are provided during load control:
 Turbine motoring longer than 1 min.
 Frequency less than 58.5 Hz.

All of the above conditions must be cleared before the turbine can be relatched. Relatching is initiated by pushbutton on the steam turbine control console.

When the turbine trips, the control, the stop and the extraction line non return valves go completely closed.

OPERATION OF COORDINATED CONTROL SYSTEM

1. CONTROL SYSTEM HARDWARE COMPONENTS AND ORGANIZATION

Figure 4A:
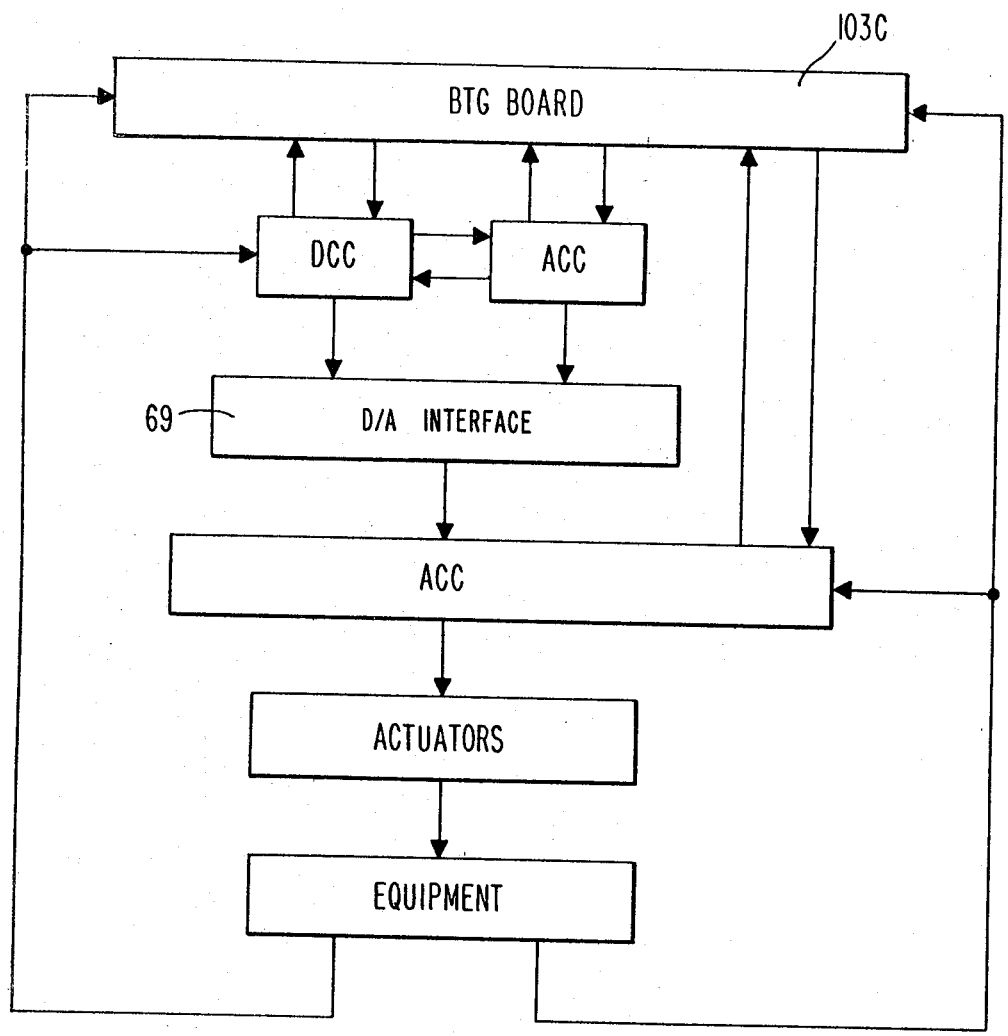
FIG. 4A is a block diagram showing the major hardware components of a digital/analog control system of the invention.

Referring not to FIG. 4A, there is seen a block diagram of the major hardware portions of control system 50 of this invention, in combination with the plant equipment. The BTG board 103C is the boiler/turbine/generator board which comprises push button for operator control of those units, and is a portion of the overall operator panel 102C. Interfacing with the BTG board is the digital control center (DDC) and the analog control center (ACC), which control centers track each other. The ACC comprises analog control circuitry and runback and permissive circuitry, as well as input/output circuitry, switching circuitry, etc. Both of these control centers output to digital/analog interface 69. The output of the D/A 69 is connected to a further portion of the ACC, which outputs to the equipment actuators which in turn control the plant equipment. Feedback signals of sensed equipment conditions are returned to the BTG board, the DCC and the ACC.

Figure 6P:
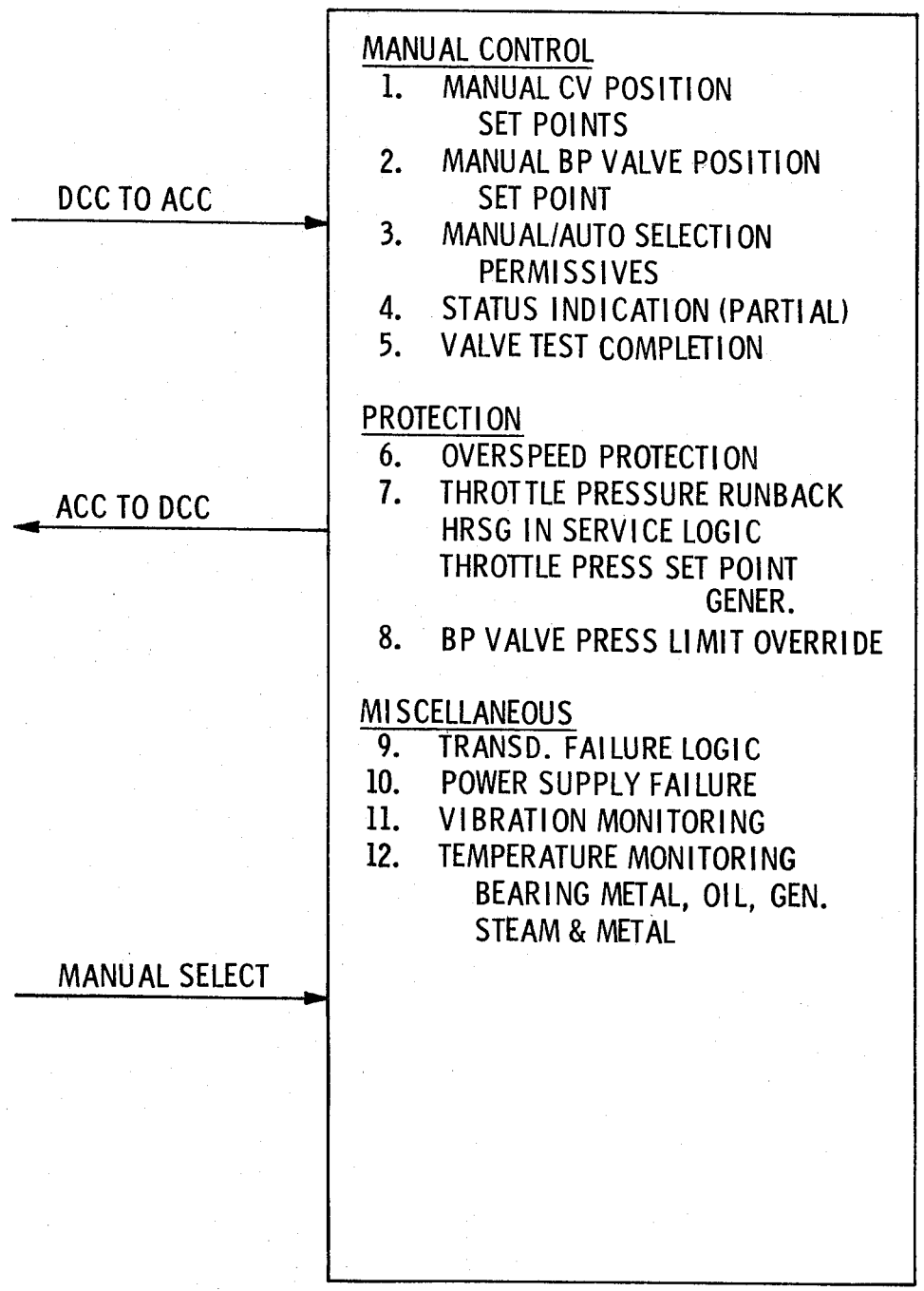
FIG. 6P indicates functions performed at the analog control center for the steam turbine.
Figure 6Q:
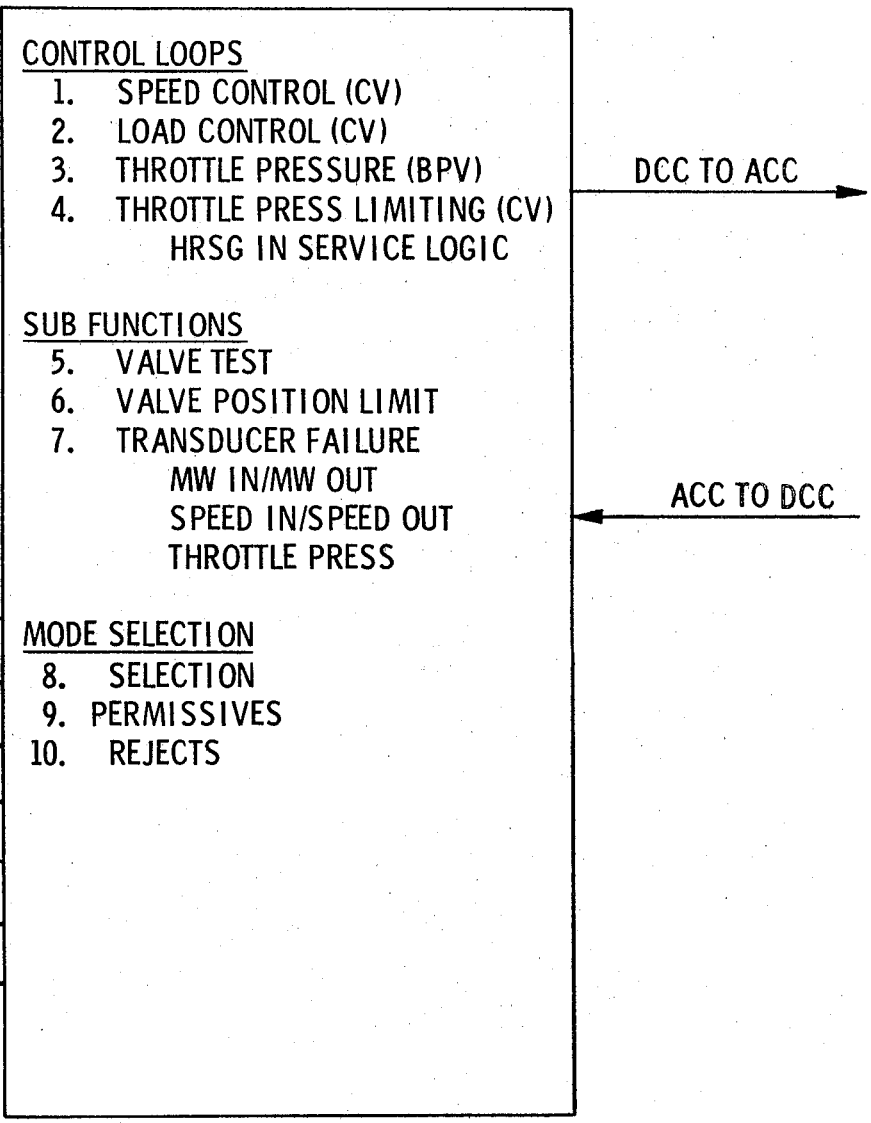
FIGS. 6Q and 6R indicate functions performed at the digital control center for the steam turbine.
Figure 6R:
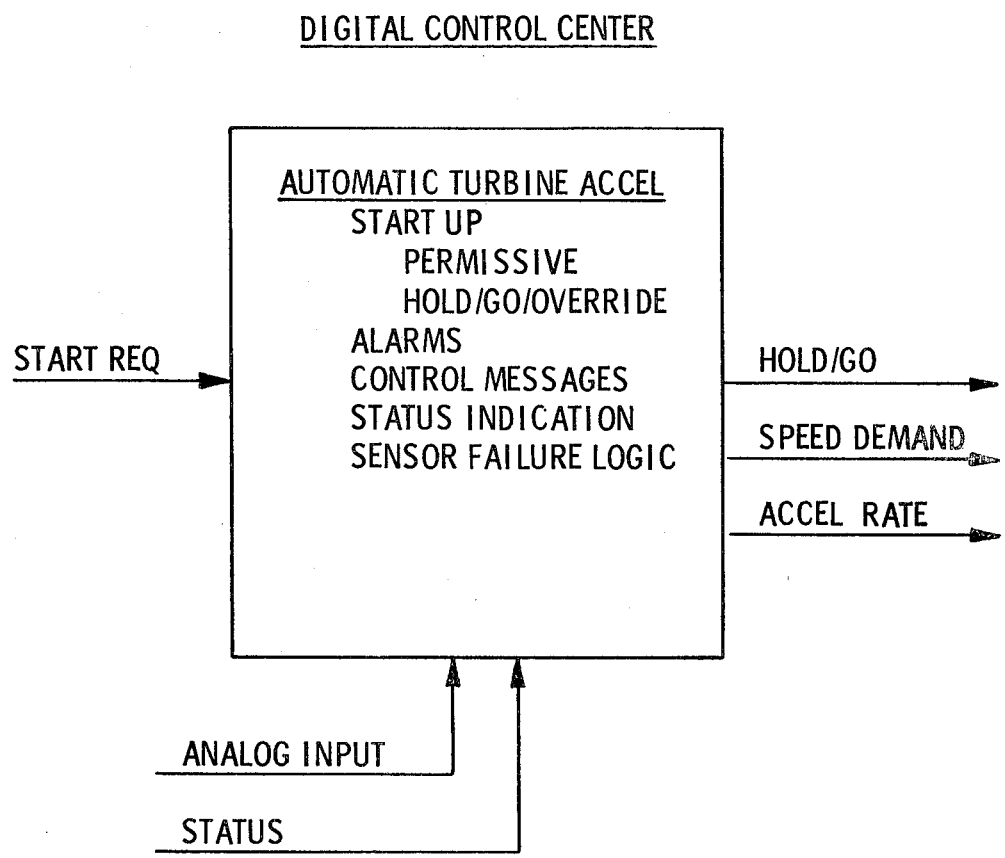
Figure 6S:
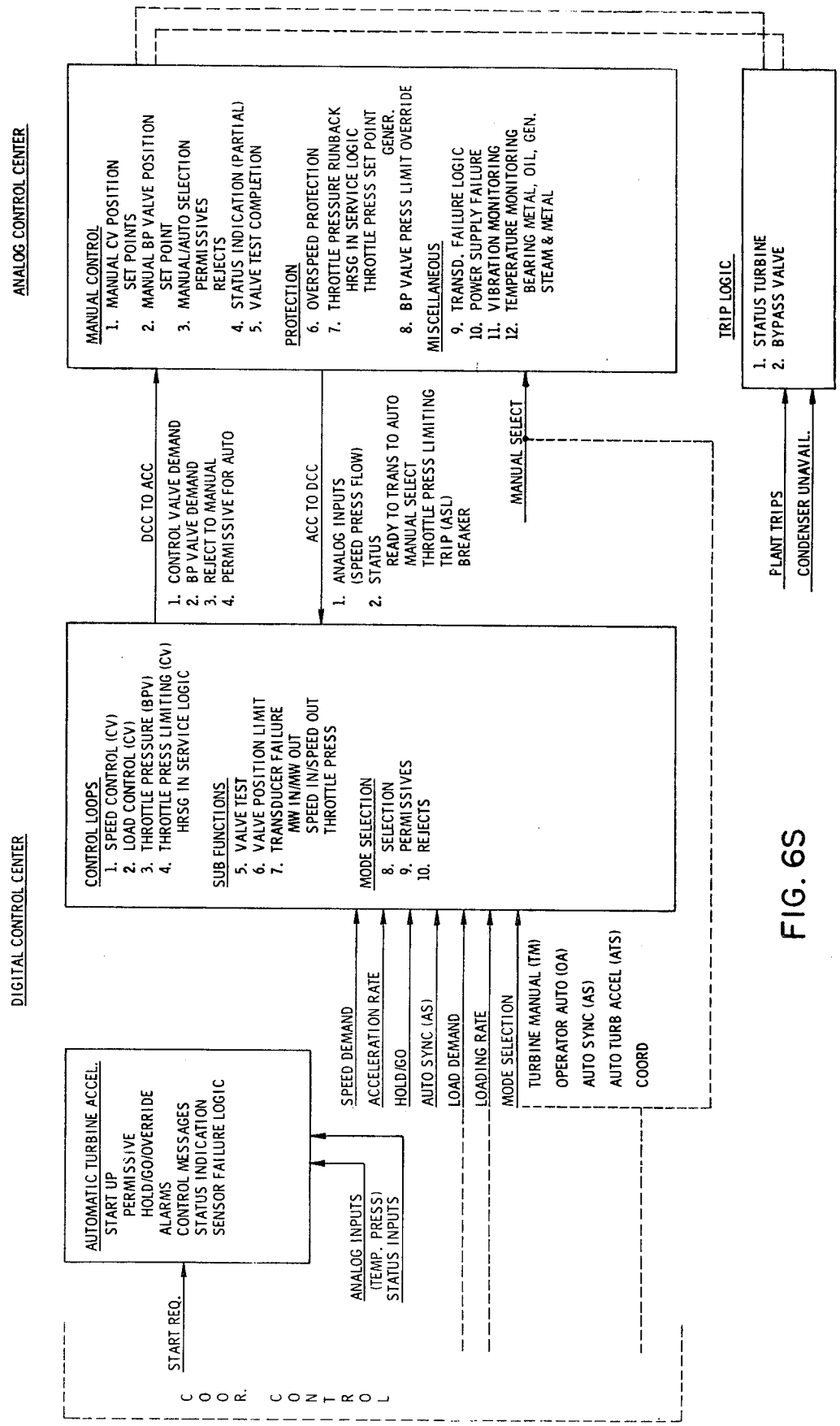
FIG. 6S shows the combined analog and digital control for the steam turbine.
Figure 6T:
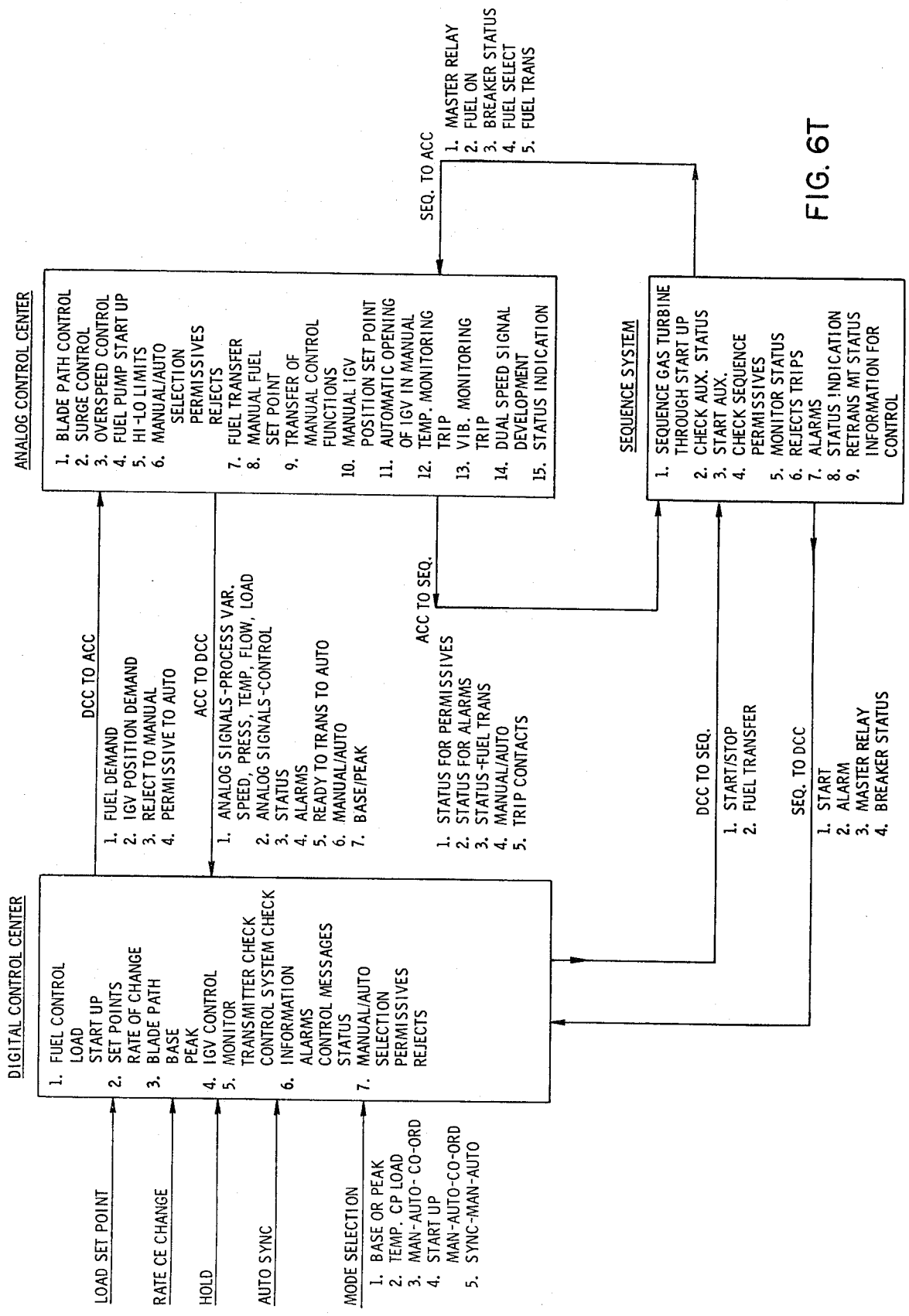
FIG. 6T shows the combined analog and digital control for each gas turbine.

FIGS. 6P, 6Q and 6R list in detail the functions and protection mechanisms of the analog control center (ACC) and digital control center (DCC) shown in FIG. 4A, and FIGS. 6S and 6T show the way in which they interface to one another, and to other portions of the control system according to the present invention.

Referring to FIG. 5A, there is shown a more specific block diagram of the digital control system organization for the digital portion of the control system of this invention. Interrupt wiring 55, e.g., contact closure outputs, are connected to monitor-executive programs 56. The connected signals include service request interrupts (SRI) and external interrupts (EI). The monitor-excutive programs comprise an operating system which sets the hierarchical system for the digital computer operation, and comprises a standard package. The output from block 56 goes to block 58, designated "Paceware Operating Programs". These programs are suitably the Westinghouse PROGEN package, which performs additional functions similar to the monitor/executive programs, such as analog input scanning, and contact output bookkeeping. Every second an output is provided from block 58 to a visual display program 59, which provides for digital displays.

The BTG push button wiring 103C inputs to the BTG board decode program 60, which provides appropriate digital signals representative of the BTG board inputs. Program 60 interacts with the BTG board system block 61, which makes responses to the signals from block 60 and passes them to logic system 67 and the control system 50A, where control signals are produced in accordance with produced in accordance with programmed subroutines. Additional plant wiring 65 is scanned by the digital scan program 66, which provides inputs to logic 67 as well. Logic system 67 provides outputs to the BTG lamps 68, and inputs to control system 50A. System 50A is bid every second by the auxiliary sync program 62, which program also periodically bids the analog scan program 64, which derives signals from the plant instrumentation 63 and passes them through to the control system 50A. The output of system 50A is directed to the D/A 69, which provide appropriate analog outputs for transmission to equipment actuators.

Still referring to FIG. 5A, as well as Table I set forth hereinbelow, the monitor executive programs establish a control computer priority for all digital computer operations. The priority assignment for the subject invention is set forth in Table I, level F being the highest priority, and level 0 being the lowest priority. The three control function levels are 9 (coordinated control), 8 (GT control) and 7 (ST control), the coordinated control being the highest priority.

TABLE I

| CONTROL COMPUTER PRIORITY ASSIGNMENT | | |
| --- | --- | --- |
| Level | Function | Frequency |
| F | Contact Scan/Stop-Initialize | Demand |
| E | Auxiliary Sync | 0.1 second |
| D | Panel (BTG Board) | Demand |
| C | Analog Scan | 1/30 second |
| B | GT Logic | Demand |
| A | ST Logic | Demand |
| 9 | Coordinated Control | 1 second |
| 8 | GT Control | 1/30 second |
| 7 | ST Control | 1 second |
| 6 | Visual Display | 1 second |
| 5 | Data Link | 1 second |
| 4 | Programmers Console | Demand |
| 3 | Simulation | 1 second |
| 2 | Bootstrap | Demand |
| 1 | Loader | Demand |
| 0 | Timing Task | Free Time |

2. COMBINED CYCLE DIGITAL CONTROL SYSTEM HIERARCHY

Figure 13D:
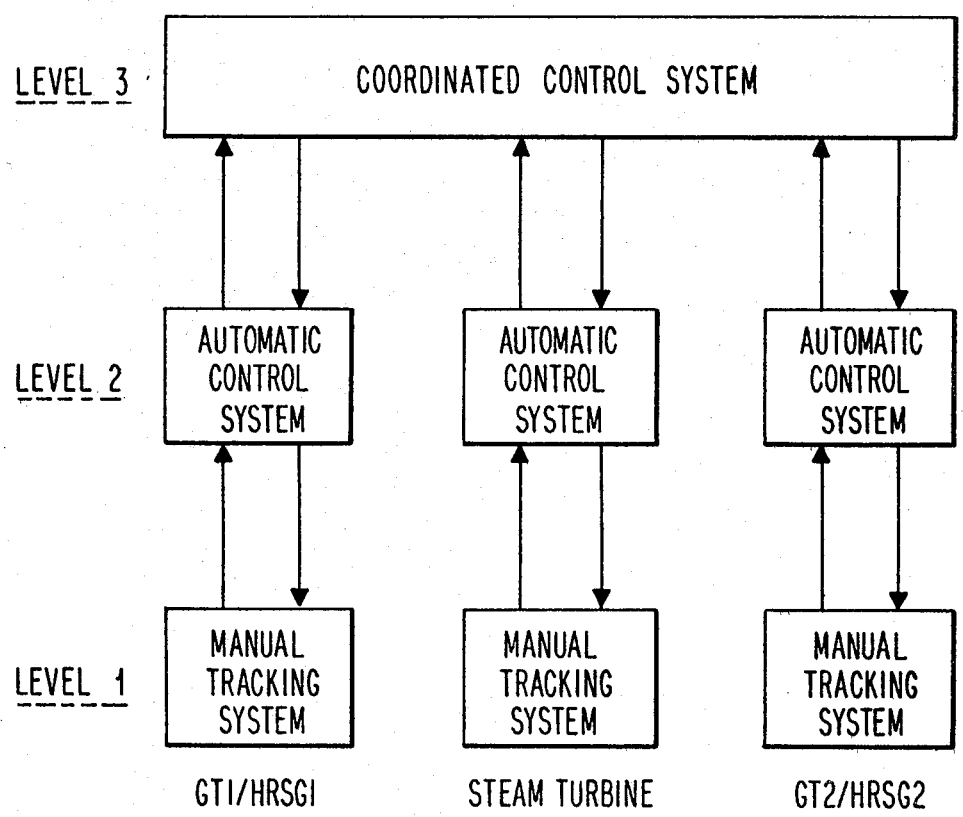
FIG. 13D is a block diagram representing the hierarchy of the digital portion of the control system of the invention.

Referring now to FIG. 13D, there is shown a block diagram, representing the digital control system hierarchy of the system of this invention. At the top level is shown the coordinated control system, which as stated hereinabove is the highest level of operation. When in coordinated control, the system maximizes the extent of digital control. The second level of digital control is in operator automatic, illustrated by the three blocks titled "AUTOMATIC CONTROL SYSTEM" for each gas turbine and associated HRSG, as well as the steam turbine. Thus, when any one of the three turbines, or all three of them, are under the operator automatic mode of control, certain control functions (at the 8 level) are carried out by the digital computer. As will be expanded upon hereinafter, any combination of the three turbines and two afterburners can be in the coordinated control mode, and the others in automatic control. FIG. 13D also shows three bocks designated "manual tracking system", with arrows shown going to and from each block corresponding to the three turbines, indicating that the manual and digital control subsystems track each other, so that transfer from one to the other for any one or all of the turbines is bumpless.

3. CONTROL SYSTEM FUNCTIONAL ORGANIZATION

Figure 7C:
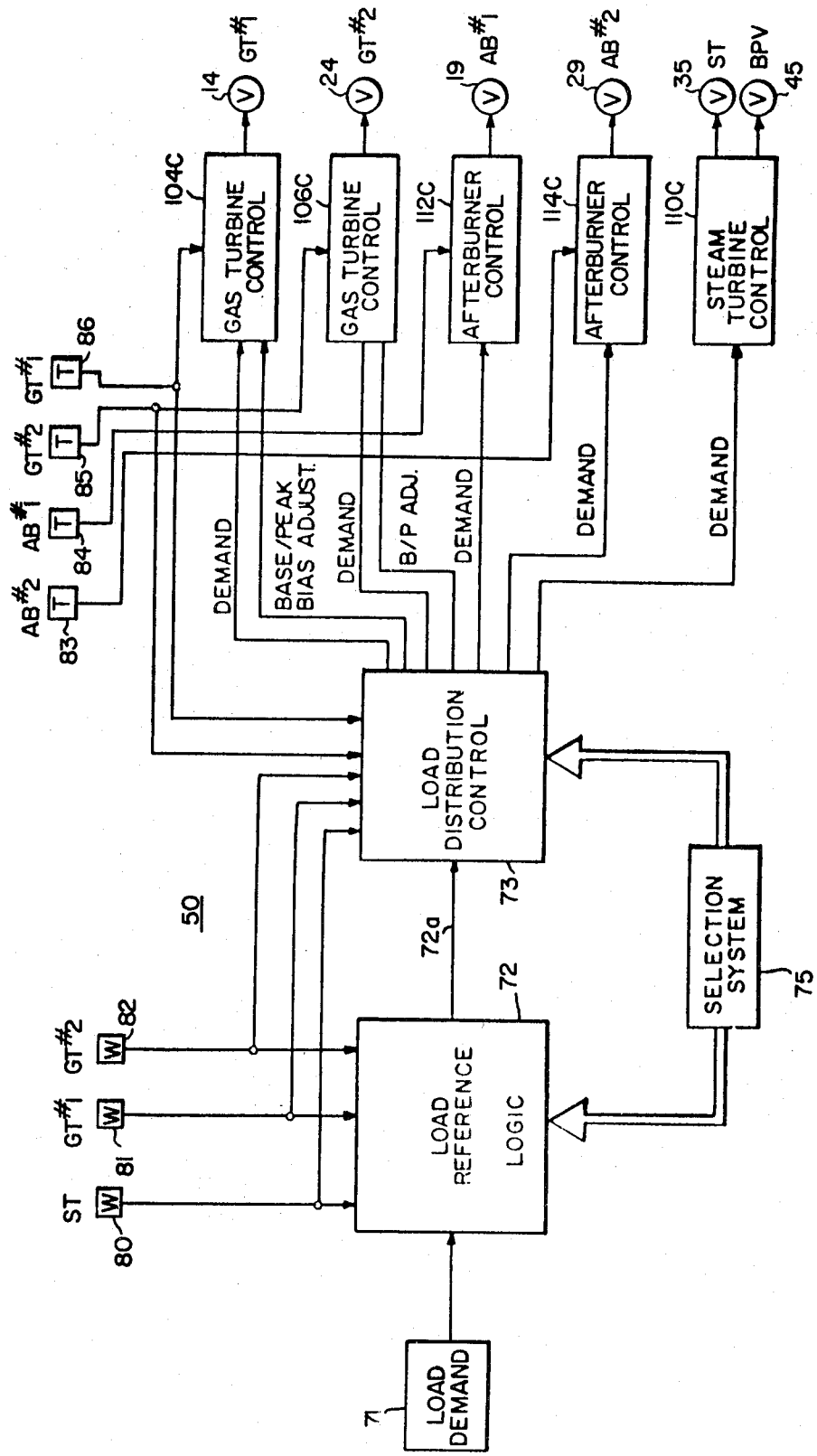

Referring now to FIG. 7C, which is similar to FIG. 3, there is shown in greater detail the nature of the control system 50. As indicated in FIG. 7C, the control system 50 includes a load demand unit 71 which generates an electrical signal representing the desired total plant output power level. Unit 71 includes means for enabling the plant operator or engineer to change the load demand signal to any value he may wish to select. The load demand signal from unit 71 is supplied to a load reference logic unit 72 which also receives the low level output signals from the megawatt sensors 80, 81 and 82. Load reference logic unit 72 produces on its output line a load reference signal which, depending on the operating mode, may or may not be the same as the load demand signal from unit 71. The load reference signal from unit 42 is the computed signal which directs the manner in which the system will move to the load demand, and is supplied to a load distribution control unit 43.

Load distribution control 43 sends appropriate individual demand signals to a first gas turbine control 104C which drives the first gas turbine fuel valve 14, a second gas turbine control 106C which drives the second gas turbine fuel valve 24, a first afterburner control 112C which drives the first afterburner fuel valve 19, a second afterburner control 114C which drives the second afterburner fuel valve 29, and a steam turbine control 110C which controls the steam turnbine throttle valve 35 and the steam bypass valve 45. Temperature indicating signals from temperature sensors 86, 84, 85 and 83 are supplied to the gas turbine control 104C, the afterburner control 112C, the gas turbine control 106C and the afterburner control 114C, respectively. Signals from temperature sensors 86 and 85 are also supplied to the load distribution control 73. Various operating modes for the laod reference logic 72 and the load distribution control 73 are established by signals supplied to these units by a selection system 75.

Still referring to FIG. 7C, it is to be noted that the functions of blocks 72, 73, 75, 104C, 106C, 110C, 112C and 114C are carried out by combined digital and analog circuitry, i.e., by the ACC and DCC in combination. The exact control configuration depends upon the selected mode of control, as has been discussed. The selection system 75 includes an array of backlighed push-button switches and status lights which are mounted on operator panel 102C. The specific switches, instruments and control devices have not been illustrated for the sake of simplicity.

4. COORDINATED CONTROL BIDDING SEQUENCE

Referring now to FIG. 8F, the coordinated control bidding sequence is shown in block diagram form. It is to be noted that each block of the bidding sequence is at a 9 level, and that as indicated in Table I this is the highest periodically bid level of the computer control system. The 9 level is bid every one second, subject to interruption by a higher level demand bid. The first program, plant trouble monitor 900B, establishes conditions for providing annunciator and typewriter messages. This is primarily a bookkeeping program. The next bid program is 900A, titled Boiler Startup Monitor, which scans logic state representative of a plurality of HRSG conditions, forms bookkeeping on the system logic states, and sets start and stop contact outputs. This program bids program 9009 just before exit.

Program 9009, the coordinated turbine startup monitor, monitors logic states of the three turbines, performs bookkeeping functions upon the process logical variables, and produces annunciator and typewriter messages. Just prior to exit, this program bids program 9008. Program 9008 is the select operating mode program, and is the primary place in the coordinated control 9 level bidding sequence where control mode bookkeeping and logic functions are performed. The program determines whether any given ones of the turbines and afterburners are in coordinated control, and according to this determination logic steps are performed to provide for the selected coordinated control. This program also includes carrying out of the REFDMD algorithm which produces the reference signal V6992, which in FIG. 7C is the output of load reference block 72. Just prior to exit, this program bids program 9007.

Program 9007 is the steam turbine/boiler load distribution program, wherein it is determined whether the steam turbine is to load or unload. When the steam turbine unloads, it unloads to a minimum target load, where the turbine trips. If the steam turbine is in coordinated control and is to loaded, this program calls for loading to the maximum power level, or 102 MW.

Figure 9D:
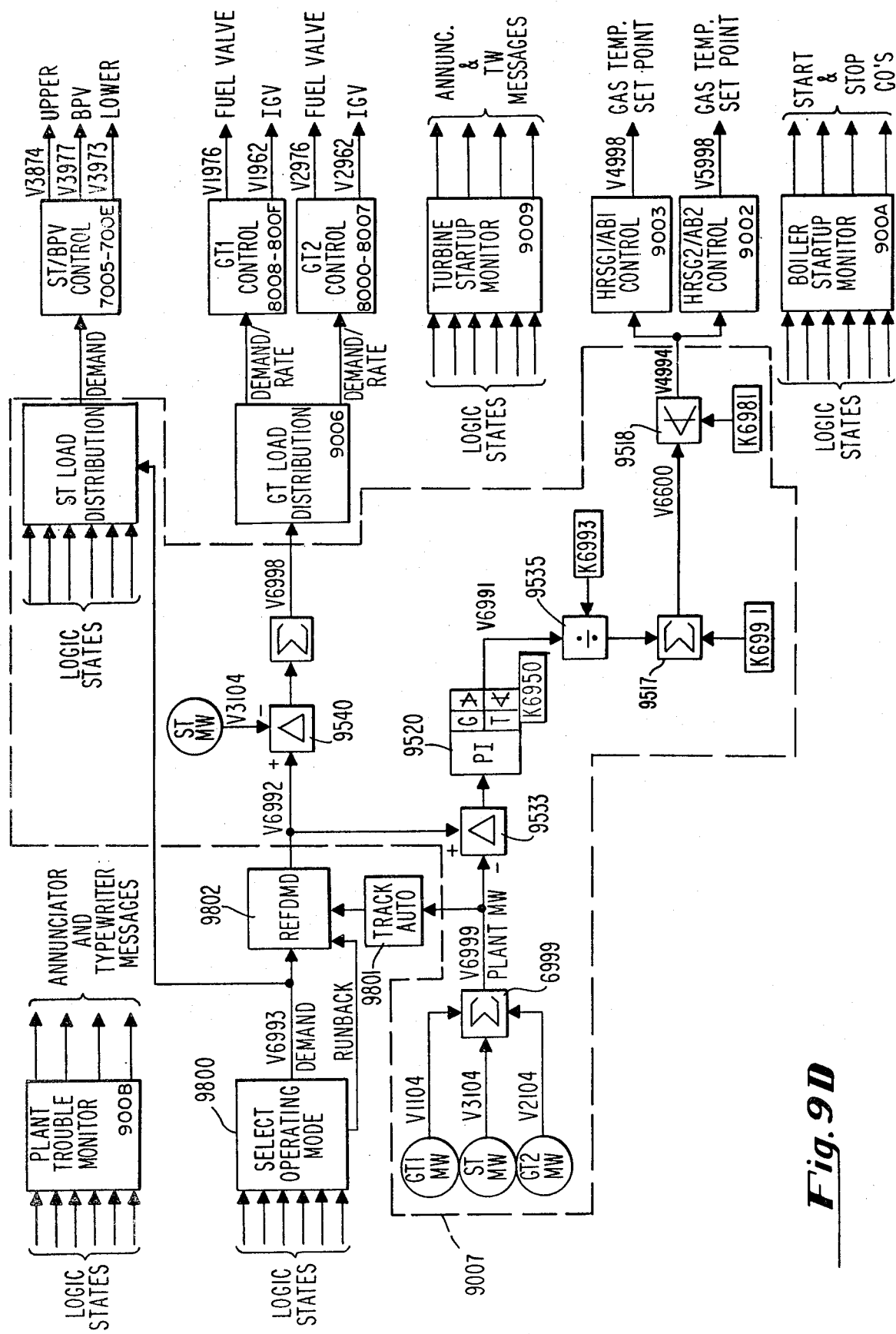
FIG. 9D is a functional block diagram of the coordinate control system.

Program 9007 also calculates the gas temperature setpoint supervision, which is discussed functionally in connection with FIG. 9D, the coordinated control functional diagram. This program generates the setpoint input signal for the HRSG/AB control programs, as well as the total GT load demands signal. Just before exit, this program bids program 9006.

Program 9006 is the gas turbine load distribution program, which checks the logical states to determine which gas turbines are in coordinated control and the state of the gas turbine breakers, and generates demand and rate signals for each gas turbine control program (which latter programs are carried out at the 8 level). Just prior to exit, this program bids program 9003, which in turn bids 9002 upon completion. Programs 9003 and 9002 are the HRSG/AB control programs, for boilers 1 and 2 respectively. These programs bookkeep respective logic conditions and pass through the gas temperature setpoint signals to the respective afterburners when appropriate.

In the discussion to follow of certain digital program packages of the control system of this invention, reference will be made to Process Real Variables, Process Logical Variables, and system Constants. These are set forth in the following Glossary:

| PROCESS LOGIC VARIABLES ||
|---|---|
| L1079 GT1 Flame On CI | L6042 Run Status Lamp CO |
| L1082 GT1 4X CI | L6045 HRSG1 Flame Status Lamp |
| L1090 GT1 Trip Reset CI | L6049 AB Min Status Lamp CO |
| L1121 GT1 Coord. Button Lamp | L6050 AB Reg Status Lamp CO |
| L1965 GT1 Auto Sync Reject | L6051 AB Max Status Lamp CO |
| L1966 GT1 Auto Start | L6065 Plant Coord. |
| L1971 GT1 Auto Sync | L6066 Plant Auto |
| L1975 GT1 IGV Manual | L6067 Load Control Button Lamp |
| L1976 GT1 Fuel Valve Manual | L6068 GT Button Lamp |
| L1994 GT1 Breaker Flip Flop | L6069 GT2 Coord. |
| L1995 GT1 MW Unreliable | L6070 Coord. Panel Coord. Select GT2/State and Lamp |
| L2079 GT2 Flame On CI | |
| L2082 GT2 4X CI | L6071 Coord. Panel Ready GT2/State and Lamp |
| L2090 GT2 Trip Reset CI | |
| L2121 GT2 Coord. Button Lamp | L6072 Coord. Panel OP Auto Select GT2/State and Lamp OR GT2 Coord. Reject Lamp |
| L2965 GT2 Auto Sync Reject | |
| L2966 GT2 Auto Start | |
| L2971 GT2 Auto Sync | L6073 HRSG2 COORD. - HRSG2 in coordinated control |
| L2975 GT2 IGV Manual | |
| L2976 GT2 Fuel Valve Manual | L6074 HRSG2 COORD. Select |
| L2994 GT2 Bkr FF | L6075 HRSG2 Ready for Coord. |
| L2995 GT2 MW Unreliable | L6076 HRSG2 Coord. Reject OR COORD. PANEL Op Auto Select HRSG2/State and Lamp |
| L3106 One Condensate Pump Runback | |
| L3182 ST Standby Monitor Lamp | |
| L3183 ST Hot Standby Monitor Lamp | L6077 GT1 Coord. |
| L3184 ST ACC Monitor Lamp | L6078 Coord. Panel Coord. Select GT1/State and Lamp |
| L3188 ST Follow | |
| L3197 ST MW Unreliable | L6079 Coord. Panel Ready GT1/ State and Lamp |
| L3225 Hold/State and Lamp | |
| L3231 AB/State and Lamp | L6080 Coord. Panel Op Auto Select GT1/State and Lamp OR GT1 Coord. Reject Lamp |
| L3290 ST Coord. Button Lamp | |
| L3299 ST Coord. Trip | |
| L3953 ST Standby | L6081 HRSG1 COORD. - HRSG1 in coordinated control |
| L3954 ST Hot Standby | |
| L3963 ST Auto Start | L6082 Coord. Select Button and Lamp, HRSG1 |
| L3965 ST Auto Sync Reject | |
| L3966 ST Bkr FF | L6083 Coord. Panel Ready HRSG1/ State and Lamp |
| L3971 ST Auto Sync | |
| L3976 ST Control Valves Manual | L6084 Op Auto Select HRSG1 Button and Lamp, OR HRSG1 OP Coord. Reject |
| L3977 ST BPV Manual | |
| L3994 AB Hold | |
| L3998 ST Control Valves Open | L6085 ST COORD. |
| L3999 ST Latch | L6086 Coord. Panel Coord. Select ST/State and Lamp |
| L4001 HRSG1 START AB CO | |
| L4002 HRSG1 RUN CO | L6087 Coord. Panel Ready ST/State and Lamp |
| L4003 HRSG1 STANDBY CO | |
| L4004 AB1 Stop CO | L6088 Coord. Panel Coord. ST/State and Lamp OR ST COORD. Reject Lamp |
| L4005 AB1 Auto CO | |
| L4051 HRSG1 STANDBY CI | |
| L4052 HRSG1 Trip Contact Input | L6090 Control Coord. Keyboard Enable CO |
| L4053 HRSG1 RUN CI | |
| L4054 HRSG1 AB Flame On CI | L6091 Coord. Hold |
| L4055 HRSG1 Plant Runback CI | L6092 Coord. GO |
| L4056 SH1 Outlet Temp Change >7.5° C. F/Min CI | L6093 Normal Stop |
| | L6094 Tuning Switch Lamp |
| L4061 HRSG1 Dry CI | L6100 Tuning Switch CI |
| L4998 AB1 Ready For Coord. | L6102 Control Coord. Keyboard Enable CI |
| L4999 New Value Entered | |
| L5001 HRSG2 Start AB CO | L6104 BTG Power Fail CI |
| L5002 HRSG2 Run CO | L6154 Coord. Reject Ann. CO |
| L5003 HRSG2 Standby CO | L6155 Auto Sync Reject Ann CO |
| L5004 AB2 Stop CO | L6157 Plant Demand Runback CO |
| L5005 AB2 Auto CO | L6158 Plant Load Unit - One |
| L5051 HRSG2 Standby CI | L6161 GT1 Trip Ann. CO |
| L5052 HRSG2 Trip Contact Input | L6162 HRSG1 Trip Ann. CO |
| L5053 HRSG2 Run CI | L6163 GT2 Trip Ann. CO |
| L5054 HRSG2 AB Flame On CI | L6164 HRSG2 Trip Ann. CO |
| L5055 HRSG2 Plant Runback CI | L6166 Control Message Ann. CO |
| L5056 SH2 Outlet Temp Change >7.5° C. F/Min CI | L6167 Data Link on AD Converter Fail CO |
| L5061 HRSG2 Dry CI | L6980 COORD. ST UNLOAD |
| L5996 AB2 Manual | L6982 Keyboard Valid |
| L5998 AB2 Ready for Coord. | L6985 Computed GO/HOLD Reset |
| L6013 HRSG2 Dry Status Lamp | |
| L6014 Standby Status Lamp CO | L6986 Computed Hold |
| L6015 Hot Standby Status Lamp CO | L6987 Hold Button Pushed |
| L6016 Run Status Lamp CO | L6988 GO Button Pushed |
| L6019 HRSG2 Flame Status Lamp | L6990 Coord. Unload (AB Unload?) |
| L6023 AB Min Status Lamp CO | |
| L6024 AB Reg Status Lamp CO | L6991 Delay Control Message Ann. Clear |
| L6025 AB Max Status Lamp CO | |

-continued

PROCESS LOGIC VARIABLES

| | | | |
|---|---|---|---|
| L6027 | ST Standby Status Lamp | L6995 | Plant Op Auto Button Pushed |
| L6028 | ST Hot Standby Status Lamp | L6996 | Local Plant Coord. Button |
| L6033 | ST ACC Status Lamp | L6997 | Data Link Not Operating |
| L6034 | ACC Hold Status Lamp | L6998 | A/D Convertor Failure |
| L6039 | HRSG1 Dry Status Lamp CO | L6999 | NORMAL STOP BUTTON PUSHED |
| L6040 | Standby Status Lamp CO | | |
| L6041 | Hot Standby Status Lamp CO | | |

PROCESS REAL VARIABLES

| | | | |
|---|---|---|---|
| V1104 | GT1 MW | V6972 | AB MW Feedback Factor |
| V1961 | GT1 Exh T | V6973 | MW Controller Last Input |
| V1978 | GT1 Coord. Load Rate | V6974 | MW Controller Integral Output |
| V1979 | GT1 Coord. Demand | | |
| V1992 | GT1 Reference | V6975 | MW Controller Total Output |
| V2104 | GT2 MW | V6976 | ST Last MW |
| V2961 | GT2 Exh T | V6977 | GT2 Last MW |
| V2978 | GT2 Coord. Load Rate | V6978 | GT1 Last MW |
| V2979 | GT2 Coord. Demand | V6985 | GT2 Tracking Ramp Output |
| V2992 | GT2 Reference | V6986 | GT2 Tracking Bias |
| V3104 | ST MW | V6987 | GT1 Tracking Ramp Output |
| V3978 | ST Coord. Load Rate | V6988 | GT1 Tracking Bias |
| V3979 | ST Coord. Demand | V6989 | Normal Stop Ramp |
| V4081 | SH1 Outlet Pressure | V6990 | AB Characterized GT Exh T |
| V4995 | AB1 Tracking Ramp | | |
| V4996 | AB1 Tracking Bias | V6991 | AB Gas Temp Set Point |
| V4997 | AB1 Set Point | V6992 | Coord. Reference |
| V4998 | AB1 NHC Output (Set Point) | V6993 | Coord. Demand |
| | | V6994 | Coord. Load Rate |
| V5998 | AB2 NHC Output (Set Point) | V6998 | Total GT Load Demand |
| V6971 | GT MW Feedback Factor | V6999 | Plant MW |

CONSTANTS

| | | | |
|---|---|---|---|
| K3991 | ST Min Load | K6982 | MW/GT Controller Ranging Gain |
| K3992 | ST Max Demand | | |
| K4997 | Tracking Dead Bank | K6989 | GT2 Tracking Ramp Rate |
| K4998 | Tracking Ramp Rate | | |
| K4999 | Zero | K6990 | GT1 Tracking Ramp Rate |
| K5996 | Coord. Min Demand, No AB | | |
| | | K6991 | MW/AB Controller Ranging Gain |
| K6890 | GT Exh T/AB Array | | |
| K6950 | MW Controller Array | K6992 | Plant Max Demand |
| K6978 | Min Coord. Load Demand With No AB | K6993 | MW Controller Ramp Rate |
| K6980 | AB Max Set Point | K6996 | Plant Runback Rate |
| K6981 | AB Min Set Point | K6998 | Normal Stop AB Ramp Rate |

5. COORDINATED CONTROL FUNCTIONAL ARRANGEMENT

Referring now to FIG. 9D, there is shown a functional diagram of the coordinated control system of this invention. The eight sub-programs as shown in the coordinated control bidding sequence, FIG. 8F, are all shown in this diagram, with sub-program 9007 in particular being shown in expanded functional form. The plant trouble monitor portion, 900B, receives logic state inputs from the plant and produces annunciator and typewriter message outputs when predetermined troublesome conditions are found. Likewise, turbine startup monitor 9009 receives logic state inputs, and produces annunciator and typewriter messages during the automatic turbine startup portion of plant control. Boiler startup monitor portion 900A receives logic state inputs concerning the condition of the boiler, and produces start and stop outputs which are connected to plant contacts for direct control of the boiler. These three programs perform a variety of bookkeeping programs essentially outside of the main control loops.

The select operating mode function 9800, which is performed within program 9008, is seen to interface with the steam load distribution and the gas temperature setpoint supervision program 9007. At block 9800, the control system checks inputs from logic states to determine exactly what operating mode is called for, and establishes corresponding logical conditions for carrying out control in the selected operating mode. Demand signal V6993 is connected through to the REFDMED block 9802, for calculating the reference signal V6992. Demand signal V6993 is also stored for use in the steam load distribution program 9007, which is bid next in the bidding sequence. The functions performed in this supervision program include generation of total GT load demand signal V6998, which is stored for use in the gas turbine load distribution program 9006, and the afterburner setpoint signal V6991, which is utilized in HRSG/AB control programs 9003 and 9002. Thus, program 9007 is seen to generate process real variables which are employed in the same 9 level digital computer cycle of calculations for gas turbine load distribution and HRSG/AB control respectively.

The steam load distribution program 9007 checks to see whether the steam turbine is in coordinated control, and whether other conditions are present allowing it to proceed in coordinated control. This program checks the demanded plant load and determines the steam turbine load to be carried. This program operates in conjunction with the 7 level ST/BPV control program, which latter control program receives the steam load demand signal from program 9007, when the steam turbine is in coordinated control. When the steam turbine is not in coordinated control, program ST/BPV Control receives its input demand signal from the automatic control software.

Program 9006, GT Load Distribution, performs additional logic evaluation functions concerning the gas turbines, and generates demand and rate signals for use in the GT1 and GT2 control programs at the 8 level. When both gas turbines are in coordinated control they receive identical signals from program 9006. If only one gas turbine is in coordinated control, it continues to receive its setpoint signals from 9006. Either gas turbine which is operating not in the coordinated control mode, but rather in the operator automatic mode, is controlled from the blocks designated GT1 and/or GT2 control, operating at the 8 level, with the input demand/rate signals for these programs being derived through operator input and associated digital and analog control circuitry.

Control programs 9003 and 9002 operate to provide AB setpoint signals only when the corresponding afterburners are in coordinated control. Under these circumstances, these program receive a setpoint signal, V6991 from program 9007, which is of course identical for the two programs when both afterburners are in coordinated control. There is no lower level digital computer control for the afterburners, which are either in coordinated control or operator analog control.

Referring further to the 9007 portion of the functional diagram, the megawatt signals for the three turbines are summed at 6999, generating a plant megawatt signal V6999 which is subtracted from the reference signal V6992 to provide an input error signal to controller 9520. Controller 9520 provides proportional plus integral control, in addition to high and low limiting, producing an output signal V6991. The output error signal is utilized in the control path which produces the input to the afterburner programs 9002 and 9003.

The reference signal V6992 from block 9802 is operated upon by subtracting therefrom V3104, reflecting the steam turbine megawatts, which difference then is stored for use opon execution of GT load distribution program 9006 as V6998.

An overview of the coordinated control functional diagram, as seen in FIG. 9D provides insight into the operation of the control system at different control levels when in the coordinated mode, as well as when in the operator automatic mode of operation. As seen in the functional diagram, the 9 level functions are fully carried out whenever the plant is in coordinated control. However, when not in coordinated control, the designated inputs to the 8 level programs are provided to the digital computer through operator automatic control loops. Further, during such operator automatic mode of operation, the digital computer is continuously operating, checking logic conditions, and tracking the backup control system, as in fact it does in either the analog operator or manual modes of control. The reference block 9802 tracks plant megawatts through track auto block 9801, and as discussed in detail hereinbelow control programs 9002 and 9003 track the afterburner analog signals when they are not in the coordinated mode of operation. The control functions carried out at the 8 and 7 levels can be carried out independently when the plant is in operator automatic control, or can be carried out in conjunction with the 9 level control functions when the plant is in the coordinated mode of control.

6. COORDINATED BOILER STARTUP MONITOR FLOW DIAGRAM, 900A

Figure 10D:
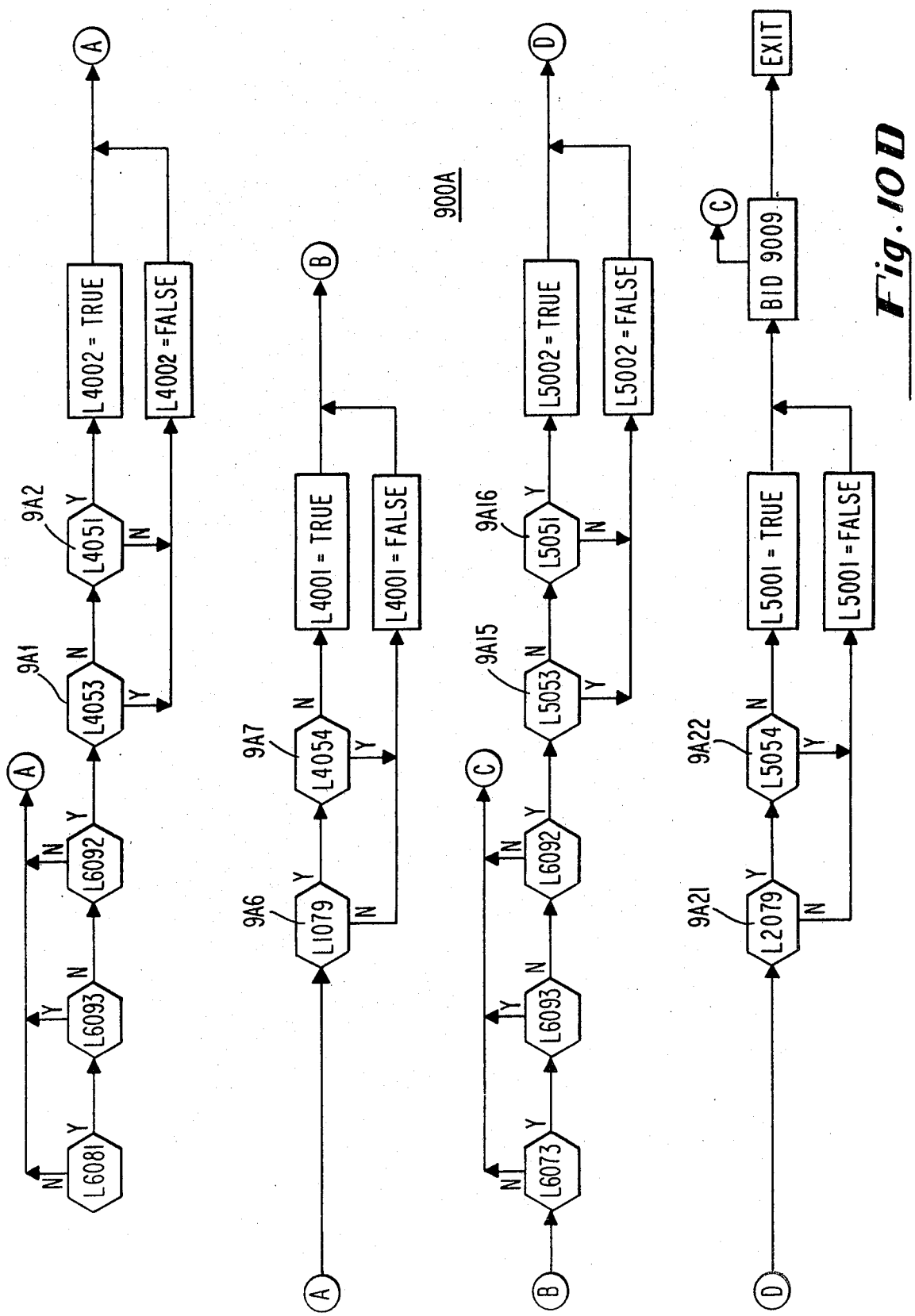
FIG. 10D is a flow chart of the boiler start-up monitor portion of the control system.

Referring to FIG. 10D, there is seen a flow diagram of program 900A, which provides bookkeeping for the coordinated boiler startup. At the start of the program, process logical states for the HRSG1 COORD, normal stop, and COORD go are monitored. If HRSG1 is not in COORD, the normal stop button has been pushed, or coordinated go has not been pushed, the program jumps to point A. If none of thes conditions are met, the status of the HRSG run contact input is determined at 9A1. Effectively, the run contact output has done its job of starting the boiler and is thus set to false. If it is not found to be in the run state, and HRSG1 standby is found to be negative at 9A2, HRSG1 run contact output is also set false. However, if the HRSG1 run contact input is found to be negative at 9A1, but the HRSG1 standby is found to be positive at 9A2, then the HRSG1 run contact output is set true, indicating that the boiler is to be placed in the run mode by the boiler startup monitor program. Proceeding to point A, it is determined at block 9A6 whether GT1 flame is on. If it is not, L4001 is set false. If GT1 flame is found to be on, it is determined at block 9A7 whether AB1 flame is on. If it is, L4001 is set false, but if it is not, it is set true. Thus, coordinated boiler startup places the boiler into service. Proceeding to point B in the 900A program, the same steps are taken for HRSG2, determining whether the HRSG2 run CO logic variable is set true or false. Following that, in a like manner as for afterburner 1, the HRSG2 start AB CO logic variable is set true or false. Programs 900B and 9009, which are not included in this specification in detailed form, provide similar bookkeeping functions.

7. COORDINATED SELECT OPERATING MODE PROGRAM, 9008

Figure 11E:
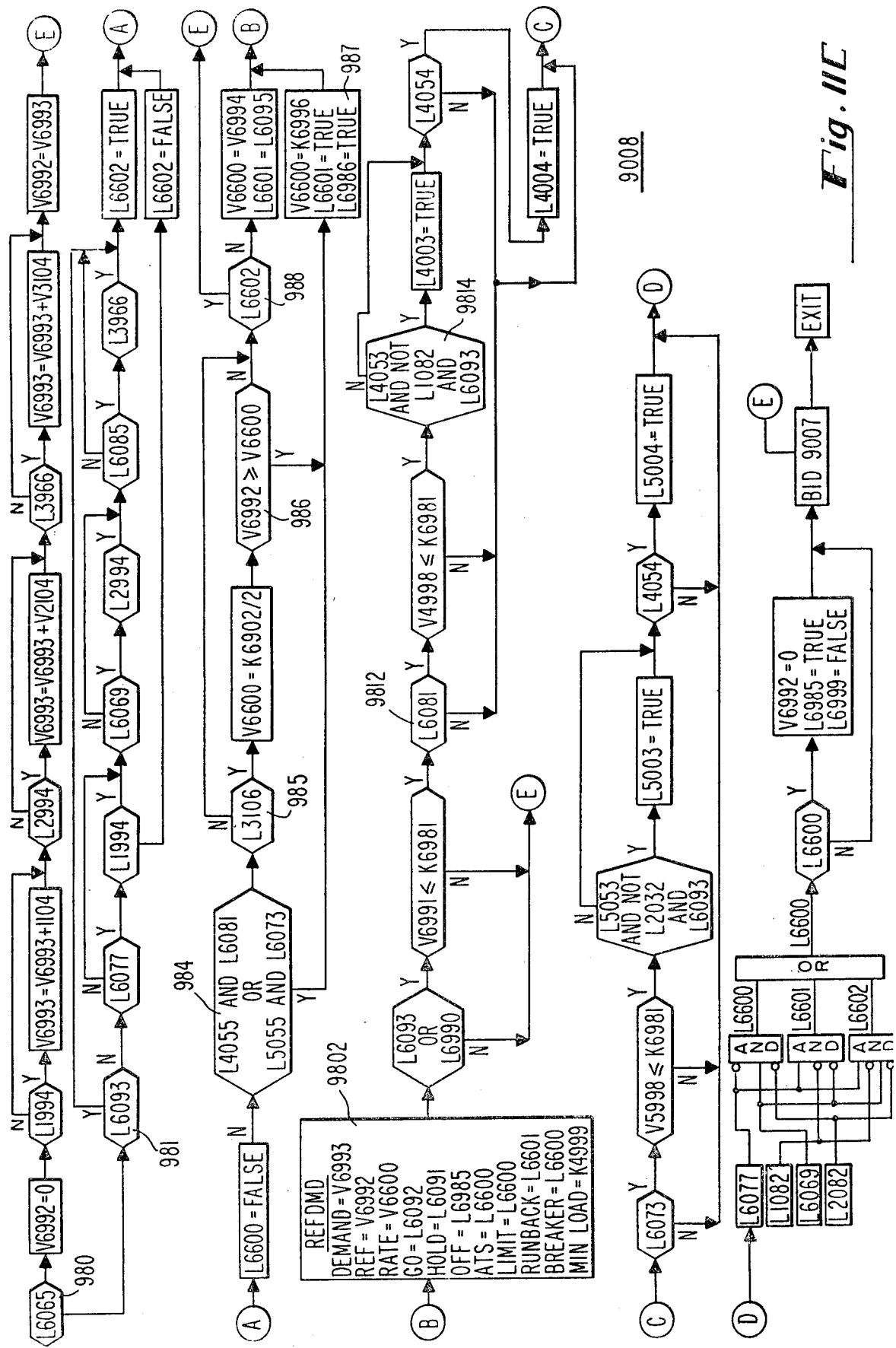
FIG. 11C is a flow chart of the select operating mode portion of the coordinated control sequence.

Referring now to FIG. 11C, there is seen a flow diagram of the coordinated select operating mode package 9008. At block 980, it is determined whether the plant is in coordinated control. If no, between block 980 and exit, the megawatts being delivered are added, and the reference variable V6992 is set equal to the calculated total MW for the up to three turbines. This represents a portion of the track auto block 9081 in FIG. 9D. If the answer at block 980 is yes, the plant is in coordinated control and the program proceeds to block 981 to determine if the plant is normal stop. If yes, logic variables L6600 and L6601 are made false. If the plant is not found to be in normal stop, each turbine is checked to see if it is in coordinated control. If any one of the three turbines is in coordinated control, but its breaker is not closed then the program goes to exit. Otherwise, the variables L6600 and L6601 are made false since all three turbines are in coordinated control with their respective breakers closed.

At block 9802, the REFDMD function is performed, this being the determination of the reference signal V6992 as a function of demand signal V6993 (see also FIG. 9D, coordinated control functional diagram). The generation of the reference signal provides a control signal for moving the plant, or any part thereof, toward the demand. This is the same function as is carried out in block 72 of FIG. 7C, and is basically a ramp signal, ramping reference to demand. The rate of the ramp is entered by the operator, or by determined dynamic conditions as in block 987. It is to be noted that the reference signal is used for both loading and unloading, and is subject to the special conditions inputted to the program, as shown in block 9802.

Following this, it is determined whether the system is in normal stop. If no, the program exits to the next program. If yes, at point D, the system examines GT1 COORD, GT2 COORD, GT1 4x (an intermediate contact that determines whether GT1 is running), and GT2 4x. If one of the shown logic conditions exist, reference variable V6992 is set equal to zero, as the last step in a normal plant shutdown.

8. COORDINATED STEAM LOAD DISTRIBUTION PROGRAM, 9007

Figure 12D:
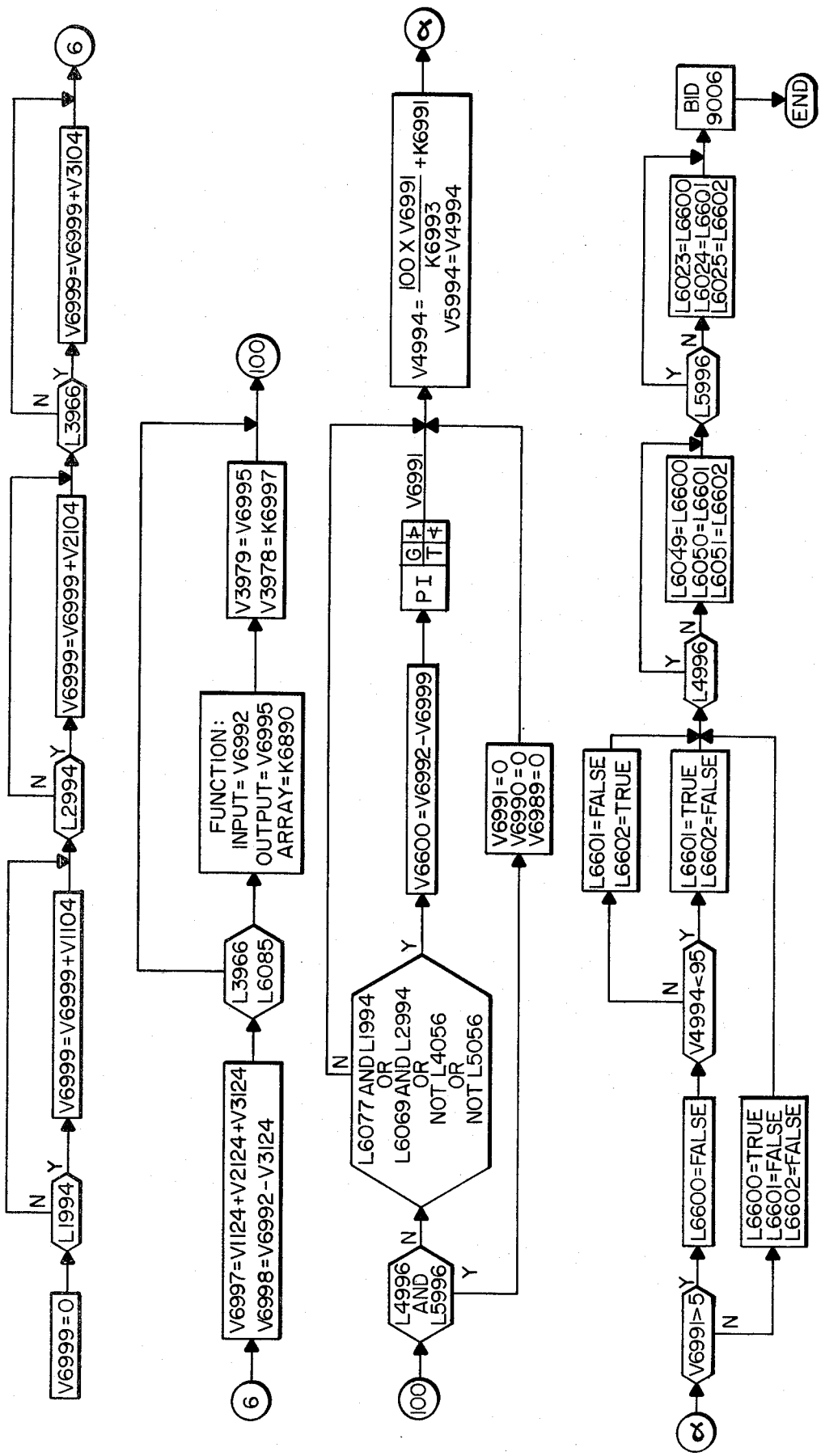
FIG. 12D is a flow chart of the steam turbine/HRSG load distribution.

Referring now to FIG. 12D showing Program 9007, the total plant MW variable V6993 is initialized to zero. Then V6993 is incremented, for each turbine having its breaker closed, i.e., supplying load, by the megawatts being delivered by the turbine generator. Thus V6993 represents total plant generation. Next the required gas turbine generation V6998 is computed as the difference between total plant reference V6992 and steam turbine generation V3104. This gas turbine demand V6998 is thus a feed forward signal to the gas turbine control systems.

The control system then determines whether the steam turbine is in coordinated control and the breaker is closed, which conditions must be met in order to proceed in coordinated control. If the answer is no, the program jumps to block 100. However, if the steam turbine breaker is closed and the turbine is in coordinated control, the program calculates through a function characterization the load to be carried by the steam turbine. This calculation is then sent to the steam turbine control system.

At block 110 the HRSG1 and HRSG2 afterburners are tested to determine if they are in coordinated control. If not the plant MW controller output V6991 is set to zero. But if the afterburners are in coordination, and if the corresponding gas turbines are coordinated and generating load, then the plant MW error V660 is calculated by the difference between the plant reference V6992 and the plant total MW V6999 calculated earlier in the program. This plant error V6600 drives a proportional plus reset controller whose output V6991 represents plant load mismatch. V6991 is suitably ranged with K6993 and provided with a bias adjustment K6991 to become the HRSG1 afterburner setpoint V4994 and the HRSG2 afterburner setpoint V5994.

The last portion of the 9007 program is concerned with the bookkeeping needs and it illuminates lamps on the BTG Board Plant System Display. These lamps indicate whether each afterburner is at minimum or maximum firing, or at some intermediate regulating position.

9. COORDINATED GT LOAD DISTRIBUTION, 9006

Figure 14D:
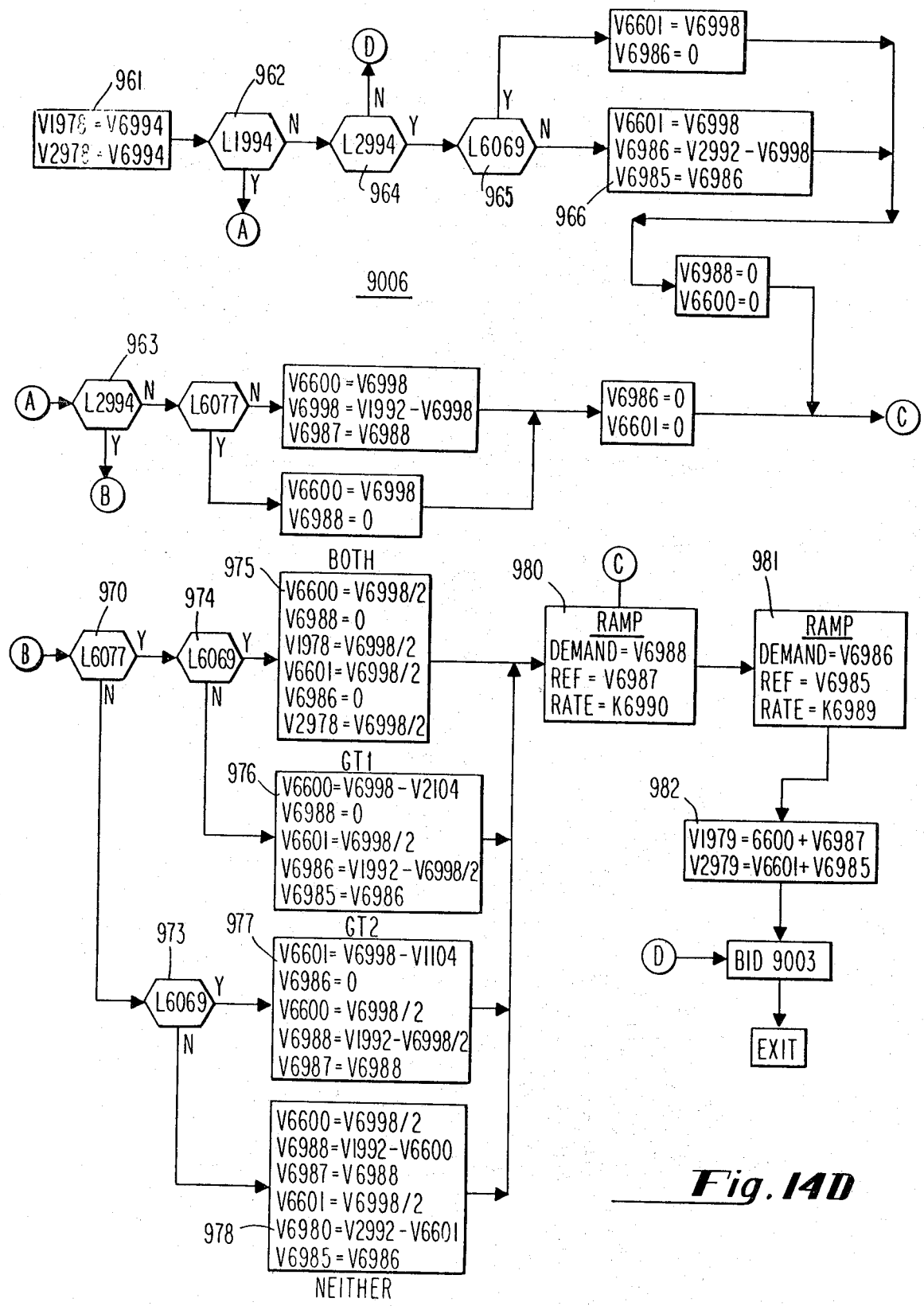
FIG. 14D is a flow chart of the gas turbine load distribution portion of the coordinated control sequence.

Referring now to FIG. 14D, there is shown the flow diagram for program 9006, the coordinated GT Load Distribution program. In this program, it is determined which, if either, of the gas turbines is in coordinated control, corresponding demand and rate signals are determined for each gas turbine which is in coordinated control, and the tracking function between the automatic and coordinated control is performed. Starting at block 961, the two GT load rate signals are book kept by being set to the coordinated load rate. In block 962, it is determined whether the GT1 breaker is closed. If yes, the program goes directly to block 963 to determine if the GT2 breaker is closed, and if not, the program proceeds to block 964, where also it is determined if the GT2 breaker is closed. At block 964, if GT2 breaker is not closed, such that neither breaker is determined to be closed, the program bids program 9003 and exits. If the GT2 breaker is found closed, it is determined at block 965 whether GT2 is in coordinated control. If yes, variable 6001 is set equal to the GT load demand, which is obtained from program 9005, and the tracking bias is set equal to zero. If no, the tracking bias is computed at block 966, and ramping is provided for bumpless transfer between coordinated and automatic control. The tracking bias is established as a function of the difference between the digitally computed automatic and coordinated references.

Proceeding to point A in the flow diagram, there are performed between points A and C the same functions as described hereinabove, for the second gas turbine. At point B, to which the program proceeds if both GT1 and GT2 are in the load mode, i.e., both breakers are closed, it is determined at 970 whether GT1 is in coordinated control. If yes, it is determined at block 971 whether GT2 is in coordinated control. At block 973, when GT1 is found not to be in coordinated control, it is determined whether GT2 is in coordinated control, and at block 974, when GT1 is coordinated it is determined if GT2 is coordinated. The determination of what combination of gas turbines is in coordinated control leads to four function blocks 975-978, in which process variables are determined as a function of the combination of gas turbines in coordinated control. Block 975 is the function block where both turbines are in coordinated control; block 976 where only GT1 is in coordinated control; block 977 where GT2 alone is in coordinated control; and block 978 where neither gas turbine is in coordinated control.

Referring to block 975, where both GTs are in coordinated control, the tracking biases for each are set equal to zero, the load rates are set equal to ½ total GT coordinated load rate, and the variables V6600 and V6601 are set equal to ½ total GT coordinated load reference. In block 976, variable V6600, the GT1 demand variable, is set equal to GT demand minus GT2 MW, and the GT1 tracking bias is set equal to zero. The GT2 demand variable is set equal to ½ the GT demand, and the GT2 tracking bias is determined. Likewise, in block 977, the GT2 demand variable is set equal to GT demand minus GT1 MW, and GT2 tracking bias is set equal to zero. The GT1 demand variable is set equal to GT demand divided by 2, and the GT1 tracking bias is determined. In block 978, the tracking bias is determined for each GT, and each GT demand variable is set equal to GT demand divided by 2.

Following the functions performed in the selected one of blocks 975-978, the GT1 tracking function is carried out in ramp block 980, and the GT2 tracking function is carried out in ramp block 981. In block 982, GT1 demand is determined as the GT1 demand variable plus GT1 tracking ramp output, and GT2 demand is determined as the GT2 demand variable plus GT2 tracking ramp output. The program then bids program 9003 and exits.

Figure 15D:
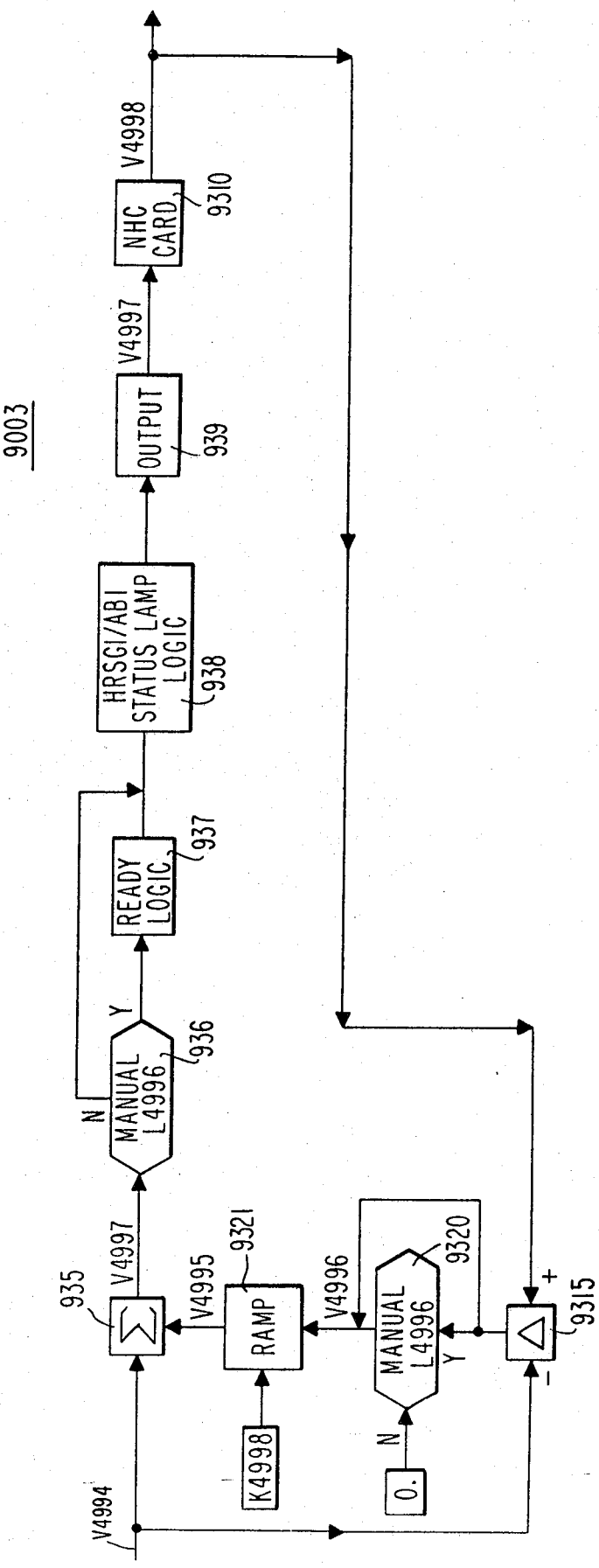
FIG. 15D is a functional diagram of the HRSG1/AB1 control portion of the coordinated control sequence.
Figure 16D:
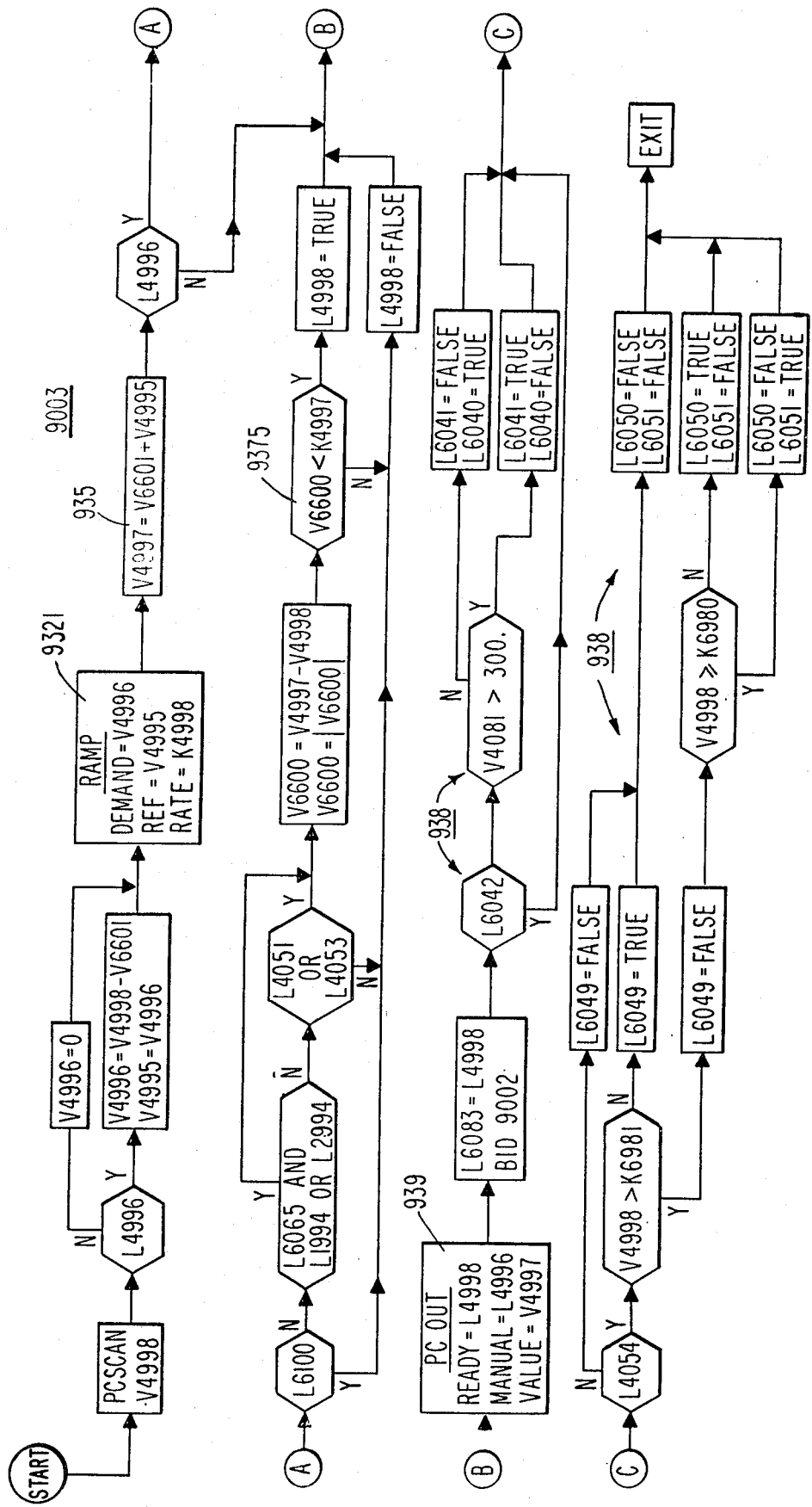
FIG. 16D is a flow chart of the HRSG1/AS1 control portion of the coordinated control sequence.

Referring now to FIGS. 15D and 16D, there are shown the functional diagram and flow chart respectively of the HRSG/AB control system. As noted previously, there are respective packages 9003 and 9002 for HRSG1/AB1 and HRSG2/AB2 respectively. FIGS. 15D and 16D are presented corresponding to HRSG1/AB1, it being understood that the same diagrams exist for HRSG2/AB2 with corresponding different process real and process logical variables.

The afterburner setpoint V4994 is inputted to sumation block 935, to which is inputted a tracking signal V4995, the derivation of which is discussed hereinbelow. Next, it is determined, at block 936, whether the afterburner is in the coordinated or analog mode. If in analog, certain logic functions designated "ready logic" are performed in block 937. These functions are by-passed if the afterburner is in coordinated mode. Next, at block 938, certain status lamp logic functions, specified in the flow chart of FIG. 16D, are performed, following which the V4997 signal is processed into the necessary bit pattern in output function block 939. This is a step in preparation for the operation at block 9310, where the digital output signal is processed in a printed circuit card which couples the digital circuitry to the analog circuitry. The D/A is disclosed and described in the referenced applications. The output from block 9310 is V4998, which is the resultant gas temperature setpoint signal which is fed to the afterburner 1, as well as to the following analog circuitry of the HRSG1. This signal is fed back to difference block 9315, to determine a difference signal for tracking between coordinated control and manual control. At block 9320 it is determined whether the afterburner is in coordinated or manual control, and if in coordinated control the return signal is set to zero. If in manual control, the difference signal is fed through ramp function 9321 to block 935. In this fashion, when the afterburner control is returned to the coordinated mode, the difference signal is maintained at the moment of transfer, providing bumpless transfer, and then is ramped down to zero. As seen in the flow chart of FIG. 16D, as part of the ready logic block 937 it is determined at block 9375 whether V6600 is less than K4997, i.e., less than the tracking dead band. If the answer is yes, the AB1 ready for coordinated control process logic variable is set true, but if no, this logic variable is set false. Since V6600 at this point has been made equal to the absolute value of the difference between V4997 and the fed back output signal V4998, it represents an absolute value of the tracking error signal. Thus, as long as this tracking error signal is smaller than the predetermined constant, the system allows coordinated control, thus avoiding the tracking dead band range.

10. COORDINATED CONTROL PANEL SELECTION

Figure 17D:
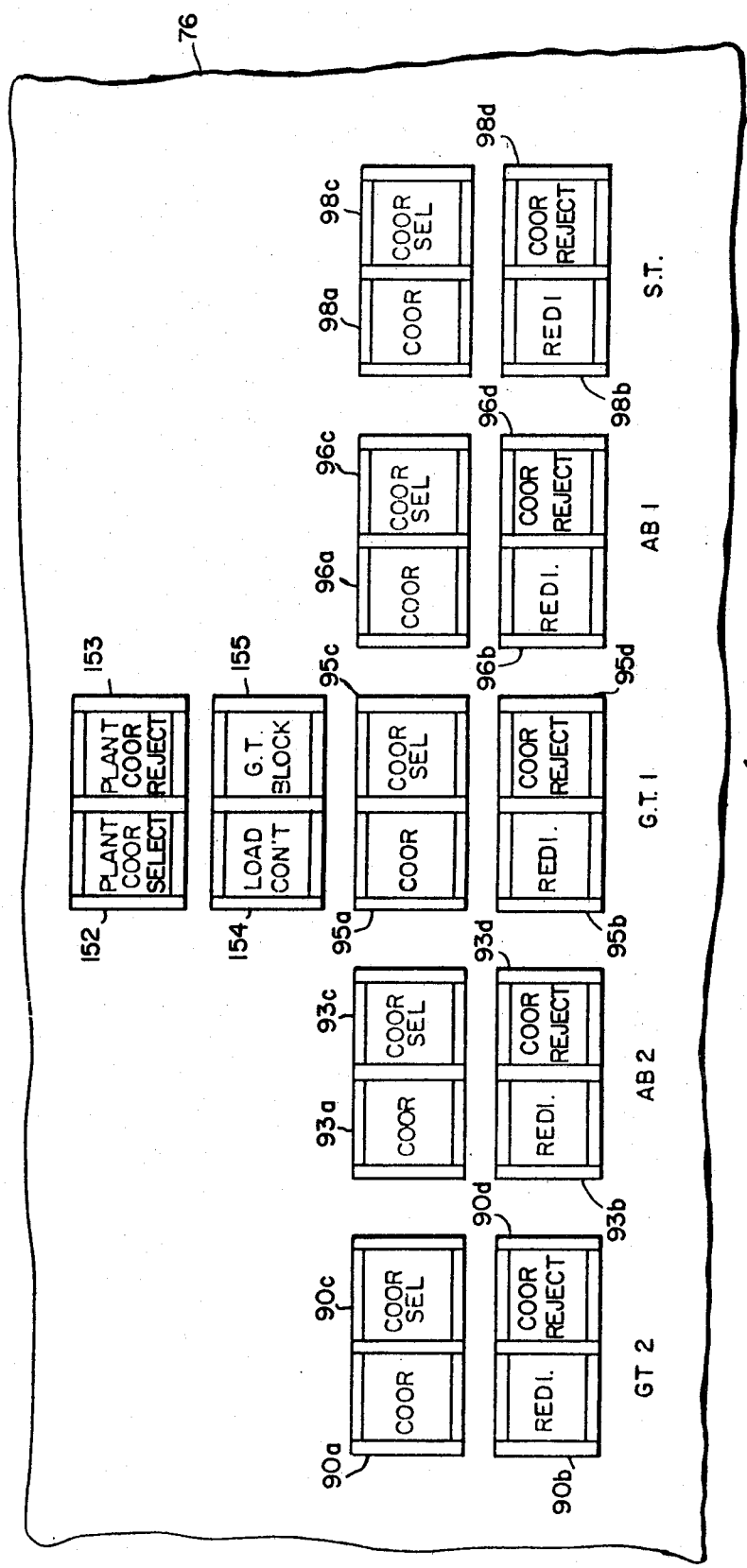
FIG. 17D is a representation of a portion of the operator panel dealing with coordinated control.

FIG. 17D shows in a portion of the operator panel which provides for selecting or rejecting coordinated control for the plant or any combination. As indicated in FIG. 17D, there is included an array of backlighted pushbutton switches and status lights which are mounted on a portion 76 of the operator control panel.

Items in the 90, 93, 95, 96 and 98 series which have suffix letters "a" and "b" are status lights. Items in these series which have suffix letters "c" and "d" are spring-loaded backlighted pushbuttons which are lit when the switch contacts associated with the buttons are closed. A first momentary depression of one of these pushbuttons will close its switch contacts. Items 152-155 are spring-loaded backlighted pushbuttons which are used in establishing the different operating modes for the control system 50.

Considering the pushbuttons 95c and 95d for GT1, for example, the "coordinated select" button 95c is depressed if it is desired to have GT1 operate in the plant coordinated mode. If, on the other hand, it is desired to have GT1 operate in the operator automatic mode, then the "coord reject" pushbutton 95d is depressed. The depressing of either button 95c or 95d does not cause the actual change in mode. The actual transfer from one mode to the other occurs when one or the other of mode transfer buttons 152 and 153 is depressed. In other words, when the plant coordinated button 152 is depressed, then all of the individual units which have their coordinated select buttons switch contacts closed are at that moment transferred to the plant coordinated mode. In a similar fashion, the depressing of the plant operator pushbutton 153 causes a transfer to the operator automatic mode of those units for which the switch contacts have been closed by a depressing of their operator select pushbuttons. Transfer pushbuttons 152 and 153 are effective to provoke mode changes in the load distribution control unit 73, while mode transfer buttons 154 and 155 are effective to initiate mode changes in the load reference logic 72.

Considering now the status lights having the suffix a and b designations, the "redi" light having the "b" designation is lit if the particular unit in question is in the operator automatic mode and is in a ready condition or proper condition to be transferred to the plant coordinated mode. If then the coordinated select button "c" for that unit is depressed to light same and if the plant coordinated transfer button 152 is thereafter depressed, the "redi" light "b" goes out and the coordinated light "a" comes on. The lighting of the coordinated light "a" indicates that the transfer to the plant coordinated mode has been accomplished and that such unit is now operating in such mode. Conversely, if the "redi" light "b" is lit, then the unit in question is operating in the operator automatic mode. Remaining portions of the control panel, not shown, provide similar switching into and out of the operator analog and manual modes of operation.

Figure 18C:
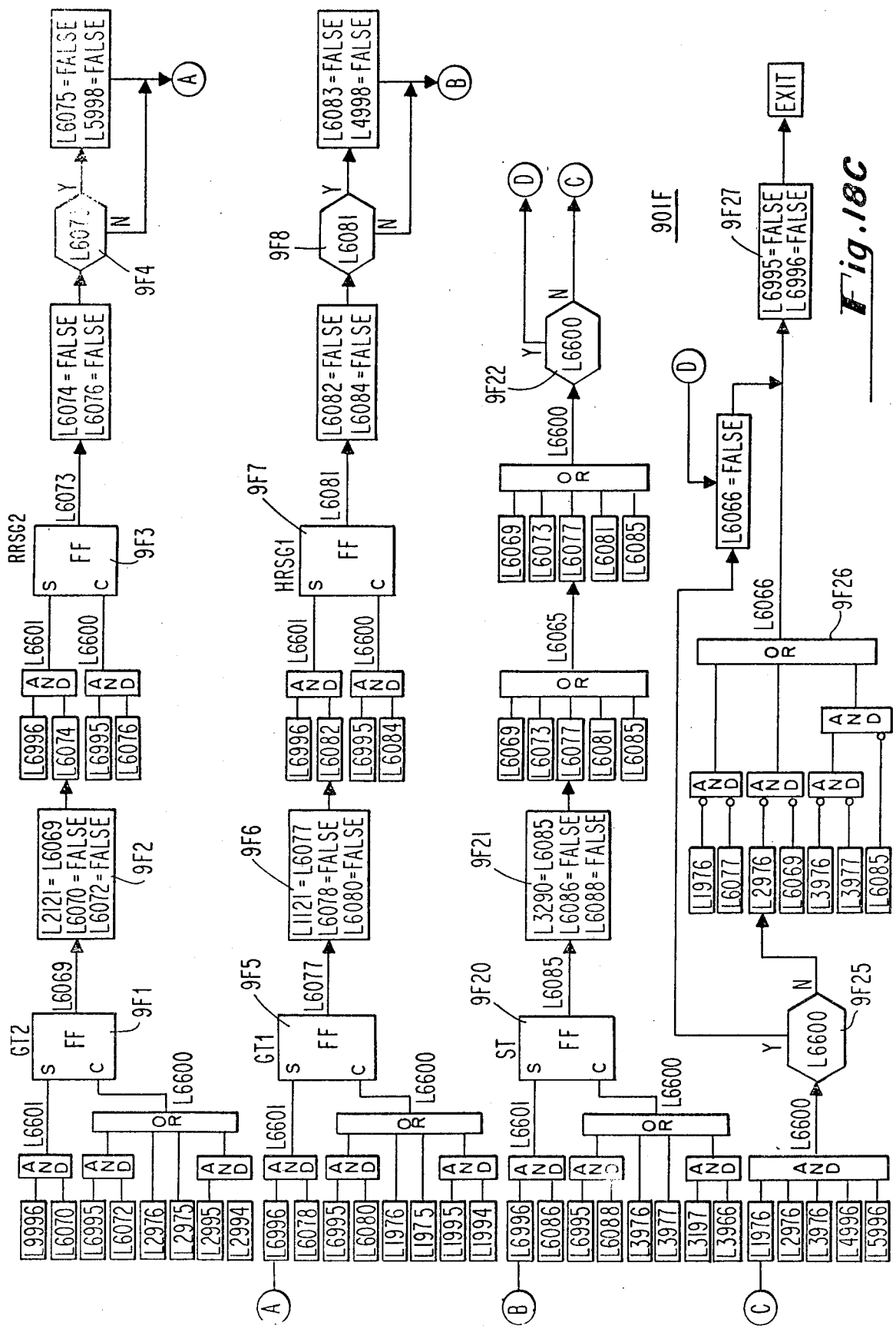
FIG. 18C is a flow chart of the select/reject logic program for going into or out of coordinated control.

Reference is made to FIG. 18C, which is a diagram of a 9-level program for going into or out of coordinated control. This program is usually initiated at operator request, as by pushing the buttons of FIG. 17D. In certain cases, it may be bid from other prior-bid programs. The diagram illustrates the logic followed for setting a large number of the logic variables which are utilized in coordinated control programs. At blocks 9F1-9F8, 9F20-9F22 and 9F25-9F27, logic states are established and decisions made concerning establishment of logic states. Also, not shown, the digital control computer contains a large number of other subroutines for interfacing between the coordinated control software and the BTG Board, and for monitoring plant contact inputs, which subroutines are operated by demand, upon interruption, or when one of the coordinated control select or reject buttons is pushed.

11. SUMMARY

In review, there is disclosed a digital computer control system, adapted to operate cooperatively with a back-up analog control system, the digital control system having a plurality of control levels, and further having the flexibility of controlling different configurations of turbines and afterburner elements at given ones of the different control levels. The highest level of control is coordinated control, in which mode the plant can be loaded when the appropriate turbine breakers are closed. The digital computer provides for operation in the coordinated control mode, whereby any combination of the three turbines and two afterburners can be put in coordinated control, subject to the prior condition that the respective turbines have been synchronized and their breakers are closed, i.e., they are carrying load. Each of the digital levels, 9, 8 and 7, have a select operating mode package for carrying out the selection process. At the 9-level of operation, program 9008 is the select operating mode package which checks logic conditions and sets logic variables for use in the remaining 9-level packages. Likewise, the ST/BPV control package has a plurality of programs, one of which is the select operating mode, and each of the two GT control packages likewise has a plurality of programs, one of which is the select operation mode program. Thus, every time that the digital computer sequences through the various priority levels, at each level the logic conditions are checked to determine which elements are in what mode of control. Reference is made to the aforementioned prior applications which are incorporated by reference, wherein there is a further discussion of the elements of the ST/BPV control block package, the GT1 and the GT2 control packages.

It is to be noted that whenever the digital control computer 58G is operating, all of the various periodically bid levels are sequenced, i.e., first the 9 level is sequenced, then the 8 level is sequenced, and then the 7 level is sequenced. This statement is true, no matter what mode of plant control has been selected. If the plant is in coordinated control, the 9 level programs are carried out, with the control functions being fully determined for each turbine which is in coordinated control. If the plant is in operator automatic control, or any given turbine is in operator automatic control, the 9 level programs are still carried out, but the corresponding sequential steps are modified subject to the logic conditions, such that the 9 level programs effectively skip many of the control functions and bid to the next level. The 8 and 7 level programs are sequenced in a similar fashion, in both of the digital computer modes.

It is to be noted that the boiler control functions are analog controlled by the analog control center, from standby to full load. However, the gas temperature setpoint (afterburner) control signals generated in programs 9002/9003 are also connected to the boiler control circuitry, for supervision of the boiler control operation.

When in plant coordinated control, both gas turbines are operated together. Start-up sequencing of the gas turbines is done in the GT1 and GT2 control packages, respectively. These packages generate control signals, as shown in FIG. 9D, which operate the gas turbine valves 14 and 24 and the inlet guide vanes 15 and 25. However, both gas turbines need not be in coordinated control since separate control packages are provided for them, such that either GT control package can accept signals generated in program 9006, as in coordinated control, or from operator inputs, as in the other modes of control. Likewise, when in plant coordinated control both afterburners are operated together, but each is provided with a separate control package. The ST/BPV control package contains a program for monitoring the steam throttle pressure state, which is sensed by one of the sensors 101C and communicated to the control computer. Afterburner control may be either coordinated or operator analog. In both cases, both the ACC and DCC generate control signals, but when in the coordinated mode the digital signals supplant the analog signals.

In the coordinated control mode, the two primary control paths are (1) that which generates the gas turbine fuel valve and IGV controls, and (2) the one which generates the gas temperature setpoint controls, or afterburner controls. Each of these is adjusted by a plant load error signal representative of overall plant loading.

There is attached hereto a digital computer program listing describing an appropriate computer program for operating a Westinghouse Prodac P-2000 process control type digital computer for purposes of controlling the combined cycle electric power generating plant described hereinabove.

This program listing documents an early form of a detailed embodiment of the invention. The programs and flow charts described in connection with FIGS. 4A, 5A, 7A and 8-20 represent an updated form of the detailed embodiment which is more efficient from a bookkeeping standpoint but which is essentially the same as the early form listed herein. The updated form of the invention is also disclosed in coassigned U.S. patent applications Ser. Nos. 564,561; 564,562; 564,563; 564,571; and 564,572 where various other features related to combined cycle coordinated controlled plants are claimed.

Attached hereto and forming a portion of this application is an Appendix. While the above description of the invention is believed sufficient to enable one skilled in the art to practice the same, the appended material will make further details of the preferred embodiment clear.

While there have been described what are at present particular embodiments of this invention, it will be obvious to those skilled in the art that various changes and modifications may be made therein without departing from the invention, and it is, therefore, intended to cover all such changes and modifications as fall within the true spirit and scope of the invention.

TEMPERATURE DISTRIBUTION

The following information relates to temperature distribution within the steam generator at the actual design point condition.

| Gas | Water |
|---|---|
| 1137° F. | 950° F. |
| Superheater | |
| 972° F. | 577° F. |
| H.P. Evaporator | |
| 616° F. | 573° F. |
| Economizer | |
| 371° F. | 251° F. |
| L.P. Evaporator | |
| 359° F. | 109° F. |

It should be noted in the above tabulation that the temperatures as indicated are in and out of the system. The actual heat transfer temperature on the water side within each one of the evaporator sections will of course be the appropriate saturation temperature.

The flow distribution within the low pressure evaporator-deaerator system is as follows: The flow entering the system from the condensate pump is 808,696 lbs/hr. Extraction steam from the turbine enters the system in the amount of 75,589 lbs/hr. The boiler feed pump operates at constant flow over the load range in order to keep the economizer section from steaming at part loads. Therefore, a portion of the boiler feed pump flow, after passing through the economizer, is recycled through appropriate valving back to the low pressure evaporator drum. 979,500 lbs/hr. leaves the low pressure drum to the boiler feed pump. Of this, 95,215 lbs/hr. is recycled after passing through the economizer.

Of the total steam generated in the low pressure evaporator (18,115 lbs/hr.), 4,000 lbs/hr. is assumed to be lost in the low pressure steam system. The resulting flow balance is as follows:

| | |
|---|---|
| Extraction Steam | 75,589 |
| Economizer Recirculation | 95,215 |
| Condensate Feed | 808,696 |
| Total Entering System | 979,500 |
| L.P. Steam Loss | 4,000 |
| Boiler Feed Pump Flow | 975,500 |

Heat Balance

The heat balance for the steam turbine at its maximum guaranteed load condition is shown in FIG. A1. The KW generated at this point is 107,394. Note that a significant amount of steam is bled from the turbine and bypassed around the last blade rows to the condenser. This is part of the turbine's internal water removal system.

Emissions

The atmospheric emissions from a typical combined cycle may be divided into 3 major groups. They are:
1. $NO_x$
2. $SO_2$
3. Combustion Contaminants The first two do not present a major problem in that $NO_x$ levels can be controlled through design of the combustion system and water or steam injection into the gas turbine combustor baskets.

The $SO_2$ levels are directly related to the sulfur content of the fuel and at the present time are controlled primarily through the fuel specification.

The combustion contaminants consist of the following:
a. Smoke or unburned carbon
b. Ash
c. Unburned hydro-carbons
d. Sulfuric acid The major problem in meeting environmental requirements is associated with the limits established for combustion contaminants. The smoke component is generally minimized through proper design of the combustion system. For a typical gas turbine of the size discussed in this paper, the smoke component would be in the area of 2 to 3 lbs/hr per gas turbine-duct burner system.

Ash generally is controlled through the fuel specification but allowable levels of 25 to 30 ppm can be accepted by gas turbines of the size being discussed and still meet all of the current emission laws.

The unburned hydro-carbon consists of fuel that has passed through the burner system without entering into the combustion process. Most of this results from the fuel spray angle being such that a small protion of the fuel impinges on the burner walls and never reaches combustion temperatures. One of the major advantages of having a duct burner following the gas turbine is that a significant portion (approximately half) of this unburned fuel is consumed in passing through the duct burner system. For the size of unit discussed herein, the unburned hydro-carbon coming from the stack would be approximately one pound per hour per gas turbine set.

The most significant portion of the emissions is sulfuric acid which is formed from the sulfur in the fuel. The actual formation rate is considered to be between 2% and 4% of the sulfur in the fuel. This results in about 6 lbs/hr of sulfuric acid based on a fuel content of 0.08% sulfur by weight.

One of the major problems in testing for combustion contaminants is related to the method of measuring without inducing sulfuric acid formation within the test equipment. The methods currently approved by most of the air pollustion control boards indicate formation rates of 6% to 8% or higher due to acid formation within the test equipment itself. A completely satisfactory method of testing has not yet been developed.

2.1.2 Manual Controls

Manual control stations will be provided for all motor starters, circuit breakers and valve actuators except fuel valves for the following purposes:
Initial checkout
Maintenance
Direct control by operating personnel during cold start transients.

The manual control stations will be located on the BTG Board if they serve any of the following additional purposes:
Starting gas turbine, HRSG, steam turbine or condenser auxiliaries in service at hot standby.
Providing manual backup for control loops normally automatic, in case of individual control loop component failure (GT fuel valves excluded).

Manual control of loops normally automated through the computer can be selected by the operator or initiated by the control computer in the event of a detectable control component failure which affects only specific loops with manual stations to the extent that it is practical to maintain the plant on line with the available manpower.

Manual stations not located on the BTG Board will be included in the control devices affected (motor starters, pressure regulators, etc.).

2.1.4 Operator Interface

All interactions between the operator and the control systems during the hot standby and power generation modes are provided by the control consoles and ASR's located in the central control room. The control consoles provide the following functions:
Hardwired alarm annunciators
Indicators
Recorders and counters
A/M stations
Operator auto pushbutton control centers for gas turbines, afterburners and steam turbine.
Co-ordinated control pushbutton control center.
Pushbutton for computer interface
CRT display of computer information The ASR provides the following functions:
Alarm messages not provided by control console hardwired alarm annunciators.
Data logging
Computer communication Separate control consoles will be provided for each of the major sub-systems on a stand alone basis except that each GT/HRSG combination will have its own panel. These control consoles may be used for initial start-up, check-out, special contingency situations and diagnostics with more than one operator if needed. These consoles will be tied to the back-up and safety systems and will contain the required alarms and detailed status indicators for these systems.

The central coordinated control console will provide an indication if an alarm exists on any of the separate consoles and on which console. It will also indicate and identify alarms on remotely located supervisory equipment.

The back-up system is not required to perform any of the routine service functions of the primary system such as data logging, CRT operation, etc.

All consoles including central coordinate control will be designed for the operator to be standing.

System electrics will be configured to the requirements of a particular customer (PSO for the first installation). Panel and cabinet configuration must be designed as a module which can be reconfigured for different installations with minimum effect on the rest of the Controller.

2.1.5 Protection Systems

Major safety protection systems will be provided independently from the basic control system, examples being HRSG flame safety, overspeed trips, reverse current trip of the generator, etc. The use of such protective systems will be in accord with standard power plant practices and codes and does not preclude software safety systems as back-ups such as the max. speed trip in software. There must be a manual trip for all energy input components, e.g. fuel and steam valves.

2.1.6 Maintenance Capability

1. Computer on line maintenance checking procedure shall be provided.
2. A digital voltmeter and selector switch shall be provided to test various analog signals at the digital and analog centers.

2.5 Redundancy

No single machinery component failure shall reduce the generating capacity of the plant by more than 50%. Furthermore, backup controls will be provided such that failure of the primary computer system will not prevent the safe operation of all or part of the plant.

The design and implementation of the PACE Controller at all system, sub-system and component levels must stress the factors of high reliability, ability to operate acceptably in degraded modes resulting from occasional failures, and short time to diagnose and repair problems. Achievement of high start-up reliability and high net plant availability is a principal and prime objective of the PACE Controller procurement. Where any design factor or policy may create an adverse influence on this prime objective a specific trade-off analysis must be performed to establish a basis for objective decision.

Redundancy shall be employed to enhance reliability and availability. All functions shall be designed to maximize plant reliability and availability. Equipment protection and safety shall be the only considerations to supersede plant availability. Redundancy by association is the most desirable type of redundancy. This means that different control functions are capable of backing one another up. When and how to employ redundancy is a decision to be made on the basis of the consequences of failure and the expected reliability of the function under question, cost and complexity of providing redundancy.

2.2.1 Sensors

| Type | Comment |
|---|---|
| Solenoid Valves | No redundancy |
| Pressure Switches, Mercoid | No redundancy |
| Thermocouples | Yes redundancy |
| Pressure Transmittancers | |
| Flow Transmitters | |
| Level Transmitters | |
| Cauges | No redundancy |
| Temperature Indicators | No redundancy |
| E/P's | |
| P/E's | |

2.2.2 Control Loops

| | |
|---|---|
| Analog | No redundancy Setpoint tracking with possible A/M station |
| Digital | Redundancy required with tracking at output. |

2.2.3 Actuators

| | |
|---|---|
| Pneumatic Electric | No redundancy |

2.2.4 Power Supply

Power supplies shall be provided redundantly and power distributed such that the failure of one power supply or a fault on one buss shall not shutdown the plant. Fuses in power busses should be avoided but current limited power supplies should be used.

Power to CCI's should be distributed such that a ground or short on one CCI wire will not affect more than one CCI circuit. The DC output of the CCI power shall *not* be fused but should be current limited.

2.2.5 Air Supply System

Instrument air header will be fed by both gas turbine combustor shells and the three instrument air compressors.

2.2.6 Safety Circuits

All operator trip buttons or switches shall be mechanically guarded but not key locked. Emergency trips must be tripped on loss of power. All primary trip modes shall be hardware and not software.

2.2.7 Alarm Paralleling

Alarms provided by solid state annunciators will not be duplicated by the computer system. The computer will print out the annunciator group which has annunciated the alarm. Alarms will be group only where it is possible to establish the exact cause of the alarm at some other location as for example as can be done by viewing the relays in the generator protective relay cabinet—the cause of the alarm will be manifested by a flag in the relay associated with the particular fault.

2.2.8 Indicating Lights and Pushbuttons

Alarm, annunciator, and pushbutton bulbs shall be replaceable from the front panel and shall be redundant in such a manner that the operator can detect that a bulb is out. Indicators such as meters, position indicators need not be redundant. A lamp test shall be provided for those lamps not normally lit or for which redundancy is not provided as stated above.

2.3 Control Levels

The control system operation shall be considered as four defined levels:
1. Plant Coordinated Control Level
2. Plant Operator Automatic Control Level
3. Plant Back-Up System Control Level
4. Plant Manual System Control Level

2.3.1 Plant Co-ordinated Control

The Plant Coordinated Control System shall require that the digital system be operative, and at this control level the plant will have the highest degree of automation from "Hot Standby" to the pre-set load. Coordinated Control provides for control of any of the combined cycle operating configuration of equipment (Section 1.2.1, Chapter I) as a single unit. Operator activity is reduced to selection of fuels, operating configuration and total plant electrical output. Sequence, control, ramp and limit functions required to co-ordinate the startup and operation of the plant's major equipment systems from hot standby to the present load reference are provided by the co-ordinated control programs in the control computer. The operator can select co-ordinated control at the pushbutton control center for each turbo-generator, either when the plant is at hot standby (co-ordinated start and load) or when all the equipment involved is in the power generation mode (co-ordinated load only).

Functions:
1. Automatic forced sequence transition from "Hot Standby" to synchronous speed (for both gas turbines and the steam turbine).
2. Following automatic synchronizing the plant will be loaded to some pre-set reference and will produce load at the most optimum heat rate automatically.
3. A maximum information display will be available to the operator when at this control level.
4. Control level tracking and switching.

Failure:

The transfer should be restricted to that level of operation of a subsystem or subsystem of a subsystem that is practical to acomplish with the available system that will be designed based on degree of computer hardware isolation. The objective is to keep as high a percentage of the plant under coordinated level control as is possible considering two men at the site. Obviously, a complete computer failure (dead computer) will result in complete transfer to the "Back-Up System." Where possible, transfer should result in plant status quo. See FIG. 2-1.

2.3.2 Plant Operator Automatic Control

The Plant Operator Automatic Control Level shall require that the digital system be operative. The transfer of a subsystem or part of a subsystem to this control level will be operator initiated. The remainder of the plant will remain at the coordinated level.

Functions:
1. Each turbo-generator and each afterburner can be started and controlled by the operator from its pushbotton control center on the control consoles through its control package in the hybrid controller (since the steam turbine load is uniquely determined by the firing rates of the gas turbines and boilers, it does not have separated load control).
2. Acknowledging the operator request to put a subsystem in the "Operator Auto Control Level."
3. Maintain the required tracking so that when the operator decides to place the subsystems back to the coordinated control level it will be a bumpless transfer.

2.3.3 Plant Back-Up Control System

The back-up system does not depend at all on the availability of the digital system.

Functions:
1. Provisions for start-up of the entire plant.
2. Operate the plant at any load.
3. Accept a transfer from the primary system at any time.
4. The system shall encourage the use of the primary system, therefore such features and comment apply.
   a. Display system—will be kept to a minimum.
   b. Inlet guide vane always be in the open position unless via A/M station the operator decides to use it to optimize the plant heat rate.
   c. Rate of temperature ramp to the steam turbine to be an operator's function.
   d. Two level alarms where the second level would result in shutdown should be provided at this level where it is apparent that time to perform a function, say by the roving operator, could result in elimination of the fault (alarm); where the operator could make a decision to maintain status quo or even say reduce load if the fault were of the type where such action could eliminate the fault. Since the unit is on the back-up system, the overall availability of the plant may be improved.
   e. The back-up system shall not include closed loop megawatt control.
   f. Automatic synchronizing is not a requirement for the back up system.

2.3.4 Plant Manual System Control

Manual control can be utilized by the operator at all levels of control on selected functions provided that it will not have a deleterious effect on the plant control.

Functions:
(a) Provide A/M stations at the following locations:
   1. Inlet Guide Vane.
   2. Wherever it will improve plant availability and will not permit the operator to exceed system design limits. If an A/M station is at the valve level, there must be limit sensing device which can override the operator's input should the variable he is controlling result in plant damage. For example, no provisions shall be made to provide manual adjustment of the fuel input to the gas turbine.
   3. All A/M stations shall be provided with tracking in both directions to insure bumpless transfer in either direction.

4. Functions required to make the transition from the "Shutdown Status" to the "Hot Standby Status" will be at the Manual Control Level. Bringing the plant up to Hot Standby will involve manual operations at equipment located throughout the plant: water and fuel supply manual valves, boiler valves, and breakers for trnasformers switchgear buses, motor control centers and power distribution panels.

2.3.5 Control Requirements for Hot Standby

When the plant is on standby the digital computer in the plant's hybrid controller will be available for maintenance without any reduction in the readiness of plant equipment for startup. All control functions required to maintain the standby status can be performed from the central control room without the use of computer:

Motor starters have pushbuttons on the BTG Board, some with A/M stations so that the motors can be computer controlled in normal operation.
Interlocks and alarms employ hardwired logic.
Display devices are direct wired.
Control loops which are active during standby have separate electronic analog controllers:

| | |
|---|---|
| GT lube oil heaters and coolers | (2 each) |
| Drain tank level | |
| Condenser hotwell level (2) | (single element) |
| LP drum level (2) | (single element) |
| Boiler heaters (2) | |
| Economizer recirculation (2) | |
| Deaerator pressure trim (2) | |
| ST lube oil heaters and coolers | |
| Gland steam pressure | |
| St heater jacket | |

We claim:

1. A combined cycle electric power plant comprising at least a gas turbine and a steam turbine and a heat recovery steam generator connected to receive hot exhaust gas from said gas turbine and to supply steam to said steam turbine, means for generating electric power in response to mechanical drive power from said turbines, a control system for operating said plant, said control system including a gas turbine control which controls the gas turbine fuel flow and a steam turbine control which operates a steam turbine inlet valve and a bypass valve to control the turbine inlet steam, and a steam generator control which controls predetermined steam generator operating conditions all including analog electric control circuitry, means for operating said turbines and said steam genearator in response to the analog circuitry outputs, means for applying operator input signals to said controls to provide for plant startup and plant load operation, and a digital computer generating output signals for application to said controls so as automatically to provide coordinated plant startup and loading operation in satisfying a startup command and a plant load demand when said computer is selected for operation in said control system.

2. A combined cycle electric power plant comprising at least a gas turbine and a steam turbine and a heat recovery steam generator connected to receive hot exhaust gas from said gas turbine and to supply steam to said steam turbine, an afterburner for adding heat to the gas turbine exhaust in the flow path to said steam generator, means for generating electric power in response to mechanical drive power from said turbines, a control system for operating said plant, said control system including means for controlling the fuel flow to said gas turbine, means for controlling the inlet steam flow to said steam turbine, means for controlling predetermined operating conditions of said steam generator, means for controlling fuel flow to said afterburner, means for generating a representation of a plant load demand and a plant load error, and means for automatically coordinating the operation of at least one of said gas turbine and afterburner controlling means in response to the plant load demand and the plant load error to coordinate the operation of said plant and satisfy the plant load demand representation, and means for controlling the inlet steam flow to said steam turbine in a follow mode in response to predetermined parameters other than the plant load demand and the plant load error.

3. A combined cycle electric power plant as set forth in claim 2 wherin said automatic coordinating means responds to the plant load demand to operate at least said gas turbine controlling means in automatically coordinating the plant loading operation.

4. A combined cycle electric power plant as set forth in claim 3 wherein at least said gas turbine controlling means is further operated in response to the plant load error in automatic coordination of the plant loading operation.

5. A combined cycle electric power plant as set forth in claim 4 wherein at least said afterburner controlling means is further operated at least in response to the plant load error in automatic coordination of the plant loading operation.

6. A combined cycle electric power plant as set forth in claim 3 wherein at least said afterburner controlling means is operated in response at least to the plant load error in automatic coordination of the plant loading operation.

7. A combined cycle electric power plant as set forth in claim 3 wherein electric load sensing means includes means for sensing electric load produced by a generator driven by said steam turbine, means are provided for generating a representation of the steam turbine electric load, and said gas turbine controlling means is operated in response to the plant load error and to the difference between the plant load demand and the steam turbine electric load in automatic coordination of the plant loading operation.

8. A combined cycle electric power plant as set forth in claim 7 wherein at least two gas turbines and respectively associated afterburners and steam generators and associated controlling means are provided for supplying steam to said steam turbine, and means are provided for sharing the load demand placed on the two gas turbine controlling means in response to the plant load error and to the difference between the plant load demand and the steam turbine electric load.

9. A combined cycle electric power plant as set forth in claim 3 wherein there is provided a second gas turbine and an additional electric generator driven thereby, a second heat recovery steam generator is connected to receive hot exhaust gas from said second gas turbine and to supply steam to said steam turbine, a second afterburner is provided for said second steam generator, second means are provided for controlling fuel flow to said second gas turbine and said afterburner and predetermined operating conditions of said additional steam generator, and said automatic coordinating means further automatically coordinates the operation of at least one of said second gas turbine and afterburner controlling means in response to the plant load demand and the plant load error.

10. A combined cycle electric power plant as set forth in claim 3 wherein means are provided for generating representations of major plant components which become or are unavailable, said coordinating control means limiting the plant load demand in accordance with any of the component unavailability representations and coordinating the plant operation in accordance with the limited plant load demand.

11. An electric power plant comprising at least a steam turbine and a steam generaor interconnected to provide motive energy for driving said turbine, means for generating electric power in response to mechanical drive power from said turbine, a control system for operating said plant, means for controlling predetermined steam generator operating conditions to enable the startup of said steam generator, means for controlling predetermined steam turbine operating conditions to enable the startup of said turbine, means for controlling predetermined steam generator operating conditions to enable the load operation of said steam generator to be controlled, means for controlling the turbine inlet steam flow to enable the load operation of said turbine to be controlled, and means for automatically coordinating the operation of said steam generator and turbine controlling means so as to provide automatically coordinated plant startup and loading operation in satisfying a plant load demand.

12. An electric power plant as set forth in claim 11, wherein said plant is a combined cycle power plant including at least a gas turbine and a steam turbine and a heat recovery steam generator connected to receive hot exhaust gas from said gas turbine and to supply steam to said steam turbine, means are provided for controlling predetermined gas turbine operating conditions including fuel flow to enable the startup and loading of said gas turbine, and said coordinating control means further automatically coordinates the operation of said gas turbine controlling means to provide automatically coordinated combined cycle plant startup and loading operation in satisfying a plant load demand.

13. A combined cycle electric power plant as set forth in claim 11 wherein an afterburner is provided for adding heat to the gas turbine exhaust gas in the inlet flow path to said steam generator, said plant control system further includes means for controlling fuel flow to said afterburner at least during a part of plant loading operation, and said coordinating control means further automatically coordinates the operation of said afterburner controlling means in providing the automatically coordinated combined cycle plant operation.

14. A combined cycle electric power plant as set forth in claim 13 wherein means are provided for generating logical representations of major plant components selected by an operator for coordinated control operation, and said coordinating control means responds to the logic representations to place only the selected major plant components under coordinated control and to permit the other major plant components to be operator controlled.

15. A combined cycle electric power plant as set forth in claim 14 wherein means are provided for enabling said coordinating control means to operate only if the operator selected plant configuration is a valid one.

16. A combined cycle electric power plant as set forth in claim 14 wherein means are provided for generating logical representations of plant component availability for startup and for enabling said coordinating control means to operate available plant components.

17. A combined cycle electric power plant as set forth in claim 13 wherein there is provided a second gas turbine and an additional electric generator driven thereby, a second heat recovery steam generator is connected to receive hot exhaust gas from said second gas turbine and to supply steam to said steam turbine, a second afterburner is provided for said second steam generator, means are provided for controlling the flow of fuel to said second gas turbine and said second afterburner, and said automatic coordinating control means further coordinates the operation of said second gas turbine and afterburner controlling means in providing the automatically coordinated combined cycle plant operation.

18. A combined cycle electric power plant as set forth in claim 12 wherein said gas turbine controlling means sequences said gas turbine to synchronous speed and synchronizes and loads the gas turbine generator under supervision of said coordinating control means, said steam generator controlling means controls the steam generator operation under the supervision of said coordinating control means during gas turbine startup and loading as the exhaust gas temperature increases to start and increase the generation of steam as well as thereafter when the generated steam reaches conditions enabling steam turbine startup, and said steam turbine controlling means accelerates said steam turbine to synchronous speed and synchronizes and loads the steam turbine generator under supervision of said coordinating control means.

19. A combined cycle electric power plant as set forth in claim 18 wherein there is provided a second gas turbine and an additional electric generator driven thereby, a second heat recovery steam generator is connected to receive hot exhaust gas from said second gas turbine and to supply steam to said steam turbine, means are provided for controlling the flow of fuel to said second gas turbine, said automatic coordinating control means further coordinates the operation of said second gas turbine in providing the automatically coordinated combined cycle plant operation, means are provided for generating logical representations of major plant components selected by an operator for coordinated control operation, and said coordinating control means responds to the logical representations to place only the selected major plant components under coordinated control and to permit the other major plant components to be operator controlled.

20. A control system for a combined cycle electric power plant having at least a gas turbine and a steam turbine and a heat recovery steam generator connected to receive hot exhaust gas from said gas turbine and to supply steam to said steam turbine, an afterburner for adding heat to the gas turbine exhaust in the flow path to said steam generator, and means for generating electric power in response to mechanical drive power from said turbines, said control system comprising means for controlling the gas turbine fuel flow, a turbine inlet valve and a bypass valve to control the turbine inlet steam, means for controlling fuel flow to said afterburner, means for generating a representation of a plant load demand and a plant load error means for automatically coordinating the operation of at least one of said gas turbine and afterburner controlling means in response to the plant load demand and the plant load error to coordinate the operation of said plant and satisfy the plant load demand representation, and means for controlling the inlet steam flow to said steam turbine in a follow mode in response to predetermined parameters other than the plant load demand and the plant load error.

21. A combined cycle plant control system as set forth in claim 20 wherein said automatic coordinating means responds to the plant load demand to operate at least said gas turbine controlling means in automatically coordinating the plant loading operation.

22. A combined cycle plant control system as set forth in claim 21 wherein at least said gas turbine controlling means is further operated in response to the plant load error in automatic coordination of the plant loading operation.

23. A combined cycle plant control system as set forth in claim 21 wherein at least said afterburner controlling means is operated in response at least to the plant load error in automatic coordination of the plant loading operation.

24. A combined cycle plant control system as set forth in claim 21 wherein there is provided a second gas turbine and an additional electric generator driven thereby, a second heat recovery steam generator is connected to receive hot exhaust gas from said second gas turbine and to supply steam to said steam turbine, a second afterburner is provided for said second steam generator, second means are provided for controlling fuel flow to said second gas turbine and said second afterburner, and said automatic coordinating means further automatically coordinates the operation of at least one of said second gas turbine and afterburner controlling means in response to the plant load demand and the plant load error.

25. A combined cycle electric power plant comprising at least a gas turbine and a steam turbine and a heat recovery steam generator to receive hot exhaust gas from said gas turbine and to supply steam to said steam turbine, means for generating electric power in response to mechanical drive power from said turbines, a control system for operating said plant, said plant control system including a gas turbine control which controls the turbine fuel flow and a steam turbine control which operates a turbine inlet valve and a bypass valve to control the turbine inlet steam, and a steam generator control which controls predetermined steam generator operating conditions, means for operating said turbines and said steam generator in response to outputs from said turbine and steam generator controls, means for applying operator input signals to said plant control system to provide for plant startup and plant load operation, and digital computer means generating outputs for application at least to said turbine controls so as to provide at least automatic plant loading operation in satisfying a plant load demand.

26. A combined cycle power plant as set forth in claim 25 wherein said computer means further generates output signals for application to said turbine and steam generator controls so as further automatically to provide coordinated plant startup.

27. A combined cycle electric power plant as set forth in claim 25 wherein an afterburner is provided for adding heat to the gas turbine exhaust gas in the inlet flow path to said steam generator, and said plant control system further includes an afrerburner control which controls afterburner fuel flow and to which said computer means applies outputs for plant coordination at least during automatic loading operation.

28. A combined cycle electric power plant as set forth in claim 27 wherein said computer means further generates outputs for application to said turbine and steam generator and afterburner controls so as further automatically to provide coordinated plant startup.

29. A combined cycle electric power plant as set forth in claim 25 wherein said computer means includes means for sensing generated electric load and for generating a representation of actual total generated plant load, and said computer means responds to the difference between the plant load demand and the actual generated plant load in automatically coordinating the plant loading operation.

30. A combined cycle electric power plant as set forth in claim 25 wherein a backup control is provided for said digital computer means, and means are provided for bumplessly transferring control at least of said turbines from said digital computer means to said backup control under predetermined conditions.

31. A combined cycle electric power plant comprising at least a gas turbine and an electric generator driven thereby, a steam turbine and an electric generator driven thereby, a heat recovery steam generator connected to receive hot exhaust gas from said gas turbine and to supply steam to said steam turbine, means for controlling an inlet steam turbine valve to control the turbine inlet steam flow, in a follow mode in response to predetermined parameters other than the plant load demand and the plant load error, means for controlling the flow of fuel to said gas turbine in accordance wth a load setpoint, means for generating first and second representations of the loads supplied by said gas and steam turbine driven generators and an actual plant load representation from the sum of the first and second representations, a control for operating said plant including means for generating a plant load error from a plant load setpoint and the actual plant load representation, and means for varying the gas turbine load setpoint at least in response to the plant load error.

32. A combined cycle electric power plant as set forth in claim 31 wherein an afterburner is provided for adding heat to the gas turbine exhaust in the flow path to said steam generator, and means are provided for controlling fuel flow to said afterburner to add heat to the gas turbine exhaust at least after said gas turbine has reached its limited load operating level.

33. A combined cycle electric power plant as set forth in claim 32 wherein said afterburner controlling means also operates at least in response to the plant load error.

34. A combined cycle electric power plant as set forth in claim 33 wherein said afterburner controlling means operates said afterburner to add heat to the exhaust gas at gas turbine operating levels below the limited gas turbine load operating level.

35. A combined cycle electric power plant as set forth in claim 31 wherein there is provided a second gas turbine and an additional electric generator driven thereby, a second heat recovery steam generator is connected to receive hot exhaust gas from said second gas turbine and to supply steam to said steam turbine, means are provided for controlling the flow of fuel to said second gas turbine in accordance with another load setpoint, and said setpoint varying means further varies the second gas turbine load setpoint at least in response to the plant load error.

36. A combined cycle electric power plant comprising at least a gas turbine and an electric generator driven thereby, a steam turbine and an electric generator driven thereby, a heat recovery steam generator connected to receive hot exhaust gas from said gas turbine and to supply steam to said steam turbine, means for controlling an inlet steam turbine valve to control the turbine inlet steam flow in a follow mode in response to predetermined parameters other than the plant load demand and the plant load error, means for controlling the flow of fuel to said gas turbine, a second gas turbine and an additional electric generator driven thereby, a second heat recovery steam generator connected to receive hot exhaust gas from said second gas turbine and to supply steam to said steam turbine, means for controlling the flow of fuel to said second gas turbine, means for generating first and second representations of the loads supplied by said gas and steam turbine driven generators and an actual plant load representation from the sum of the first and second representations, a control for operating said plant including means for generating a plant load error from a plant load setpoint and the actual plant load representation, first and second afterburners for adding heat to the gas turbine exhaust in the flow paths to said steam generator, means for controlling fuel flow to each of said afterburners to add heat to the gas turbine exhaust at least after the associated gas turbine has reached its limited load operating level, means for varying a load setpoint supplied to said gas turbine or afterburner controlling means in response to the plant load error so as automatically to satisfy the plant load demand, and means for limiting the automatic load setpoint control to those turbines or afterburners selected by an operator.

37. A combined cycle electric power plant comprising at least a gas turbine and an electric generator driven thereby, a steam turbine and an electric generator driven thereby, a heat recovery steam generator connected to receive hot exhaust gas from said gas turbine and to supply steam to said steam turbine, means for controlling an inlet steam turbine valve to control the turbine inlet steam flow, means for controlling the flow of fuel to said gas turbine, a second gas turbine and an additional electric generator driven thereby, a second heat recovery steam generator connected to receive hot exhaust gas from said second gas turbine and to supply steam to said steam turbine, means for controlling the flow of fuel to said second gas turbine, first and second afterburners for adding heat to the gas turbine exhaust in the flow paths to said steam generator, means for controlling fuel flow to each of said afterburners to add heat to the gas turbine exhaust at least after the associated gas turbine has reached its limited load operating level and means for automatically and coordinately controlling said steam and gas turbine and afterburner controlling means to satisfy the plant load demand with only those of said controlling means selected by an operator for coordinated control being operated under coordinated control and with the others if any of said controlling means being operated under operator control.

38. A combined cycle electric power plant as set forth in claim 37 wherein means are provided for varying a load setpoint supplied to said gas turbine controlling means and to said afterburner controlling means in response to the plant load error during the load mode of operation.

39. A control system for a combined cycle electric power plant having at least a gas turbine and an electric generator driven thereby, a steam turbine and an electric generator driven thereby, a heat recovery steam generator connected to receive hot exhaust gas from said gas turbine and to supply steam to said steam turbine, said control system comprising means for controlling an inlet steam turbine valve to control the turbine inlet steam flow in a follow mode in response to predetermined parameters other than the plant load demand and the plant load error, means for controlling the flow of fuel to said gas turbine in accordance with a load setpoint, means for generating first and second representations of the loads supplied by said gas and steam turbine driven generators and an actual plant load representation from the sum of the first and second representations, a control for operating said plant including means for generating a plant load error from a plant load setpoint and the actual plant load representation, and means for varying the gas turbine load setpoint at least in response to the plant load error.

40. A control system as set forth in claim 39 wherein an afterburner is provided for adding heat to the gas turbine exhaust in the flow path to said steam generator, and means are provided for controlling fuel flow to said afterburner to add heat to the gas turbine exhaust at least after said gas turbine has reached its limited load operating level.

41. A combined cycle plant control system as set forth in claim 39 wherein there is provided a second gas turbine and an additional electric generator driven thereby, a second heat recovery steam generator is connected to receive hot exhaust gas from said second gas turbine and to supply steam to said steam turbine, means are provided for controlling the flow of fuel to said second gas turbine in accordance with another load setpoint, and said setpoint varying means further varies the second gas turbine load setpoint at least in response to the plant load error.

42. A control system for an electric power plant having at least a steam turbine and a steam generator interconnected to provide motive energy for driving said turbine, means for generating electric power in response to machanical drive power from said turbine, said control system comprising means for controlling predetermined steam generator operating conditions to enable the startup of said steam generator, means for controlling predetermined steam turbine operating conditions to enable the startup of said turbine, means for controlling predetermined steam generator operating conditions to enable the load operation of said steam generator to be controlled, means for controlling the turbine inlet steam flow to enable the load operation of said turbine to be controlled, and means for automatically coordinating the operation of said steam generator and turbine controlling means so as to provide automatically coordinated plant startup and loading operation in satisfying a plant load demand.

43. A plant control system as set forth in claim 42 wherein said plant is a combined cycle power plant including at least a gas turbine and a steam turbine and a heat recovery steam generator connected to receive hot exhaust gas from said gas turbine and to supply steam to said steam turbine and wherein said control system further includes means for controlling predetermined gas turbine operating conditions including fuel flow to enable the startup and loading of said gas turbine, and said coordinating control means further automatically coordinates the operation of said gas turbine controlling means to provide automatically coordinated combined cycle plant startup and loading operation in satisfying a plant load demand.

44. A combined cycle plant control system as set forth in claim 43 wherein an afterburner is provided for adding heat to the gas turbine exhaust gas in the inlet flow path to said steam generator, said plant control system further includes means for controlling fuel flow to said afterburner at least during a part of plant loading operation, and said coordinating control means further automatically coordinates the operation of said afterburner in providing the automatically coordinated combined cycle plant operation.

45. A combined cycle plant control system as set forth in claim 44 wherein means are provided for generating logical representations of major plant components selected by an operator for coordinated control operation, and said coordinating control means responds to the logical representations to place only the selected major plant components under coordinated control and to permit the other major plant components to be operator controlled.

46. A combined cycle plant control system as set forth in claim 43 wherein there is provided a second gas turbine and an additional electric generator driven thereby, a second heat recovery steam generator is connected to receive hot exhaust gas from said second gas turbine and to supply steam to said steam turbine, means are provided for controlling the flow of fuel to said second gas turbine, and said coordinating control means further automatically coordinates the operation of said second gas turbine controlling means in providing the automatically coordinated combined cycle plant operation.

* * * * *